US011017329B2

(12) United States Patent
Augustine et al.

(10) Patent No.: US 11,017,329 B2
(45) Date of Patent: May 25, 2021

(54) DAMPENING TOKEN ALLOCATIONS BASED ON NON-ORGANIC SUBSCRIBER BEHAVIORS

(71) Applicant: Rokfin, Inc., Austin, TX (US)

(72) Inventors: Scott Augustine, Austin, TX (US); Martin Floreani, Austin, TX (US)

(73) Assignee: Rokfin, Inc., Austin, TX (US)

( * ) Notice: Subject to any disclaimer, the term of this patent is extended or adjusted under 35 U.S.C. 154(b) by 0 days.

(21) Appl. No.: 16/950,580

(22) Filed: Nov. 17, 2020

(65) Prior Publication Data

US 2021/0065070 A1 Mar. 4, 2021

Related U.S. Application Data

(63) Continuation-in-part of application No. 16/783,062, filed on Feb. 5, 2020, which is a continuation of
(Continued)

(51) Int. Cl.
*G06Q 10/02* (2012.01)
*G06F 21/10* (2013.01)
(Continued)

(52) U.S. Cl.
CPC ......... *G06Q 10/02* (2013.01); *G06F 16/1837* (2019.01); *G06F 16/27* (2019.01);
(Continued)

(58) Field of Classification Search
CPC .... G06Q 10/02; G06Q 20/3672; G06Q 30/02; G06Q 20/065; G06Q 20/3821;
(Continued)

(56) References Cited

U.S. PATENT DOCUMENTS

2015/0163065 A1* 6/2015 Pan ................. H04L 9/3234
713/176
2015/0273342 A1* 10/2015 Olson ................ A63F 13/822
463/43
(Continued)

OTHER PUBLICATIONS

Agarwal et al., "Continuous Security in IoT Using Blockchain," 2018 IEEE International Conference on Acoustics, Speech and Signal Processing (ICASSP)Year: 2018 | Conference Paper | Publisher: IEEE.*
(Continued)

*Primary Examiner* — Roderick Tolentino
(74) *Attorney, Agent, or Firm* — Pillsbury Winthrop Shaw Pittman, LLP

(57) ABSTRACT

Described processes include: determining portions of instances of a cryptographic token to be allocated to record providers, like providers of an asset indicated by a record, wherein: the portions are determined based on network effects associated with the records the record provider supplied on performance of a computer-implemented network in which both record providers and record consumers participate, patterns indicative of inorganic consumption may be determined from one or more of interactions of individual consumers, interactions of collections of consumers, or consumer interactions in the aggregate for a given provider or record; and the effects on network performance are adjusted responsive to designation of one or more entities as exhibiting inauthentic behavior; and appending to a distributed ledger, records indicating the respective portions, and adjustments, are allocated to record providers.

28 Claims, 10 Drawing Sheets

Related U.S. Application Data application No. 16/588,635, filed on Sep. 30, 2019, now Pat. No. 10,600,009.

(60) Provisional application No. 63/086,487, filed on Oct. 1, 2020, provisional application No. 62/833,597, filed on Apr. 12, 2019, provisional application No. 62/781,442, filed on Dec. 18, 2018.

(51) Int. Cl.

| | |
|---|---|
| *H04L 29/06* | (2006.01) |
| *H04L 9/32* | (2006.01) |
| *G06F 16/27* | (2019.01) |
| *H04L 9/06* | (2006.01) |
| *G06Q 30/02* | (2012.01) |
| *G06F 16/9536* | (2019.01) |
| *G06F 21/16* | (2013.01) |
| *H04L 29/08* | (2006.01) |
| *G06F 16/182* | (2019.01) |
| *G06Q 20/36* | (2012.01) |
| *G06F 16/901* | (2019.01) |

(52) U.S. Cl.
CPC ...... *G06F 16/9024* (2019.01); *G06F 16/9536* (2019.01); *G06F 21/10* (2013.01); *G06F 21/16* (2013.01); *G06Q 20/3672* (2013.01); *G06Q 30/02* (2013.01); *H04L 9/0637* (2013.01); *H04L 9/0643* (2013.01); *H04L 9/3213* (2013.01); *H04L 63/1425* (2013.01); *H04L 67/22* (2013.01); *H04L 2209/38* (2013.01)

(58) Field of Classification Search
CPC . G06Q 20/3224; G06F 16/27; G06F 16/1837; G06F 16/9536; G06F 16/9024; G06F 21/10; G06F 21/16; H04L 9/0637; H04L 9/0643; H04L 9/3213; H04L 63/1425; H04L 67/22; H04L 2209/38; H04L 63/0807; H04L 63/0892
See application file for complete search history.

(56) References Cited

U.S. PATENT DOCUMENTS

| | | | |
|---|---|---|---|
| 2018/0077122 A1* | 3/2018 | Hoss | H04L 63/0407 |
| 2018/0205546 A1* | 7/2018 | Haque | G06F 21/6245 |
| 2018/0211718 A1* | 7/2018 | Heath | A01K 29/005 |
| 2019/0036887 A1* | 1/2019 | Miller | G06F 21/62 |
| 2019/0124146 A1* | 4/2019 | Austin | H04L 9/0643 |
| 2019/0333142 A1* | 10/2019 | Thomas | G06Q 40/025 |
| 2019/0362376 A1* | 11/2019 | Newell | H04L 9/0643 |
| 2020/0042988 A1* | 2/2020 | Snow | G06Q 20/0655 |

OTHER PUBLICATIONS

DeCusatis et al. "Identity-based network security for commercial blockchain services," 2018 IEEE 8th Annual Computing and Communication Workshop and Conference (CCWC) Year: 2018 | Conference Paper | Publisher: IEEE.*

* cited by examiner

DAMPENING TOKEN ALLOCATIONS BASED ON NON-ORGANIC SUBSCRIBER BEHAVIORS

CROSS-REFERENCE TO RELATED APPLICATIONS

This patent application claims the benefit of U.S. Provisional Patent Application 63/086,487, filed 1 Oct. 2020, titled DAMPENING TOKEN ALLOCATIONS BASED ON NON-ORGANIC SUBSCRIBER BEHAVIORS; and is a continuation-in-part of U.S. Non-Provisional patent application Ser. No. 16/783,062, filed 5 Feb. 2020, titled MINT-AND-BURN BLOCKCHAIN-BASED FEEDBACK-COMMUNICATION PROTOCOL, which is a continuation of U.S. Non-Provisional patent application Ser. No. 16/588,635, filed 30 Sep. 2019, titled MINT-AND-BURN BLOCKCHAIN-BASED FEEDBACK-COMMUNICATION PROTOCOL, which claims the benefit of U.S. Provisional Patent Application 62/833,597, filed 12 Apr. 2019, titled COMPUTING MEASURES OF CENTRALITY OF GRAPHS WITH DECENTRALIZED APPLICATIONS; and also claims the benefit of U.S. Provisional Patent Application 62/781,442, filed 18 Dec. 2018, titled SYSTEM AND METHOD FOR CONTROLLING ACCESS TO DIGITAL ASSETS AND ATTRIBUTING NETWORK VALUE USING A DISTRIBUTED LEDGER. The entire content of each aforementioned patent filing is hereby incorporated by reference.

BACKGROUND

1. Field

The present disclosure relates generally to decentralized applications and, more specifically, mint-and-burn blockchain-based feedback-communication protocols.

2. Description of the Related Art

Decentralized computing platforms can take a variety of forms. Often these computing platforms are implemented on a relatively large number of peer computing nodes (like distinct network hosts, e.g., different computing devices, virtual machine, container, community kernels, and the like), in many cases without a central authority coordinating the operation of the peer computing nodes. Examples include BitTorrent, ad hoc mesh networking protocols, and distributed ledger technologies, like blockchain, as well as various blockchain-based decentralized computing platforms, like Ethereum, Hyperledger, Cardano, NEO, and the like.

Some forms of decentralized computing platforms are Turing complete and support the execution of user-composed decentralized applications, for instance, written in a native scripting language or compiled or interpreted into native code or machine code. In some implementations, decentralized computing platforms are permissioned, and access to the decentralized computing platform is selectively granted to authenticated entities. And in some cases, decentralized computing platforms are permissionless, allowing a variety of un-trusted third parties to provide the peer nodes upon which the decentralized application is executed. Some implementations of decentralized computing platforms afford a number of benefits, including resilience to the failure of anyone computing node, mitigating the Byzantine general problem, and supporting immutable conditional commitments in the form of smart contracts. There are, however, trade-offs in many cases, computing performance being at the forefront. In many cases, it is more computationally expensive to perform some computation with a decentralized computing platform than with other forms of distributed applications.

These trade-offs are aggravated with certain types of computations that have traditionally scaled poorly in many implementations. For example, it is often useful to compute various measures of the centrality of nodes or groups of nodes in graphs. Measures of centrality have applications in social networks, group coordination in game theory, content recommendation, and the like. However certain measures of centrality having desirable properties, like Shapely values, can be infeasible to calculate exactly when the number of nodes in a graph scales. For example, many traditional algorithms to compute Shapely values generally scale according to $O(2^{|n|})$, where n is the number of nodes in the graph. Consequently, even a relatively small number of nodes in a graph can render that graph infeasible for computing a Shapely value with a decentralized computing platform.

SUMMARY

The following is a non-exhaustive listing of some aspects of the present techniques. These and other aspects are described in the following disclosure.

Some aspects include a process, including: obtaining, with a distributed computer system, a utilization graph, the utilization graph being based on which of one or more content-consumers accesses content items, the utilization graph having: nodes corresponding to content items available on a content-distribution platform, the content items being associated in memory with different content-contributors credited with making the content items available, and edges corresponding to access of content items by one or more computing devices of the one or more content-consumers; obtaining, with the distributed computer system, content-consumer input scores, the content-consumer input scores being indicative of assessments of the content-distribution platform by the one or more content-consumers; determining, with the distributed computer system, based on the utilization graph, a measure of network centrality for each node in a set of nodes within the utilization graph, the set of nodes having a plurality of nodes; determining, with the distributed computer system, for each node in the set of nodes, a network-effect score based on both the measure of network centrality of the node and at least some of the content-consumer input scores; and determining, with the distributed computer system, each of at least some of the different content-contributors, an aggregate network-effect score for the content-contributor, the aggregate network-effect score being based on network-effect scores of nodes corresponding to content items the content-contributor is credited with being made available; wherein, after determining the aggregate network-effect score, for a given content-contributor among the different content-contributors, an entry is caused to be appended to a tamper-evident, acyclic graph of cryptographic hash pointers to render tamper-evident a record indicating that an amount of cryptographic tokens based on the aggregate network-effect score of the given content-contributor are, or are to be, added to an account documenting contributions of the given content-contributor to the content-distribution platform.

Some aspects include a process, including: obtaining, by a decentralized computing platform, a first amount of instances of a first type of cryptographic token transferred to a burn address of a first distributed ledger of the decentralized computing platform by members of a first set of entities, wherein an account at the address is inoperable to transfer received instances of the first type of cryptographic token to other account addresses of the first distributed ledger; determining, by a script executed by the decentralized computing platform, a second amount of instances of the first type of cryptographic token to be minted; determining, by the decentralized computing platform or another computing system, portions of the second amount of instances of the first type of cryptographic token to be allocated to members of a second set of entities, wherein the portions are determined based on effects determined to be caused by members of the second set of entities on performance of a computer-implemented network in which both the first set of entities and the second set of entities participate; appending, by the script or another script executed by the decentralized computing platform, to the first distributed ledger, records indicating the respective portions are transferred to respective accounts at respective addresses of corresponding members of the second set of entities; and storing a resulting version of the first distributed ledger in memory.

Some aspects include a process, including: obtaining, with a distributed computing system, a set of burn transactions associated with a current mint period of a cryptographic token, wherein: a burn transaction takes instances of the cryptographic token out of circulation by transferring the instances of cryptographic tokens to a wallet address inoperable to transfer received instances of the cryptographic token to other wallet addresses on the distributed computing system, and the set of burn transactions associated with the current mint period have an aggregate tractable score meeting or exceeding a target tractable score for the current mint period; segmenting, with the distributed computing system, the burn transactions into subsets of burn transactions in response to determining members of each subset have an identifier associated with a same computer-implemented platform; determining, with the distributed computing system, for each subset, a tractable score associated with the subset based on respective amounts of instances of the cryptographic token received by a wallet address inoperable to transfer the received instances of the cryptographic token during the current mint period; allocating, with the distributed computing system, an amount of instances of the cryptographic token to be minted for the current mint period to a given computer-implemented platform represented by at least one subset based on the tractable score associated with the at least one subset relative to the aggregate tractable score for the mint period; obtaining, with the distributed computing system, a network performance report for the given computer-implemented platform, the network performance report identifying a wallet address associated with a computer-implemented platform and a set of contributor wallet addresses associated with respective network-effect scores of contributors to the computer-implemented platform; and transferring, with the distributed computing system, by one or more transactions corresponding to a mint of the cryptographic token on the decentralized computing platform for the current mint period, a first portion of the amount of the cryptographic token minted to the wallet address associated with the computer-implemented platform and a second portion of the amount of the cryptographic token minted to the set of contributor wallet addresses based on the network-effect scores.

Some aspects include a process, including: obtaining, with one or more processors, instantiation records corresponding to one or more historical instantiations of a cryptographic token, the instantiation records indicating for each historical instantiation: an identifier associated with an instantiation period, a timestamp associated with the instantiation period, and an adjusted tractable value for the instantiation period, selecting, based on selection criteria, historical instantiations of the cryptographic token satisfying the selection criteria; determining, based on a measure of central tendency of the adjusted tractable values of the selected historical instantiations, a target tractable value of a new instantiation period; accessing, with one or more processors, transaction records corresponding to one or more transactions in which amounts of the cryptographic token were transferred to an address inoperable to transfer received cryptographic tokens to other addresses according to a protocol of a decentralized computing platform; identifying, from the transaction records, transactions corresponding to the new instantiation period, each identified transaction having associated transaction information indicative of a tractable value based on an amount of the cryptographic token transferred by the transaction to an address inoperable to transfer the received amount of cryptographic tokens; and determining to instantiate the cryptographic token for the new instantiation period in response to identifying a set of transactions corresponding to the new instantiation period having an aggregate tractable value meeting or exceeding the target tractable value of the new instantiation period, wherein an instantiation record stored for the new instantiation period indicates: an identifier associated with the new instantiation period, a timestamp associated with the new instantiation period, and an adjusted tractable value for the instantiation period based on the aggregate tractable value and a duration of the new instantiation period.

Some aspects include a computer-implemented method corresponding to one or more of the above-mentioned processes.

Some aspects include a tangible, non-transitory, machine-readable medium storing instructions that when executed by a data processing apparatus cause the data processing apparatus to perform operations including one or more of the above-mentioned processes.

Some aspects include a system, including: one or more processors; and memory storing instructions that when executed by the processors cause the processors to effectuate operations of one or more of the above-mentioned processes.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
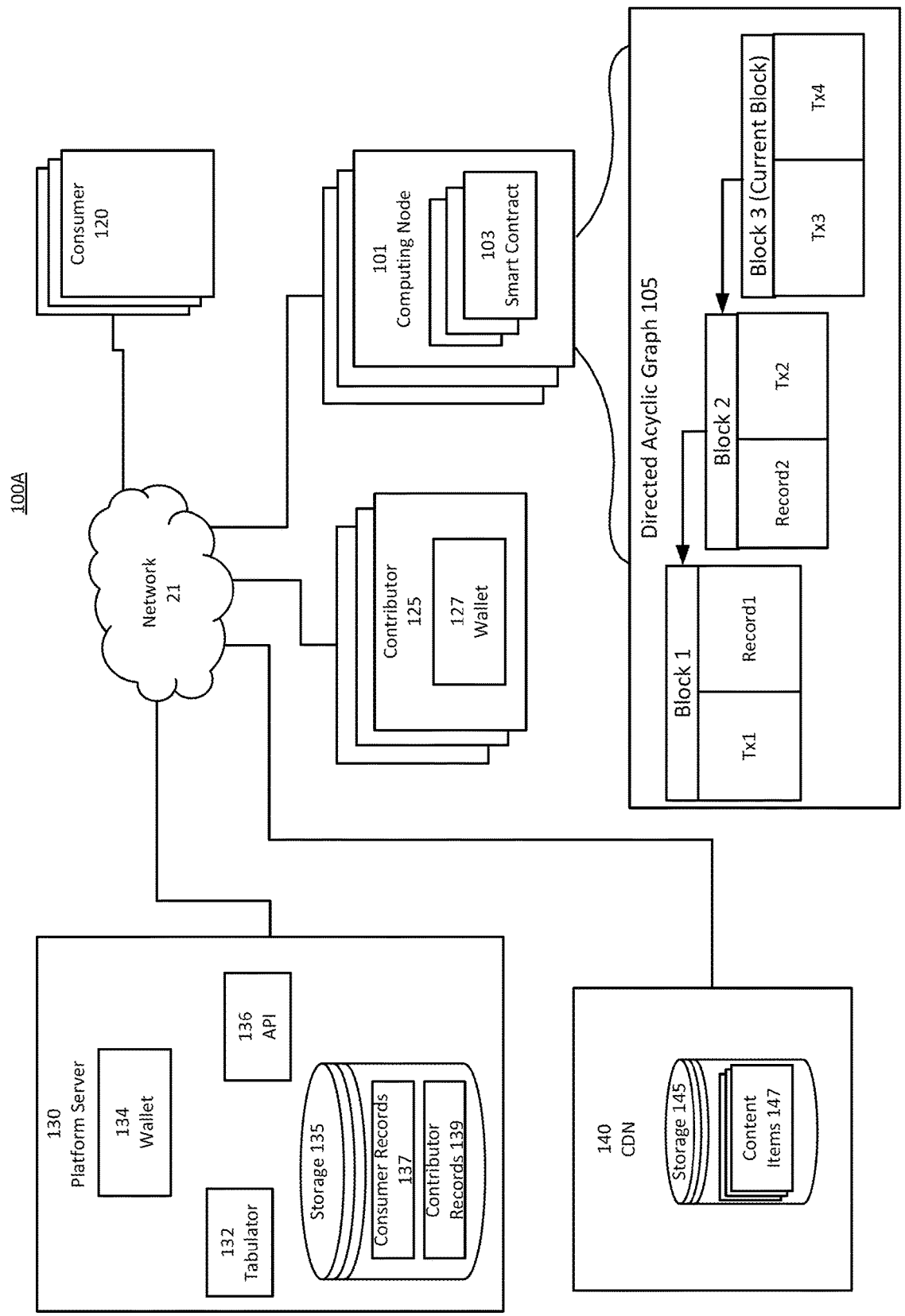
FIG. 1A and FIG. 1B are physical and logical architecture block diagrams depicting examples of a computing environment in which the present techniques may be implemented in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and game theory. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The present techniques are described below with reference to a particular use case, allocating cryptographic tokens to content creators contributing to an ecosystem subject to network effects, but should be understood to have broader applicability, which is not to suggest that any other description herein is limiting. Some embodiments, like those described below, may allocate these cryptographic tokens based on measures of network centrality, and some of those embodiments may compute these allocations with, or on behalf of, a decentralized computing platform. Some embodiments compute allocations based on measures of network centrality from records of a decentralized computing platform, which may be a blockchain-based decentralized computing platform, where at least some of those records are stored in a blockchain and include information about participants of an ecosystem subject to network effects. Some embodiments of computational techniques described herein are expected to scale relatively effectively as number of participants of an ecosystem (or, more generally, number of nodes over which measures of network centrality are computed) increases. For example, some embodiments may scale in computational complexity by an amount less than $O(2^{|n|})$ where n is the number of nodes in a graph for which the measure of centrality is computed. Some embodiments may compute some of these measures of network centrality in polynomial time, in some cases by smart contracts executing on a decentralized computing platform, such as a blockchain-based decentralized computing platform. Similar techniques may be applied in other domains, such as other use cases in which diverse parties contribute to a platform exhibiting network effects, e.g., online marketplaces, social networks, repositories for native applications, computing ecosystems having standardized application-program interfaces, and the like.

For ease of explanation, an ecosystem subject to network effects may be described as an ecosystem layer, like an application layer, of a decentralized computing platform, which may be referred to as a blockchain network. A blockchain network as described herein may be a blockchain-based network. In some embodiments, state of a decentralized computing platform may be persisted to a tamper-evident acyclic graph of cryptographic hash pointers. Some example blockchain-based networks include a logical structure of blocks, such as blocks chained together (hence, a "blockchain"), such as by cryptographic hash pointers, where a given block has a header that fingerprints the state of the decentralized computing platform at that given point of time in a verifiable way (e.g., a verification of data recorded in the given block and prior blocks in the chain based on cryptographic hash pointers) such that the given block and prior blocks in the chain (and the data recorded therein) can be considered authoritative (e.g., by participants of the decentralized computing platform). Some examples render tamper-evident state of a decentralized computing platform within a tree of cryptographic hash pointers, where each node renders tamper-evident a state of the network (e.g., a given node may include records of transactions and other data like that attributed to a block as described herein, such as a sub-network of nodes) at that given point of time in a verifiable way such that the given node and prior nodes (e.g., one or more prior nodes upon which the given node depends) can be considered authoritative along with the data stored therein. In some embodiments, the allocation of cryptographic tokens and associated processes described herein may be based on analysis of records stored in, or otherwise rendered tamper evident by, a blockchain network, and outputs of one or more of the associated processes may be recorded in records stored in, or rendered tamper-evident by, the blockchain network.

In some embodiments, a decentralized computing platform rendered state is considered tamper-evident according to (or based on) a protocol. As a result, state may be rendered tamper-evident at relatively predictable intervals. For example, for a blockchain-based network, a plurality of records, or cryptographic hash digests thereof, may be stored within leaf nodes of Merkle trees of blocks of a blockchain, and blocks may be generated according to a protocol of the blockchain-based network, thereby rendering tamper evident a state of the decentralized computing platform, and those blocks may be generated in a relatively predictable fashion. For example, generation of blocks may be biased by a protocol of a decentralized computing platform to a relatively predictable schedule, such as on the order of seconds, minutes, or hours (or even set to a fixed schedule). In some embodiments, a state of the decentralized computing system may be enumerated in a data structure according to a similarly predictable schedule, such as through biasing or setting to a schedule as specified by a protocol of the decentralized computing platform. For instance, the time (e.g., an average time) between sequential states may be biased according to the protocol of the decentralized computing platform, e.g., trending recordation of state (which is not to imply that state is not already stored in memory of the system, rather that state is rendered tamper evident) toward a set amount of time, such as by increasing/decreasing a difficulty of a proof of work problem, increasing/decreasing an amount of data stored or transactions, or other metric. Alternatively, a schedule may be implemented, such as by selection of (one or more) high-quality states from a pool of known propagated states (e.g., at a given time) and discarding of lower quality states upon seeing a higher quality state (e.g., meeting selection criteria) within the decentralized computing platform. In some cases, a schedule may be fixed, such as by selecting a highest quality state after an elapsed period of time according to the schedule, or relatively fixed, such as by selecting a state after a threshold period of time provided the selected state also meets a threshold quality (e.g., vs simply being the highest when the threshold period of time is reached). In some cases, a state may need to be extended upon by at least a given number of new states, the number of which may be dependent on the configuration of a given decentralized computing platform, to be considered authoritative. For a relatively predictable schedule of state capture, authoritativeness of captured state (e.g., finality) may be viewed not only as a number of extensions on that state (e.g., 6, 10, 35, etc. for computational or probabilistic infeasibility of altering that captured state), but in time to finality, like the average time between captured states (e.g., seconds, minutes, or hours) multiplied by the number of extensions to computational or probabilistic infeasibility. Accordingly, the allocation of cryptographic tokens and associated processes as described herein may be based on analysis of records stored in, or rendered tamper-evident by, a decentralized computing platform that are considered authoritative, and states from which those records are selected may be selected based on a schedule of state capture according to a protocol of the decentralized computing platform, which may be a blockchain-based or blockchain-like network. Some embodiments assign a value to a state based on the records therein and a measure of central tendency (of values, like mean, median, or mode) tracked across a plurality of states including the state.

The ecosystem layer may be implemented (e.g., like an application layer) on top of an underlying decentralized computing platform having support for at least a set of on-chain functions (e.g., functions implemented by or within the decentralized computing platform, such as to render a tamper-evident record or are themselves tamper-evident) used by the ecosystem layer. On-chain functions may be functions of the decentralized computing platform or functions enumerated in records stored within a distributed ledger (like a blockchain) thereof that are executed by peer computing devices participating in the decentralized computing platform, like smart contracts. For example, in some embodiments, the set of on-chain functions are implemented by elements of the underlying decentralized computing platform according to one or more protocols of the decentralized computing platform. In some embodiments, the ecosystem layer may include additional elements that perform off-chain functions within the context of the ecosystem layer and one or more of those elements may interface with the decentralized computing platform, such as to request execution of an on-chain function or provide requested data to an on-chain function. For example, the ecosystem layer may request execution of a smart contract (e.g., encoding on-chain functions) by the decentralized computing platform and arguments of smart contract may specify input data (which may be off-chain or on-chain data), one or more operations (which may include calls to other smart contracts or off-chain functions) pertaining to the input, outputs based on those operations (which may be inputs to other smart contracts of off-chain functions), etc., and results (e.g., one or more outputs) of the execution of the smart contract (or other smart contracts or off-chain functions) may be recorded to a record that is rendered tamper-evident by its inclusion in a state (e.g., when that state reached finality) of the decentralized computing platform, such as in a distributed ledger of a blockchain network.

In some embodiments, the decentralized computing platform is an existing blockchain-based decentralized computing platform which, at least in some instances, may have an existing functionality (e.g., as an existing cryptocurrency platform) separate from that of the ecosystem layer. In some cases, an ecosystem layer may leverage an existing blockchain network to perform one or more operations, like processing, generation, or storage of data, for the ecosystem layer within the blockchain network. Examples of existing blockchain networks include Ethereum, Hyperledger, Cardano, NEO, and the like.

In some embodiments, a decentralized computing platform (like a blockchain computing platform) is instantiated with native support for (e.g., incorporates a broader range of functions or an entire range of functions used by) the ecosystem layer, in which case a blockchain network may optionally serve one or more additional functions (e.g., for a file storage layer or other platforms exhibiting network effects). Such an instantiated decentralized computing platform may have an architecture similar to that of Ethereum, Hyperledger, Cardano, NEO, and the like, and thus may be a blockchain-based decentralized computing platform having incorporated one or more aspects of the ecosystem layer as discussed herein into the underlying blockchain-based network. In some cases, aspects of the ecosystem layer may be incorporated into protocol or architecture of future decentralized computing platforms which may be blockchain-based, although there exists no requirement therefor. Accordingly, disclosed aspects of the ecosystem layer as applied to or discussed with reference to existing decentralized computing platform(s) should not be construed as limiting to those specific platforms or a current state of those platforms, or a given element of the ecosystem layer, as decentralized computing platforms continue to evolve and support evermore utility in different domains.

In some embodiments, a decentralized computing platform computes a score based on network effects attributable to a participant of an ecosystem layer. The score may be a "record-based score" based on records rendered tamper-evident by the decentralized computing platform (e.g., stored on-chain or off-chain but with a hash digest on-chain). Allocation of cryptographic tokens to the given participant may be determined based at least in part on the record-based score. Examples of awards may be digital bearer assets, such as cryptographic token, like a cryptographic currency, utility token, or the like, that are generated on a blockchain network (e.g., according to a schedule, like a set of criteria, which when met triggers generation) and subsequently allocated commensurate with record-based scores of participants. In some embodiments, record-based scores are computed by smart contract. In some embodiments, the score is denominated in a digital bearer asset conforming to a standard of a blockchain network, like the ERC-20 standard (for rivalrous, fungible assets), or ERC-721 (for rivalrous, non-fungible assets), for the Ethereum blockchain network, for which digital bearer assets may be ERC-20 or ERC-721 compatible tokens on the Ethereum blockchain network. Other blockchain networks may use other standards or native digital bearer assets supporting similar functionality. In some embodiments, the score computed for a given participant accumulates based on post-contribution effects that serve as an empirical measure of network effects, mitigating computational complexity from NP-hard approaches like naively calculating Shapley values or certain other network centrality measures.

In some embodiments, a mint-and-burn component of a decentralized computing platform governing participation in the ecosystem layer specifies a schedule, such as a set of criteria, which when met triggers generation (minting) of digital bearer assets, where at least one criteria in the set of criteria is based on a measure of burn in previously distributed digital bearer assets to a class of participant in the ecosystem layer. In some embodiments, content distributors (or other types of downstream participants) convey a first type of token (e.g., Fin, BTC, ETH, USD, or a vote) to obtain (e.g., purchase) a portion of a limited supply of a second type of token (e.g., RAE), thereby determining an emergent aggregate measure of desirability of the second token that is denominated in the first token (e.g., the market clearing price of RAE in ETH, USD, BTC, or votes). Some embodiments mint and allocate the second type of token to participants based on their contribution towards desired properties of the ecosystem (e.g., network effects measured in terms of user retention, user-addition, user-engagement, content-creator retention, content-creator addition, content-creator engagement, or similar metrics for other upstream participants). The desired properties may be network effects, fairness in routing, latency in routing, transparency, etc., and participants may measure (or ascertain) the desirability of various actions with scores (e.g., changes in their wallet balances) denominated in the first type of token via the exchange rate (or other aggregate measure of desirability). Some embodiments mint and allocate a first portion of the second type of token to content creators and a second portion of the second type of token to content distributors. In some embodiment, the first portion is allocated to content creators based on network effects attributable to the content they provide and participation within the ecosystem layer. In some embodiments, the second portion is allocated to content distributors based on network effects attributable to the service they provide, which may include an analysis of fairness in routing, latency in routing, transparency, and the like.

In some embodiments, a mint-and-burn component of a decentralized computing platform governing participation in the ecosystem layer specifies a schedule, like a set of criteria, which when met triggers generation (minting) of digital bearer assets, where at least one criteria in the set of criteria is based on a measure of central tendency (e.g., mean, mode, or median) over a trailing duration (e.g., an hour, day, week, or longer or shorter) of exchanges between two or more types of digital bearer assets, at least one of the digital bearer asset types being a previously distributed to a class of participant in the ecosystem layer. In some embodiments, a first type of digital bearer asset, or token, may be a relatively stable digital bearer asset (e.g., a stable-coin, FIN, or cryptographic token redeemable for a fixed amount fiat currency) having a tractable value held to a comparative value (e.g., pegged to a value) of fiat currency (e.g., US dollars) or another existing digital bearer asset (e.g., a specific stable-coin). In some embodiments, the first type of digital bearer asset, or token, is representative of a tractable value of a relatively stable digital bearer asset or fiat currency. In other words, the first type of digital bearer asset, or token, may be indicative of a tractable value of another digital bearer asset at a point in time, such as a market clearing price of a relatively stable digital bearer asset or fiat currency at a time of token generation. For example, the first type of digital bearer asset may not circulate or convey value but tokenizes a tractable value. In some embodiments, an amount of the first type of digital bearer asset is restrictively and conditionally allocated (or tracked) to a set of eater addresses on a blockchain network. In some embodiments, a record keeping value is determined without issue of the first type of digital bearer asset, and a record keeping value may be tracked across transactions for an address associated with a platform, such as an eater address or an address from which the platform transfers amounts of digital bearer assets to an eater address to remove those amounts from circulation. Embodiments of an eater address may be an address on a blockchain network to which digital bearer assets may be transferred but not retrieved, like a wallet address for which the private key is destroyed or was never generated, such as by random or specific selection of an address not generated based on a public key of a known private key. In some embodiments, non-retrievability is achieved by generation of an address for which there is no known duplicate and for which there is no known private key. For example, a valid (e.g., possible) address may be randomly or selectively generated within a character space of a public key or address—that is not derived from a known private key of a key-pair—thus making it computationally infeasible for an entity to demonstrate possession a corresponding private key and thereby transfer digital bearer assets from the wallet address. In some embodiments, an amount of the first type of digital bearer asset is allocated to an eater address based on amount of a second type of digital bearer asset transferred to the eater address and a current exchange rate between the second type of digital bearer asset and the first type of digital bearer asset (or the comparative value to which it is pegged). In some embodiments, a record keeping value (e.g., rather than a first type of digital bearer asset) is tracked for an eater address based on amount of a second type of digital bearer asset transferred to the eater address and a current exchange rate between the second type of digital bearer asset and the comparative value to which the record keeping value is pegged (which may be a first type of digital bearer asset like a stable coin or a fiat currency like a USD or a fixed value). In some embodiments, a record keeping value (e.g., rather than a first type of digital bearer asset) is tracked for an address associated with a platform (or other entity associated with the platform or on behalf of the platform) which transfers (or requests transfers) of amounts of a second type of digital bearer asset to an eater address, the record keeping value of a transfer based on a current exchange rate between the second type of digital bearer asset and the comparative value to which the record keeping value is pegged (which may be a first type of digital bearer asset like a stable coin or a fiat currency like a USD or a fixed value). In some embodiments, the second type of digital bearer asset is a circulating digital bearer asset and may be obtained on an exchange. Accordingly, when the second type of digital bearer asset is transacted to an eater address, it is removed from circulation due to the non-retrievability of digital bearer assets from an eater address. Thus, for example, a second type of digital bearer asset, like a second token, may be obtained through transaction of fiat currency according to the comparative value (e.g., 1 second token <=>1 USD).

In some embodiments, transactions may be executed by the decentralized computing platform, and the decentralized computing platform may store records of the transactions stored on-chain or render tamper-evident records of the transactions stored off-chain (e.g., by writing a cryptographic hash of the off-chain record on-chain). In some embodiments, an amount of the first token that has been generated is tracked by interrogating the records stored within the decentralized computing platform, which may include interrogating the records over a number of recorded states of the decentralized computing platform. In some embodiments, an amount of the first token transacted over a number of recorded states is determined by interrogating the records of those recorded states (e.g., from a last state indicating a minting of the second token) and the second token is minted (e.g., in an amount according to a minting schedule) responsive to the amount of the first token transacted reaching a threshold amount, which may be based on (e.g., a sum of) a measure of central tendency (e.g., mean, mode, or median) over a trailing duration of exchanges of the first token as recorded in considered states extending no further than a most recent state considered authoritative. In a specific example, if the second token was minted at a state 1001 (e.g., a block 1001 in a blockchain), and a block must be extended n times in the blockchain to be considered authoritative, the process considers block 1002 (e.g., analyzes the records therein for an amount of the first token transacted) for the next minting of the second token upon block 1002 being extended n times (e.g., when the total blockchain length reaches at least 1002+n). The amount of the first token transacted in block 1002 may have an actual value, e.g., 20 Fin, and that value may be added to a list of values for determining a measure of central tendency (e.g., mean, mode, or median) over the trailing duration of exchanges of the first token as recorded in the number of considered blocks and a measured central tendency value may be assigned to the block. In some embodiments, the list of values may be a queue of actual values, like a FIFO queue, and the length of the queue (e.g., number of actual value entries), may be set (either hardcoded or deterministically for a next minting of the second token) based on one or more of the state recordation schedule and number of next states before a prior state can be considered authoritative.

Network effects take a variety of forms, examples including phenomena whereby a service provided by a network gains additional value as more participants use the service. Depending on the service, there may exist different roles of participants, such as whether a participant is a consumer of the service or a contributor to the service. In some instances, a participant may typically function as both, such as in a social networking platform, where consumers typically contribute, and the higher the participation in a social networking platform, the greater the value of the platform. On other types of platforms, the roles of participants may be more distinct. For example, participants in a streaming service platform (or other content delivery focused network) may be generally classified as primarily a consumer or primarily a contributor; contributors upload or otherwise generate content that is hosted by the platform and consumers engage (consume) the hosted content. Again, here, while a given participant may both contribute and consume, a popular content item may be engaged thousands, hundreds of thousands, or even millions of times. The contributor of that content item, although they may also engage with other content on the platform, their consumption of other content items is unlikely to outweigh their contribution. Some contributors upload or generate many content items which may collectively be engaged millions, tens of millions, or even billions of times. Thus, roles may be relatively well defined. In many instances, contributors are compensated, such as by fixed fee, agreement (e.g., share of ad revenue or other metric), or other compensation structure. On some platforms, roles may be even more distinct, such as in subscriber-type platform, where consumers pay to access a service or content hosted on a platform and contributors may upload or generate content on the platform to receive compensation (which may be derived at least in part from subscription fees). In at least the above examples, among others, for a network that exhibits network effects, a consolidated network offers more value to participants compared with the value offered by the summation of the individual contributors. In other words, within an example context of a content delivery type network, the consolidation of content on a platform adds value and, as a result, each contributor within the network offers a value when added to or subtracted from the network comprised of two parts: the stand-alone value of the contributor (or contributed content) to its utilizing entities, and the increase or decrease in network effects with the addition or subtraction of that contributor (or contributed content) from the network.

It can be desirable to measure a contributor's contribution to a service based on the value that contributor provides to the network, e.g., to allocate a corresponding amount of cryptographic tokens, adjust an in-game score, adjust a contributor rating, to gamify the act of contributing, or the like. In traditional metrics implemented by a service provider, value a contributor brings to the service is often provided as a portion of ad revenue, but the metrics for assigning that portion of ad revenue are hardly transparent nor commensurate with the value many contributors provide. For example, one method of attributing the value an element offers to a network is simply to ignore the value of network effects and attribute awards to the element based on the numerical value of independent interactions of user utilization, e.g., video views, podcast downloads, or online hotel room purchases. Another potential method of attributing the value an element offers to a network is to award the element based on the numerical value of independent interactions of user utilization as described above and to provide the element with a stake in the network's value in the form of partial ownership in the central entity that owns the network. However, these mechanisms are often inadequate as the highly dynamic nature of computer implemented networks makes assessing future value of elements and the network from present-day data impractical. (It should be emphasize that the preceding and other discussions of deficiencies in the art are not to be read as disclaimers, as various independently useful techniques are described, and some of those techniques may be applied to beneficial effect with respect to some such deficiencies without addressing other such deficiencies.)

As a further difficulty, computer implemented networks are often facilitated by a trusted third party (TTP), like a service provider, that aggregates contributing elements into a consolidated network. This requires a high output of resources for the TTP during the early life of the network. The inability of the TTP and contributors to accurately assess the supply elements' lifetime value to the network from present-day data may result in multiple inefficiencies. Furthermore, the TTP has a financial incentive in obfuscating the value a contributor offers the network, even if known to the TTP, in order to obtain a more favorable deal. Even furthermore, once the TTP's network experiences sufficient growth, the incentives of the TTP's network and that of the contributors further diverge.

When the awards attributed to a contributor undervalue said contributor, the contributor is often not optimally incentivized to further contribute to the network. Conversely, when the awards attributed to a contributor overvalue said contributor, awards are siphoned away from other deserving, necessarily undervalued contributors. Depending on the severity of the attribution award misallocation, the resulting network inefficiency will dampen, and in some cases cripple network growth.

As a result, and often as a service becomes more and more popular and the service provider derives more and more revenue from the service, contributors are typically forced to derive most of their revenue from outside sources, such as being paid to plug products from outside sources or advertise for their products in the content they contribute to the service. Thus, in addition to a lack of capability of smaller service providers to compete with highly consolidated service providers, the handcuffing of contributors to the most popular service enables those few popular service providers to insert evermore advertisements, derive the majority of revenue from those ads, and exhibit favoritism in award allocation to some contributors over others. In order to combat these issues, contributors more often plug products (e.g., sponsored content) and outside content while service providers implement more and more ads, and user experience devolves into consumers of content spending a large portion of their time viewing ad content and sponsored content in order to view the actual content they find engaging. Consumers grudgingly accept this tradeoff as they cannot reasonably move to a different service provider due to the consolidation of contributors with the most popular highly consolidated networks.

Various methods, systems, and computer-readable storage mediums are disclosed herein for computing network effects, like a score for contributors to a network, and allocating awards based on the scores. In addition, some methods, systems, and computing-readable storage mediums are disclosed herein for configuring a decentralized computing platform to compute network effects and allocate awards.

For example, in order to improve upon these traditional systems that trend towards consolidation as they grow in popularity, it is desirable to mitigate the negative effects of consolidation as a service platform grows in popularity. However, it is difficult to trend service providers towards acting in honest way with respect to contributors and consumers on altruism alone. In some embodiments, a decentralized computing platform may be implemented or used to trend service providers towards a user focused experience. For example, in some embodiments, in order to access contributor content and serve that content to consumers, a service provider must engage with a decentralized computing platform. The decentralized computing platform may enforce rules and criteria for service providers who wish to engage with the decentralized computing platform to access contributor content, and compliance therewith may be determined by virtue of information in records stored within a publicly accessible decentralized computing platform. In turn, customers may elect to engage with a given service provider based on a variety of factors, such as intrusiveness of ads, subscription cost, user experience of applications a service provider provides, and so on. Competition between service providers may be fostered through the knowledge that other service providers may also engage with the decentralized computing platform to serve contributor content to consumers.

Whether a customer elects to engage with a service provider is also dependent on the content that service provider provides, which is dependent on the contributor engagement with the decentralized computing platform. In order to attract contributors to make their content available to those service providers engaging with the decentralized computing platform, it is desirable to award content creators who provide content and award those content creators commensurate to their contributions (e.g., based on measures of network effects). In some embodiments, those awards may be allocated within the decentralized computing platform, which may provide transparency in awards and, further, those contributors may be awarded without direct service provider involvement. In order words, a contributor may provide content that is available across one, two, twenty, or even every service provider engaging with the decentralized computing platform, and the awards that contributor receives may be commensurate with the network effects attributable to that contributor overall. However, forecasting the benefit or detriment from the addition or subtraction of any set of contributors (or measuring current or past changes) is difficult in service provider platforms, let alone a decentralized computing platform, due to the highly dynamic nature of such networks and the large number of interactions that can occur on computer implemented networks.

Accordingly, some embodiments may be implemented in conjunction with a computer implemented ecosystem layer, like an application layer, that communicates with, but executes one or more functions, external to an underlying distributed computing system. In some embodiments, the ecosystem layer may also be a distributed computing platform. In some embodiments, one or more functions of the ecosystem layer may be incorporated within a distributed computing platform. Thus, the techniques disclosed herein may be implemented in a variety of different ways. Moreover, while various embodiments are discussed relative to content creators, service providers, and consumers of content, those techniques are relevant to other contexts exhibiting network effects.

Some embodiments leverage an underlying distributed computing system in a manner that overcomes deficiencies with user acceptance of such systems. Users have been slow to adopt distributed computing systems, like blockchain-based platforms, for a number of reasons. The decentralized and immutable (e.g., tamper-evident) nature of blockchains puts a consumers' finances at greater risk as errors are very difficult, if not impossible, to correct. Because of this added friction, risk, and liability in transacting with a blockchain-based business, many consumers and businesses will be unwilling or unable to interact with blockchain-based systems. Moreover, in many blockchain-based systems, users must create "wallets" where a user's wallet dictates control over tokens and where the user transacts with the system in the blockchain's native tokens. However, setting up a wallet is time consuming, complicated, and especially when compared to non-chain-based systems, provides a poor user experience. Some embodiments provide the advantage of obviating the need for the individual users (e.g., consumers or contributors) to create wallets. That said, embodiments are not limited to systems that fully mitigate these issues, which is not to suggest that any other disclosure is limiting.

FIG. 1A is a block diagram depicting an environment 100A in which various entities interact in at least some example embodiments. For example, FIG. 1A depicts platform server 130, contributor 125, and computing node 101, which may communicate directly or indirectly over a network 21. Various embodiments may also include content delivery network 140 and consumer 120. In some embodiments, the network 21 includes the public Internet and a plurality of different local area networks. Depending on the embodiments, the platform server 130 may communicate with a computing node 101 and one or more other entities over the network 21. Similarly, the computing node 101 may communicate with one or more other entities over the network 21.

In some embodiments, a contributor 125 (e.g., acting through their computing device) generates (e.g., supplies a copy of, designs, composes, or otherwise provides) content, like content items, which may be various types of consumable media like text, audio, image, video, games, in-game assets, data files, and the like. The contributor 125 may generate the content items for consumption, such as by a consumer 120. In many cases, a plurality of contributors each generate a one or more different content items which may be of interest to one or more of a plurality of consumers. Rather than interface with those consumers directly, multiple ones of the contributors 125 may upload, send, provide a network address of (like a URL or other URI), or otherwise communicate the content they generate to an online repository. For example, a contributor 125 may use a computing device to upload content items to the online repository. In some cases, a contributor self distributes the content items, or, in some cases, a publisher (not shown) may upload content items from a plurality of contributors (e.g., content items for which the publisher owns distribution rights) to the online repository. (The content creator need not be the party that creates the content in all cases. In some scenarios, the content creator may be a delegate of that party designated to be credited with providing the content.) In some embodiments, the online repository is hosted by or resides within a content delivery network (CDN) 140. In some embodiments, the CDN 140 is managed by a platform server 130, which may include a network of platform servers, and the network of platform servers may be a distributed computing platform for managing the CDN 140. In some embodiments, the CDN 140 is a decentralized computing platform for hosting content items, like an InterPlanetary File System, Dat, Swarm, or other decentralized file storage system. Consumers 120, via a computing device, like a mobile computing device, wearable computing device, desktop or media computing device, SmartTV, and the like, may consume content items hosted within the CDN 140, such as by receiving data corresponding to a content item 147 in response to a request for the content item.

In some embodiments, a contributor 125 may (by their computing device) contribute content items in the form of services, e.g., a hospitality offering, marketplace offering, ride share, or other good or service that can provisioned by a consumer. Similarly, a platform server 130, instead of managing a CDN 140, may manage a database storing information representative of a good or service associated with a contributor 125 that may be provisioned by a contributor 125. Thus, for example, depending on the embodiment, a platform server 130 may correspond to a media aggregator, a contributor, a hotelier, a digital marketplace, a ride sharing service, and the like, or network thereof. In turn, a consumer 120 may be an individual user or other type of entity that provisions a given good or service, like permission to access content items, request hotel reservations, request ride shares, purchase items offered by a digital marketplace, and the like. In some cases, although individual blocks are illustrated for ease of explanation, an entity may play multiple roles. For example, a user may contribute as well as consume, and a platform server 130 may aggregate content items from third party contributors as well as contribute first party content.

Some embodiments may compute measures of network effects to attribute awards to a contributor (e.g., to a blockchain wallet address associated with a contributor account) who provided content items to the network based on consumer use, such as present-day use of those content items or other engagement pertaining to the contributor. Some embodiments track (e.g., store) those measures and may award that contributor according to prior measures of network effects that impacted those consumers to re-use the contributor (or other contributors) in present-day (e.g., at the time of award computation). In some embodiments, awards (e.g., present-day awards) are assigned to contributors in relation to the inputs of consumer lifetime network utilization of content items generated by respective ones of the contributors. In some embodiments, the network attribution awards may take the form of cryptographic tokens, like utility tokens, cryptocurrency, or other digital bearer asset, which may be transacted on a distributed computing platform (e.g., via an exchange).

According to some embodiments, at least the platform server 130 and contributor 125 engage with, or are part of, a distributed computing platform, which may be a decentralized computing platform that persists state to a blockchain. Transactions, like award allocations, may be recorded to (e.g., stored in, or otherwise rendered tamper-evident by) the blockchain network in a plurality of records, like on-chain records, and scores corresponding to measures of network effects may be computed based on an analysis of those on-chain records. A protocol of the blockchain network, in some implementations, facilitates periodic creation of network attribution awards. In some embodiments, the creation of network attribution awards is a component of the underlying protocol. In some embodiments, the creation of the network attribution awards is encoded into blockchain network, for which the underlying protocol may specify a programming language by which functions implementing the creation of the network attribution awards may be encoded into the blockchain network. In either instance, the network attribution awards may be created and distributed to contributors, and those allocations (which may be affected by transactions) are recorded on the blockchain network.

An example decentralized computing platform is illustrated in FIG. 1A, implemented by at least computing node 101. In some embodiments, the computing node 101 is a computing node of a decentralized computing platform comprising many computing nodes each executing an instance of a peer node application. While only one computing node 101 is shown in detail, embodiments may include many more computing nodes, for instance, numbering in the dozens, hundreds, or thousands or more. In some embodiments, one or more of the computing nodes 101 may be rack-mounted computing devices in a data center, for instance, in a public or private cloud data center, or personal computing devices or servers in users' homes. In some embodiments, various ones of the computing nodes 101 may be geographically remote from one another, for instance, in different data centers and different users' homes, and geographically remote from other nodes and the other components illustrated. Thus, in some embodiments, the blockchain network that the computing nodes operate is relatively to very decentralized where at least some of the computing nodes are operated by various different entities for various purposes. However, that is not to say that in some embodiments a computing node 101 or nodes may be collocated (or in some cases, all be deployed within a single computer cluster).

In example embodiments where computing nodes are part of a blockchain network including many computing nodes, it should be recognized that entities the contributor 125 and platform server 130 need not communicate with any one specific node. Rather, each may communicate with a different one or multiple of the computing nodes of the decentralized computing platform and may communicate with different ones of the nodes at different times. Further, in some embodiments, one or more of the platform server 130 and contributor 125 may also be a node, include a node or operate a node or subset of functionality of a node, thereby operating as part of the blockchain network or configured to communicate with at least some of the nodes (e.g., to submit or retrieve data, not substantially process data within the context of the blockchain network).

In some embodiments, the computing node 101 may operate upon various types of information stored by the blockchain network. Some embodiments persist data to a directed acyclic graph 105 of cryptographic hash pointers that implement a tamper-evident, immutable, decentralized data store. Some embodiments include various scripts in a scripting language of the blockchain network that are executable by one or more of the computing nodes 101, for instance with verifiable computing protocols in which a plurality (like all) of the nodes 101 execute an instance of the script and compute a consensus result of the computation with the consensus protocols described herein, such that no single computing node 101 needs to be trusted. In some embodiments, these scripts or programs may be referred to as smart contracts 103, a term which should not be confused with a contract in law or other financial instrument. Rather, smart contracts refer to programs executable by computing nodes 101 of the blockchain computing platform, which in some cases may be tamper-evident, immutable decentralized programs loaded to the blockchain network by one of the components of the environment 100A. For example, the platform server 130 (or third party) may publish a smart contract 103 to the decentralized computing platform such that the computing node 101 (or other nodes) may process information stored in the directed acyclic graph 105, or other information, according to one or more operations enumerated in the smart contract. The options enumerated in the smart contract 103 may govern various activities within the context of the environment, such as digital bear asset creation, allocation, and the like. A smart contract 103 can be a contract in the sense that the logic of the smart contract is immutable in some implementations once loaded to the blockchain network, and thus serves as a form of a commitment to a particular body of logic.

The term "immutable" should not be read to require that immutable data be written to a form of physical media that prevents subsequent writes (e.g., a ROM or write-once optical media). Rather, the term "immutable" refers to a data structure that does not support modifications to data once written. For example, the data structure may support an appending of new data but not operational modification of prior data committed to the data structure. In some cases, this feature is afforded by making the data structure tamper-evident, e.g., computationally infeasible to modify committed data without rendering the data structure internally inconsistent. Thus, for example, an impermissible (e.g., by rules with which the data structure is internally consistent) modification of prior data renders detectable an internal inconsistency (e.g., tamper-evidence) within the data structure (e.g., in a verification of the data structure in accordance with the rules). In some cases, the data structure computational infeasibility of undetectable modifications may be afforded by chaining the above-described cryptographic hash values, such that verification of tampering consumes less than $100,000^{th}$ of the computing resources (e.g., in time or memory complexity) of computing resources needed to modify the data structure to be consistent with a modified previously written transactions.

In some embodiments, a smart contract 103 may be stored in the directed acyclic graph 105 (e.g., of cryptographic hash pointers) or otherwise published to this data repository, or in some cases, the smart contracts may be stored in a different tamper-evident, immutable, decentralized data store from that of the data upon which the smart contracts operate. One example smart contract 103 is shown, but it should be emphasized that there may be, and in some commercial implementations likely will be, multiple instances smart contracts with variations to implement new or different logic. For example, various embodiments disclosed herein disclose functionality pertaining to two or more smart contracts 103, however those functions may be consolidated into a single smart contract 103 or further divided amongst a 3, 5, 10 or more smart contracts 103 depending on the desired implementation. Further, in some cases, a smart contract 103 may be composed of or reference other smart contracts or invoke or draw upon logic implemented outside of the blockchain network. For example, a smart contract for performing one or more processes like those disclosed herein may in some instances call to another smart contract to perform a process, to obtain data or provide results. Some smart contracts may interface with the outside world relative to the blockchain network, such as with a platform server 130 (or servers, or network of platform servers, or other servers), to obtain data or provide results.

In some embodiments, smart contracts, like smart contract 103, may be callable by the various components of the environment 100A. Additionally, various entities of the environment 100A, like the platform server 130, may publish new smart contracts callable by the various components and the platforms server 130. In some embodiments, such as embodiments including a network of platform servers 130, a consensus operation in which the plurality of platform servers 130 participate in may govern acceptance of new smart contracts. Further, contributors 125 may choose to contribute based on a given smart contract being used by the platform server 130 (or a given platform server).

For example, the entities of the environment 100A in some cases may execute a peer client application of the blockchain network or otherwise send messages to application program interfaces for performing operations within the blockchain network to call the smart contracts and receive results. In some embodiments, a smart contract may execute based on a specific set of criteria, which may include access rules, like whether the requestor can be verified as having been authorized to request execution of the smart contract, and execution rules, which may be based on a computation of information stored within the blockchain network, like transaction information within one or more records stored within a directed acyclic graph 105. In some embodiments, the smart contracts 103 may have an address, for instance, in a data storage address space of the blockchain network, like an address corresponding to a cryptographic hash of program code of the smart contracts. In some embodiments, the smart contracts may accept arguments, such as various variables that may be passed to the smart contract and which may be operated upon by logic of the smart contract. Examples of arguments and their variables may include references, like an address, to data within the blockchain network, data for storage within the decentralized computing platform, requestor information like a signature of a request and a public key of a public-private key pair to verify the request, and the like. In some cases, each smart contract 103 may have a respective application program interface with a schema defined in an artifact of the corresponding smart contract that enumerates arguments that are required, arguments that are optional, default values for arguments, types of those arguments, and the like. Such smart contracts may be implemented on computing nodes 101 participating on a protocol of the blockchain network, such as an Ethereum blockchain protocol.

In some embodiments, an address of a smart contract 103 may be called with an API call including the arguments as input parameters. In some embodiments, a computing node 101 executes the smart contract in response to the API call by executing one or more functions enumerated in the smart contract, some of which may create digital bearer assets, such as by effecting transactions on the blockchain network to allocate (e.g., award) newly generated digital bearer assets to participating entities, such as contributors. Transactions and their associated information may be stored within transaction records of the blockchain network. In turn, a smart contract (e.g., a different smart contract) may be called to determine information about effected transactions, such as to track allocations of digital bearer assets to an address, transfers of digital bearer assets to an address, balance of digital bearer assets held by an address, current distribution of digital bearer assets, redemption of digital bearer assets, and the like. This, in some cases, may include calculating a cryptographic hash value based on both the associated information and a cryptographic hash value of entries in the block chain through which a transaction was effected. In some cases, a new entry created by the smart contract may include this cryptographic hash value and pointers to those other nodes. In some embodiments, a plurality of the computing nodes 101 implementing the blockchain network may execute a routine specified by the smart contract, and some embodiments may implement a consensus algorithm among those computing devices, like Paxos, Hotstuff, or Raft, to reach a consensus as to a result of executing the smart contract. The result may be stored in the blockchain network and this process may be repeated for subsequent executions of smart contracts. Some embodiments may interrogate records to by recreating the calculation of the cryptographic hash values along each link in a chain of cryptographic hash pointers and comparing the recalculated values to the values in the chain to confirm (in virtue of matches) that the records are authentic, such as to track allocation of digital bearer assets, redemption of digital bearer assets, and the like.

In some embodiments, the directed acyclic graph 105 comprising cryptographic hash pointers may provide a tamper-evident, immutable, decentralized data store to which the smart contracts are published and to which on-chain records accessed by the smart contracts are published, which in some cases may include output of the smart contracts as well as inputs to the smart contracts. For example, a smart contract for a digital bearer asset according to at least some embodiments herein may specify functions for minting digital bearer assets, transferring digital bearer assets, burning (e.g., destroying or determining whether existing digital bearer assets have been destroyed, and determining a balance of digital bearer assets (e.g., pertaining to a given address or account or all accounts holding digital bearer assets). Some of the outputs, like a balance, may be reported back to the entity having requested execution of the function, and some of the output, like a transfer, may be effected on the blockchain network and an identifier of an effected transaction may be reported back to the requester (such as by which the requester may verify completion of the transaction). Some aspects may be broken into multiple smart contracts, for example, the mint function may be called by another smart contract, such as a mint contract, which may function as an intermediary contract between the requestor and the base smart contract that is executed to perform the minting operation. In this way, the underlying smart contract may remain in place while the mint contract may be updated, such by consensual agreement among stakeholders, to update or change criteria by which the minting function within the base smart contract is called. In some embodiments, the mint contract may be updated as the ecosystem layer evolves, such as a transition from an initial platform server to a plurality of platform servers, and a transition to governance of the smart contract by a body of platform servers. In some embodiments, the body of platform server may participate in a consensus protocol, such as a vote, by which the body of platform server agrees on updates or changes to criteria by which the minting function within the base smart contract is called, addition of new platform servers to the body of platform servers, and removal of platform server to body of platform servers, among other aspects of the ecosystem layer. In some embodiments, this role of the platform servers may be implemented by federated servers, one or more of which may be permitted to the entities operating a platform server within the ecosystem layer.

In some embodiments, transactions recorded to or smart contracts published to the directed acyclic graph 105 may include storing all of the information of that transaction or smart contract (e.g., the program code of the logic of the smart contract that is executed by the computing nodes 101 (e.g., in a virtual-machine of a decentralized computing platform application corresponding to a target of byte code into which smart contracts are interpreted) in content of nodes (e.g., a node in a tree of nodes, like a Merkle tree, and a given tree may be stored in a block) of the directed acyclic graph of cryptographic hash pointers. Cryptographic hash pointers pointing to those nodes include cryptographic hash values (as part of node content of the node that is pointing) that are based on node content (of the node to which is pointed) that includes the stored information (e.g., a transaction and transaction data), thereby defining a chain of cryptographic hash pointers that becomes increasingly computationally expensive to modify (while remaining internally consistent) in the event of attempted tampering as the chain increases in length or tree increases in size. In some embodiments, a plurality of different directed acyclic graphs of cryptographic hash pointers may store different subsets of the information, may store replicated instances of the information, or in some cases a single directed acyclic graph of cryptographic hash pointers may store all of this information. In some cases, the directed acyclic graph is a sub-graph of a larger graph with a cycle, and in some cases the directed acyclic graph includes unconnected subgraphs.

In some embodiments, the storing of information about transactions published to the directed acyclic graph 105 of cryptographic hash pointers is achieved by storing a cryptographic hash digest of the information in node content of the directed acyclic graph of cryptographic hash pointers. In some embodiments, node content may be a transaction with transaction data (e.g., Tx1-4). In some embodiments, node content may be a transaction for storing data (e.g., Record1-2), like a sstore or Txdata function, which may also include transaction fees for the transaction to store the data. Thus, for example, the directed acyclic graph 105 may contain transactions and other records. Example transactions Tx1-4 may indicate a transfer or allocation of digital bearer assets from a sending address to a receiving address and the amount of digital bearer assets transferred or allocated. Other records Record1-2 may also be stored within the directed acyclic graph 105, examples include records of smart contracts, consumer records, content records, contributor records, records of results determined by a smart contract, other data, and the like. Transactions and records stored within the directed acyclic graph 105 may be referenced by their cryptographic hash address or identified according to one or more other identifiers by search through the directed acyclic graph 105 (e.g., a search for an identifier in node content corresponding to the desired data).

In some cases, a transaction for data storage includes a cryptographic hash (or hashes) of information stored outside of the directed acyclic graph 105 of cryptographic hash pointers, like a unique identifier of an entity, content item, or other information, but that outside information and an appended timestamp and address in a data store (e.g., like that of a CDN 140 or platform server 130 or other entity) may be input to a cryptographic hash function to output a cryptographic hash value. That cryptographic hash value (or other hash digest) may be stored as node content of the directed acyclic graph 105 of cryptographic hash pointers. The information stored outside of the graph 105 may then be verified as having been untampered with by recalculating the cryptographic hash value based on the asserted address, time, and transaction information and comparing the recalculated cryptographic hash value to the cryptographic hash value stored by the transaction in the directed acyclic graph of cryptographic hash pointers. Upon determining that the hash values match, the outside data may be determined to be current and has not been subject to tampering, or upon determining that the values do not match, the information may be determined to have been tampered with. For example, a contributor cannot misrepresent ownership and date of contribution of a content item. In another example, a consumer cannot assert access rights unless a subscription is current. In another example, a platform server 130 cannot circumvent permissions to grant access to a consumer or otherwise manipulate reported information. Further, to verify that the cryptographic hash value in the directed acyclic graph has not been tampered with, some embodiments may recalculate cryptographic hash values along a chain of cryptographic hash pointers to confirm that the recalculated values match those in the directed acyclic graph, thereby indicating the absence of tampering (or upon detecting a mismatch, indicating the presence of tampering).

In some embodiments, on-chain information may include information about contributors, consumers, platform servers, content items, smart contracts, and the like. However, some information may also be stored off-chain, such as by a platform server 130. For example, a platform server 130 may include an off-chain storage 135 to maintain local consumer records 137 and contributor records 139, although some or all of this information, cryptographic hashes thereof, or encrypted versions thereof, may be stored on-chain instead of or in addition to the off-chain storage 135. In some embodiments, such as those including a plurality of platform servers and one or more federated servers (not shown, but which are discussed in greater detail below with reference to FIG. 1B), a federated server may store information about the platform servers 130 (and, optionally, other federated servers) participating within the ecosystem layer. For example, a federated server may include a record of authorized platform servers and authorized federated servers, and the record or information about the record may be stored off-chain, on-chain, or a combination thereof like other data described herein. In some embodiments, a CDN 140, platform server 130, or other entity may include one or more records of content items 147, which may include information about the contributor of the content item and the content item or other pertinent information, such as any permissions associated with the content item, and some or all of the information may be cryptographically hashed for verification or identification of content items hosted within the CDN 140. In some embodiments, such as where the CDN 140 is a distributed storage platform, a cryptographic hash may be a cryptographic hash address for retrieval of the content item. In some embodiments, a schema is specified for off-chain or on-chain storage of information like that described above (e.g., records), which when stored on-chain may be stored across one or more on-chain records, and at least one of those records may include a hash digest referencing the other records within the blockchain network. In this way, some or all of the information pertaining to the ecosystem layer may be interrogated by one or more participating entities according to the schema. In some embodiments, some record keeping activities (e.g., at least a subset of data) in accordance with the schema may be enforced within the ecosystem layer, such as collectively by the body of different entities operating respective platform servers 130.

A data structure specified by the schema may be stored off-chain, or as node content on-chain by one or more transactions, and may be a machine-readable portion, such as a portion of key-value pairs in dictionaries encoded as a hierarchical data serialization format, like JavaScript™ object notation (JSON) or extensible markup language (XML). In some embodiments, the off-chain portion may be a human-readable format including unstructured natural language text that describes in prose information about a transaction (or transaction) and the on-chain portion comprises key-value pairs by which off-chain information may be verified. Or in some embodiments, this allocation may be reversed, intermingled, or otherwise differently arranged, which is not to suggest that any other feature herein is not also amenable to variation relative to the arrangements described.

In some embodiments, content of nodes of the directed acyclic graph 105 of cryptographic hash pointers may be verified as having not been subject to tampering by determining whether that content is consistent with one or more chains, or other associative data structures (e.g., trees), of cryptographic hash pointers of the directed acyclic graph. In some embodiments, nodes of the directed acyclic graph of cryptographic hash pointers may include as node content a node identifier (e.g., an address in the graph) that distinguishes a node from other nodes of the graph, identifiers or one or more other nodes of the graph to which a cryptographic hash pointer of that node points, and an associated cryptographic hash values based on node content of those other identified nodes to which the cryptographic hash pointers point (in some cases, the pointing is from one and only one node to one and only one node for adjacent nodes). As additional nodes are appended to the directed acyclic graph, a chain of cryptographic hash pointers may be formed such that each subsequent node includes as node content one or more cryptographic hash values based upon some, and in some cases all of the previously published information published to the directed acyclic graph of cryptographic hash pointers. In some embodiments, following these pointers may be requested by a function, like an sload function, that verifies that stored records have not be tampered with or are subject to other transactions, such as prior to an analysis of the records for computing network effects.

The directed acyclic graph 105 of cryptographic hash pointers need not be referred to as a graph, or as having nodes or edges, in program code to constitute a graph, provided that a data structure encodes the same information, even if that data structure bears different labels. Similar qualifications apply to records and transactions described herein. For instance, graphs may be encoded in objects in object-oriented programming environment, key-value pairs, entries in a relational database, documents encoded in a hierarchical data serialization format, or combinations thereof, without being labeled as graphs.

In some embodiments, a contributor 125 registers with an entity of the ecosystem layer, such as by a registration process, and registered users may contribute content items. A contributor may specify an address on the blockchain network, such as an address to which computing nodes 101 may transfer digital bearer assets. For example, the address may be an address derived from a public key of a public-private key-pair associated with a wallet 127 of the contributor 125. In some embodiments, a platform server 130 or other entity generates the public-private key-pair and associated address and the contributor uses an account interface of the platform server to perform operations associated with the addresses on the blockchain network. In some embodiments the private-key may reside with the contributor 125 (e.g., in the wallet 127), but another entity may streamline one or more operations pertaining to one or more specified addresses. In some cases, a registration process includes creation of a record corresponding to the contributor, like a contributor record 139, which may include a current address on the blockchain network for the contributor and a ContributorID, like an email or username (e.g., backed by an associated password), by which the contributor may access and manage at least some aspects of their contributor record 139 and contribute content or other assets under their ContributorID. In some embodiments, a platform server 130 maintains contributor records 139 of contributors to the platform it provides. In some embodiments, contributor records 139 or a representation thereof are stored as records within the directed acyclic graph 105 (and, thus, some embodiments of a ContributorID may be a cryptographic hash address corresponding to a record within the directed acyclic graph 105 or associated therewith). Some embodiments of ContributorID may include an assigned ContributorID, which may be a cryptographic hash, such as a cryptographic hash of the email or username, or a combination of information. In some embodiments, each ContributorID may be unique (e.g., in the sense that a given ContributorID does not collide with another ContributorID), like a unique identifier, and correspond to a given contributor A contributor 125 may upload generated content (or representation of a different good or service), such as via their computing device, to the CDN 140. In some embodiment, the contributor 125 may upload content through an interface of a platform server 130, like via an API 136, and the platform server may store the content within the CDN 140. Content items 147 stored within a storage 145 of the CDN 140 may include an assigned ContentID, which may be a cryptographic hash, such as a cryptographic hash of the content, or a combination of information, like the content, ContributorID, and associated timestamp of when the content was uploaded. In some embodiments, each ContentID may be unique (e.g., in the sense that a given ContentID does not collide with another ContentID), like a unique identifier, and correspond to a content item (or asset or record thereof) 147 uploaded, created, or otherwise specified on the CDN 140. In some embodiments, each content items 147 stored within a storage 145 of the CDN 140 may be associated with a ContributorID, such as that of the contributor that uploaded, created, or otherwise specified the content item (or asset or record thereof) 147 on the CDN 140, and the ContributorID (e.g., as a unique identifier) may serve as a top-level identifier with which ContentIDs are associated. In other words, ContentIDs may be assigned uniquely within the namespace of a given ContributorID and not necessarily uniquely across all ContentIDs (e.g., a ContributorID+ContentID within the namespace of the ContributorID serves to uniquely identify content rather than a ContentID alone). In some embodiments, such as where the CDN 140 is a distributed file storage system, the ContentID may be a cryptographic hash address of the content. Accordingly, depending on the embodiment, the CDN 140 may generate and return the ContentID to the platform server 130 or the platform server 130 may generate the ContentID. In either instance, a content item may be identified by a ContentID (e.g., like a key-value pair) and the ContentID may be associated with the contributor that uploaded the content, such by the ContributorID within a contributor record 139 (e.g., like a key-value pair). For example, a contributor record 139 may store information operable to identify the content which that contributor uploaded. In some embodiments, the information or representations of the information stored within a contributor record 139 may be stored within the blockchain network, such as within node content of a directed acyclic graph 105. For example, a contributor records 139 within the blockchain network may be referenced in association with one or more other records, such as by new versions of the contributor record or records of content uploaded by the contributor.

In some embodiments, a consumer 120 registers with an entity of the ecosystem layer, such as by a registration process, and registered users may access content items. A consumer may specify payment information, like a credit card or other account information, to purchase access to content items. Access may be granted on a subscription basis, like a monthly fee, for a specific content item or other assets, like a one-time use fee or purchase of a content item or other asset, or for an amount of access, like X many hours, days, and the like. In some cases, a registration process includes creation of a record corresponding to the consumer, like a consumer record 137, which may include a ConsumerID, like an email or username (e.g., backed by an associated password), by which the consumer may access and manage at least some aspects of their consumer record 137 and consume content or other assets under their ConsumerID. Some embodiments of a ConsumerID may include an assigned ConsumerID, which may be a cryptographic hash, such as a cryptographic hash of the email or username, or a combination of information. In some embodiments, each ConsumerID may be unique (e.g., in the sense that a given ConsumerID does not collide with another ConsumerID), like a unique identifier, and correspond to a given consumer.

In some embodiments, consumer 120 access of content items (or other assets, like a good or service) is tracked within the system. For example, a platform server 130 may provide an online application or webpage including an index of available content items which a user may access by providing credentials, such as a ConsumerID and associated password. The platform server 130 may use cookies, JavaScript libraries, and the like to track interactions of the ConsumerID with content items (or other assets, like a good or service). In some embodiments, unregistered users may browse, preview, or otherwise access at least some information about the content items or other assets, like on a trial basis, to decide whether to register and purchase access. Cookies, JavaScript libraries, and the like may track the interactions of those unregistered users to determine the content or assets they interact with (e.g., which content or asset was their entry point, exit point, or in-between those points) prior to registration with the system. Similarly, interactions of registered users with content or assets may be tracked to determine which content or assets they interact with prior to a payment (e.g., for a subscription) or between payments. Information about tracked interactions may be stored in or in association with a consumer record 137 to determine award allocations due to contributors (e.g., those contributors which influenced the user to register/subscribe/renew subscription/other pay for content or asset).

Example embodiments of a platform server 130 or other entity within the ecosystem layer may provide a portal that allows consumers 120 to access content or other assets contributors 125 provide to the ecosystem. In some embodiments, the portal requests and retrieves information via an API 136 of the platform server 130. Accordingly, examples of a portal may include, but are not limited to, one or more web pages, a web application or other application, like of a native application executed on a computing device of a user. Web pages and web applications may be accessed via a web browsing application executing on a computing device. Examples of native applications include mobile applications executed on mobile computing devices, desktop applications executed on desktop computing devices, and media applications executed on media servers, gaming devices, televisions, and the like. Example web pages and applications, like those mentioned above, may display one or more user interfaces. Example interfaces may include a registration interface, a login interface for registered users, interfaces for browsing content or other assets, like an index of content items or other assets corresponding content items 147 maintained within a storage 145 of the CDN 140, interfaces for viewing content or other assets, and the like. When a consumer 120 registers with the platform server 130, in some embodiments, a consumer record 137 is established for the consumer (e.g., with a ConsumerID, associated credentials, payment information, and other information). Similarly, when a contributor 125 registers with the platform server 130, in some embodiments, a contributor record 139 is established for the contributor (e.g., with a ContributorID, associated credentials, and digital asset address on a blockchain network). In some cases, each participating contributor (and optionally consumer), may compute a public/private cryptographic key pair, and the public key may serve as an identifier of that entity in the illustrated computing environment. Various asymmetric key techniques may be applied, including Diffie-Hellman, ElGama, elliptic curve, RSA, and the like. Similarly, the platform server 130 may compute a public/private cryptographic key pair, and the public key may serve as an identifier of the platform server in the illustrated computing environment. In some embodiments, a public/private key-pair of the platform server 130 corresponds to a wallet 134 of the platform server. Accordingly, like contributors, a platform server may receive awards based consumer interaction with the platform it provides at an address associated with the wallet 134, and the platform server may transact those awards. Additionally, in some embodiments, an address associated with the wallet 134 of the platform server 130 may provide transaction fees for storage of records within the directed acyclic graph 105, processing by smart contracts, and the like.

Example interfaces may also include an interface for providing content or other assets to the ecosystem. For example, an interface may provide options for uploading content, description of the content, title of the content, and the like. Different interfaces may be used for different types of content, such as video, audio, images, and text, and those different interfaces may include content-type specific options. Different interfaces may also be used for different types of assets, such as a type of good, type of service, and the like. An interface for offering rideshare services may include options for specifying a type of vehicle, capacity, and the like whereas an interface for offering a housing-share or hotel accommodation may include options for specifying a number of permitted occupants and other information about the accommodation.

When a content item or other asset is on-boarded, a contributor may provide credentials, such as via a login page, so that content items or other assets are associated with their contributor. In the example of a content item, the content item may be processed, assigned an identifier, like a ContentID, and stored within a storage 145 of a CDN 140. A contributor record 139 corresponding to the contributor may be updated to include the ContentID of the content. The CDN 140 may include the content items or other assets themselves or a representation thereof (e.g., for content items or assets hosted at another system, physical items, or services). For example, storage 145 may include media files available for streaming or download. In another example, storage 145 may include a representation or reference to a media file available at another entity. As yet another example, storage 145 may include a representation of a hotel room available for reservation. Some or all of the representative information may also be stored as records within the directed acyclic graph 105 and referenced, or otherwise associated with stored content items 147 or vice versa. In some embodiments, storage 145 contains one or more keys (e.g., like a decryption key, public key, etc.) by which data may be referenced or accessed.

In some embodiments, a platform server 130 includes a tabulator 132. In some embodiments, the tabulator 132 is configured to compute off-chain record information, such as in consumer, contributor, and content item records. For example, the tabulator 132 may submit payment information received from a consumer 120 to a payment processor, such as in response to a consumer purchase or automatically as a renewal of a subscription. In turn, in some embodiments, the tabulator 132 is configured to receive payment verification information from a payment processor and match the payment information a record, like a consumer record, to verify a subscription fee or other payment received from a consumer 120. Based on the tabulated information, such as when the tabulated information meets certain criteria, like verification of a received payment, the tabulator 132 may call a smart contract to execute a function. One example function may be a burn function of a smart contract.

The tabulator 132 may also tabulate other record information as described herein to create or modify records locally and store record information to the directed acyclic graph 105. The tabulator 132 may analyze and provide information about local records, such as utilization data pertaining to consumer interaction with the platform or content or other assets provided by contributors. For example, the tabulator 132 may respond to a request for a current cycle of utilization data for determining attribution awards or respond to a request for a current allocation of attribution awards.

In some embodiments, the tabulator 132 may be configured to tabulate transaction and record information within the directed acyclic graph 105 pertaining to the platform, other platforms, and other entities within the ecosystem layer. Based on the tabulated information, such as when the tabulated information meets certain criteria, the tabulator 132 may call a smart contract to execute a function. One example function may be a mint function of a smart contract. Which, for example, may include or call a distribution function to distribute amounts of the digital bearer assets minted to specified addresses.

Figure 1B:
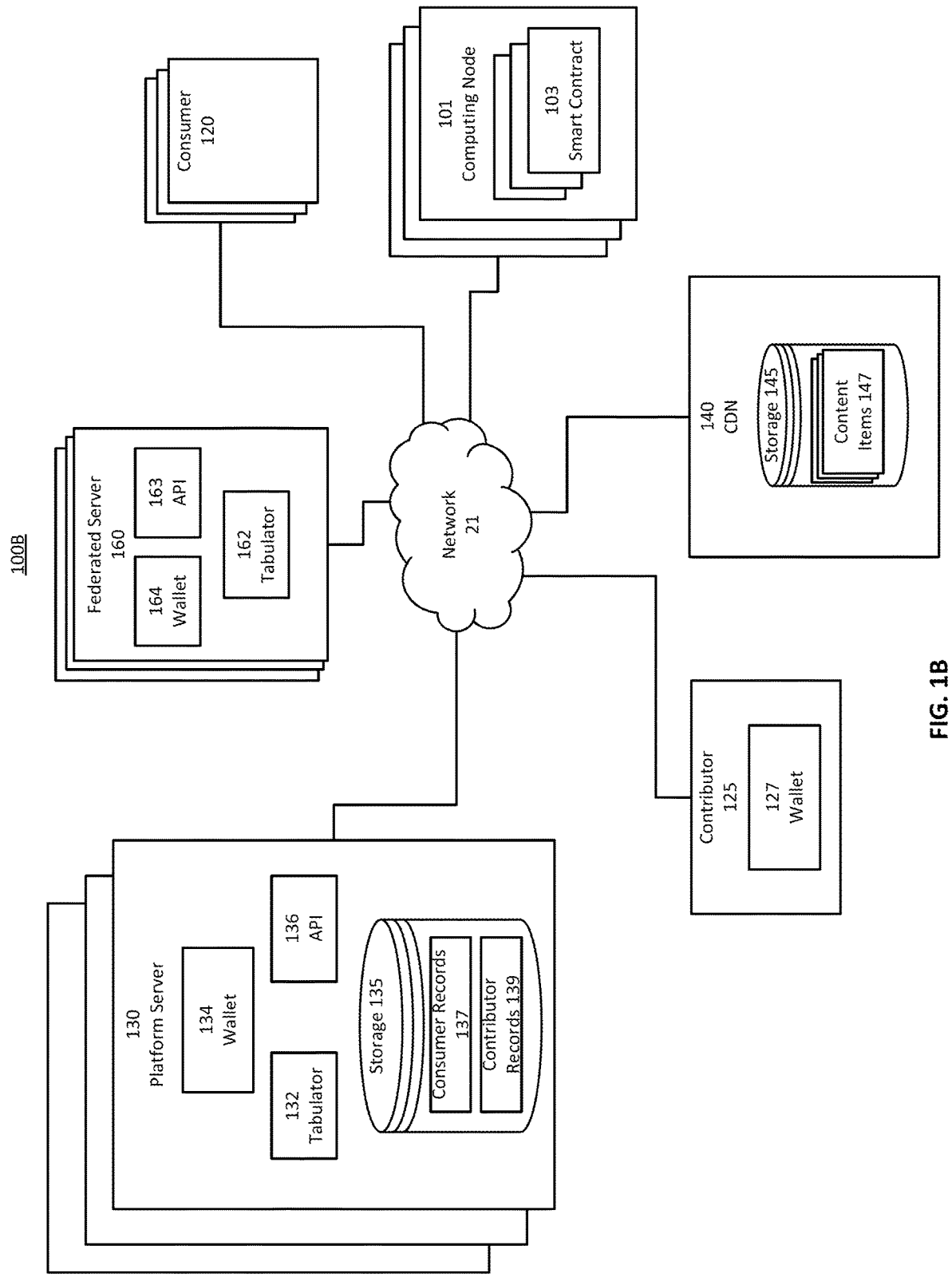

FIG. 1B is a block diagram depicting an environment 100B in which various entities interact in at least some example embodiments. For example, FIG. 1B depicts platform server 130, federated server 160, contributor 125, and computing node 101, which may communicate directly or indirectly over a network 21. Various embodiments may also include content delivery network 140 and consumers 120. Consumers 120 may communicate with one or more platform servers 130 or other entities and may receive content or assets or information about different content or assets directly or indirectly from a CDN 140 over a network 21. Although not shown, in some embodiments, different platform servers 130 may use different CDNs 140, or different subsets of a CDN 140. In some embodiments, the network 21 includes the public Internet and a plurality of different local area networks. Depending on the embodiments, a platform server 130 or federated server 160 may communicate with a computing node 101 and one or more other entities over the network 21. Similarly, the computing node 101 may communicate with one or more other entities over the network 21.

Over the example environment 100A of FIG. 1B, the environment 100B of FIG. 1B includes a plurality of platform servers 130 and federated servers 160. In some embodiments, the federated servers 160 perform one or more functions offloaded from a platform server 130 or network of platform servers. In some embodiments, example federated server 160 provides an interface, like API 163, by which one or more functions may be called (e.g., by a platform) and by which federated servers may exchange data like results or verification of results. In some embodiments, a federated server 160 implements ecosystem layer protocols, which may include verification of results or participating in a consensus protocol governing execution of a smart contract, which version of a smart contract to execute, or other operation. In some embodiments, operators of a platform may be permitted to operate one or more federated servers, an amount which may be agreed upon by virtue of existing federated servers agreeing, according to a consensus protocol, whether to permit any new federated server to participate within the ecosystem layer (e.g., by agreement upon a record or smart contract having the new federated server whitelisted, such as by public key of the new federated server 160).

In some embodiments, a federated server 160 supports a platform, such as by supporting one or more platform servers 160 implementing the platform. In some embodiments, that federated server includes a tabulator 162, which may tabulate data received from one or more platform servers, CDNs, or other entities associated with a platform to determine award allocations for a platform. For example, tabulator 162 may be configured to tabulate off-chain record information, such as utilization data or other data reports generated by a platform server 130 based on consumer, contributor, and content item records. For example, the tabulator 162 verify payment information received onto a platform from a consumer 120 and reported by a platform server 130 or payment processor. Based on the tabulated information, such as when the tabulated information meets certain criteria, like verification of a received payment, the tabulator 162 may call a smart contract to execute a function, like a burn function of a smart contract. Where that federated server 160 supports a specific set of platform servers, the federated server may include a wallet 164 having one or more addresses by which gas fees, digital bearer assets for burning, and the like may be held. In addition, rewards to the federated server 160 for participation within the ecosystem layer may be awarded to an address associated with the wallet 164.

The tabulator 162 may also tabulate other record information as described herein to create or modify records locally and store record information to a graph. The tabulator 162 may analyze and provide information about local records, such as utilization data pertaining to consumer interaction with the platform or content or other assets provided by contributors. For example, the tabulator 162 may respond to a request for a current cycle of utilization data for determining attribution awards or respond to a request for a current allocation of attribution awards, and the tabulator 162 may verify results reported by other federated servers. For example, in some embodiments, federated servers may reach consensus based on tabulated information from records within a blockchain to perform one or more operations, like call a smart contract.

In some embodiments, the tabulator 162 may be configured to tabulate transaction and record information within a graph, like a directed acyclic graph, pertaining to the platform, other platforms, and other entities within the ecosystem layer. Based on the tabulated information, such as when the tabulated information meets certain criteria, the tabulator 164 may report results, such as to other federated servers via an API 163. Similarly, the tabulator 164 may verify results reported by other federated servers. The tabulator 162 may sign (e.g., by digital signature with a private key verifiable by a whitelisted public key) results that are verified to confer agreement with those results, and those results may be considered authoritative based on agreement by a majority of federated servers. Records of results and records of verification may be stored within the directed acyclic graph. In turn, subject to agreement upon results by a majority (or other threshold number) of federated servers, a smart contract may accept those results to execute a function. One example function may be a mint function of a smart contract. Another example of results which may be agreed upon are distribution amounts of minted digital bearer assets. For example, the mint function may include or call a distribution function to distribute amounts of the digital bearer assets minted to specified addresses. In some embodiments, a smart contract may access one or more records of verified results, like digital signatures of results, and verify the digital signatures based on whitelisted public keys (e.g., of authorized federated servers or platforms). Thus, for example, a smart contract may determine whether there exists a threshold number of signatories having approved a given result (e.g., such that unauthorized or nefarious entities cannot call certain functions or purport agreement upon results not actually agreed upon).

Different embodiments may distribute functions between platforms servers and federated servers in other ways. Moreover, a federated server and platform server may be collocated on a server and executed within different virtual machines, containers, or other means. Alternatively, they may be disparately located or executed within a cloud computing system coupled to the network. In some embodiments, a platform server 130 performs all of the aforementioned operations of a federated server 160. In other embodiments, a federated server 160 executes at least some of the aforementioned operations and may execute one or more addition operations described herein with respect to a platform server (or even a smart contract). In some embodiments, one or more of the aforementioned operations are implemented by smart contract and executed by one or more computing nodes 101. In turn, those computing nodes 101 may reach consensus on results and execute smart contracts implementing the logic described herein to receive a portion of awards (e.g., rather than federated servers).

In the content of the example environments of FIG. 1A and FIG. 1B, as a consumer 120 (through their computing device) accesses or otherwise interacts with content or other assets provided by contributors 125 to a given platform 130, those interactions may be monitored and stored in or appended to a record, such as a consumer record. The record may be stored locally by one or more of a platform server or federated server or within a blockchain (e.g., by a computing node 101 or a federated server) or similar data structure. In some embodiments, the record is appended to a blockchain-based or blockchain-like distributed data structure. In some embodiments, the record is part of a subgraph within a larger blockchain-based or blockchain-like distributed data structure. In some embodiments, that graph or subgraph of the record of consumer interactions (e.g., utilization data) may be analyzed to determine measures of centrality of content or assets or contributors of content or assets with which a consumer or multiple consumers interact. Or in some cases, utilization data may be stored off-chain. In some cases, periodically or responsive to some event, like adding an entry, a cryptographic hash of the off-chain data structure may be recorded in a blockchain-based or blockchain-like data structure, on-chain, to deter tampering with the off-chain record, by making such tampering evident to an auditing entity. Various cryptographic hash functions may be applied, including SHA-2, SHA-3, BLAKE2, and the like. The function may deterministically transform an input of arbitrary length (e.g., longer than the output) into a fixed length output. The function may be a one-way function for which it is computationally infeasible to determine out to modify an input the attain a designated output, and relatively small edit distances in the input (e.g., a single character) may produce relatively large edit distances in the output (e.g., more than 10 digits).

Utilization data for a consumer, like utilization data tabulated by one or more tabulators with respect to a ConsumerID of that consumer, may be periodically processed to determine network values for content or assets and contributors of that content or assets based on the consumer's interactions, e.g., taking into account both current interactions as well as past interactions determined to influence consumer input (e.g., monetary input as subscription fees, rental fees, reservation fees, purchase fees, etc.) onto the platform with which the content or asserts reside. According to some embodiments, a platform server or federated server associated with a given platform determines values for content items or assets accessible via the platform. In some embodiments, one or more other entities like other platform servers, federated servers, or smart contract may audit those values (e.g., based on records within a blockchain network or other reported records). In another embodiment, such as where utilization data is resident on a blockchain network or other auditable data structure, a computing node may execute code (e.g., a smart contract or other code) to determine values for content items or assets accessible via a given platform. In some embodiments, a smart contract may include code that automatically executes when specified conditions are met. In some embodiments, smart contracts may be stored within the blockchain network. In other embodiments, smart contracts may reside elsewhere, e.g., on peer computing nodes, at network addresses of an address space of a decentralized computing platform. In some cases, the smart contract may be stored on each peer computing node, or on a subset of peer computing nodes. In some cases, each invocation of a smart contract (e.g., after a call with a set of arguments) may cause the peer computing nodes (or a subset thereof) to redundantly execute the smart contract and determine an outcome by consensus, e.g., with Paxos, Raft, Chandra-Toueg, Hotstuff, etc. In some cases, the right to participate in the consensus determination may be conditioned on some form of proof by peer nodes, e.g., proof of work by computing a hash collision, proof of storage, proof of stake, or proof of identity. In some embodiments, a network of platform server, federated servers, or combination thereof determine an outcome by consensus, and a smart contract may verify that consensus was reached based on verification of signatures (e.g., of the outcome) by authorized signatories (e.g., according to a protocol of a public-private key signature verification).

Values determined for content or other assets may be aggregated by contributor (e.g., where a contributor provides multiple content items or other assets) to determine values for contributors, such as by ContributorID. In other words, a value may be determined for a given asset and values for assets provided by a same contributor may be aggregated to determine a value for the contributor. Embodiments may determine a value of a contributor in a variety of different ways to allocate rewards share to different contributors and, as such, the examples provided herein should not be construed as limiting. For example, utilization data could be tracked by ContributorID (or provided assets) (e.g., view count for contributor or asset) and value determined relative to an aggregate consumer utilization measure (e.g., number of views, reservations, or other measure, on the platform etc.) instead of or in combination with other value determinations described herein. Contributors may specify an account address on a blockchain network for receiving digital bearer assets as rewards based on their value. In some embodiments, a ContributorID may be an account address on a blockchain network or otherwise associated with an account address. Thus, a value-address combination, such as a key-value pair, may be input into an attribution process and the process executed to determine the number of network attribution awards owed to each contributor. The network attribution awards may then be distributed according to a network ruleset to the corresponding contributor identifiers on the blockchain network. According to some embodiments, the attribution process and distribution of network attribution awards may be executed by smart contract. In some embodiments, some functions, such as contributor value determination, may be performed by platforms or federated servers, for which the attribution process executed by smart contract may determine allocations of awards to the different platforms (e.g., based on platform value generated, which may be determined based on burn transactions associated with the platforms), and determine amounts owed to contributors to a platform based on the values associated with the contributors by the platform and the amount of awards allocated to that platform. In some embodiments, the attribution process and distribution of network attribution awards may be implemented (or at least a portion thereof) via a smart contract stored in the blockchain network or other auditable distributed data structure.

According to some embodiments, execution of a smart contract according to a protocol of the ecosystem layer encoded in the smart contract and protocols of the underlying blockchain network confers awards to one or more entities, such as those entities executing the smart contract. In some embodiments, a smart contract implementing aspects of the attribution process and distribution of network attribution awards allocates an amount of awards (or other type of aggregate network-effect score, like an in-game score, rating, level advancement determination through a ranking, or the like) to those computing nodes. For example, the smart contract may be authorized to create a specified amount network attribution awards at the occurrence of predefined or dynamically determined event, and the computing nodes (e.g., honest computing nodes) may collectively verify occurrence of those events and results of execution, thereby agreeing on a state in which network attribution awards were conferred. In some embodiments, a smart contract may identify those computing nodes based on reported results and distribute a portion of rewards to compensate those computing nodes (e.g., to a wallet address thereof in an address space of the blockchain network). In other embodiments, entities operating computing nodes may be compensated in the form of fees, like transaction fees, which may be supplied by an entity requesting execution of a smart contract.

The below described processes may be implemented in accordance with one or more of the above described embodiments of example computing environments illustrated in FIG. 1A or FIG. 1B.

Figure 2:
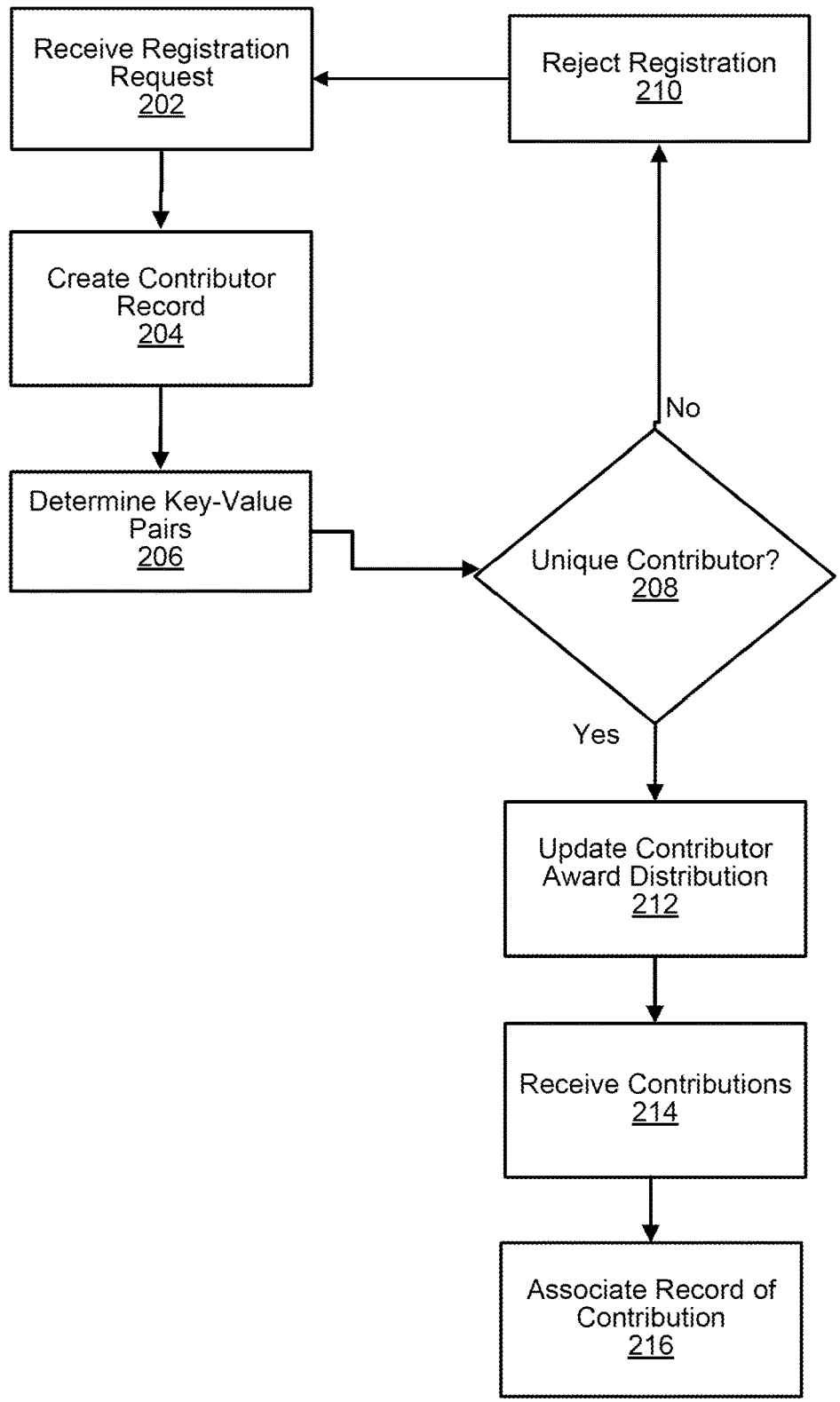
FIG. 2 is a flowchart depicting an example of a process by which contributors may provide assets or other content items for consumer access in accordance with some embodiments.

FIG. 2 illustrates an example process performed by a platform server in accordance with at least some embodiments. For example, a platform server or other entity discussed with reference to FIG. 1A or 1B may execute the process 200 to register a contributor and onboard content or other assets from the contributor. Other entities within the ecosystem layer may perform a similar process, or one or more steps of the process, depending on the embodiment. By way of example, in some embodiments, a federated server or computing node (e.g., by execution of a smart contract) may perform the process 200 described below.

A user that desires to contribute content or other assets to a platform, such as a platform provided by a platform server, may register (via their computing device) with the platform server as a contributor. In one example, an online media platform may provide consumers with access to video, audio, and other media content uploaded by a variety of contributors. In another example, an online accommodation platform may provide consumers with access to hotel rooms and other vacation rental properties listed by a variety of contributors. Other example platforms are also described herein.

At step 202, a platform server may receive a registration request from a contributor. For example, a contributor (via their computer) may navigate to a registration interface of a web application, native application, or webpage. The registration interface may include a plurality of options, fields, and the like for a contributor to provide registration information. For example, the contributor may create login credentials, such as by entering an email or create a username and specifying a password. In some embodiments, the registration request includes an address associated with the contributor on a blockchain network. In some embodiments, an address on a blockchain network is generated for the contributor.

In accordance with at least some embodiments, the address may be based on a public key of a key-pair, like a public-private key-pair, where the address is operable to receive and hold digital bearer assets on the blockchain network and the private key (or key based on the private key) is operable to transfer or exchange digital bearer assets held at the address. The public-private key-pair may be generated in compliance with a public key infrastructure. For example, a private key may be generated and then a public key derived from the private key with cryptographic algorithms. In various embodiments, a contributor executes a protocol for creating a one or more private keys, which are then used as inputs to derive their public key pairs. In some embodiments, private keys are generated by a device of the contributor, which may include a secure element for generating one or more cryptographic keys. For example, an application, like a wallet application, may be executed on the device of the contributor to generate one or more private keys, for which the contributor may obtain a public key or corresponding address. In some embodiments, the address is based on the public key and generated according to a cryptographic algorithm of a blockchain network for creating an address corresponding to a public key. In some embodiments, a key-pair may be generated for the contributor, such as by the platform service, and stored securely by the platform service, such as in an encrypted format.

At step 204, the platform server creates a record of the contributor, like a contributor record, and binds a public key to the record. The record may also include login credentials, which may be cryptographic hashes of the credentials, such that the contributor can prove ownership of the record and optionally modify or update record information. For example, a contributor may login to the platform server and update an address on the blockchain network for receiving digital bearer assets. In other embodiments, a contributor may create an address on the blockchain network for receiving digital bearer assets and communicate the address to the platform. For example, a given contributor may generate a private key and a public key, retain the private key, and provide the public key (or address on the blockchain network based on the public key) to the platform. A record for a given contributor may be updated to include additional or other addresses or public keys. In some embodiments, the public key, other value, or combination of values is selected as a ContributorID or is cryptographically hashed and selected as a ContributorID. In some embodiments, the contributor record is identified by the ContributorID, like in a database of key-value pairs, where different keys may reference a ContributorID. Various combinations of keys and values may be used, for example, in some embodiments, an address (e.g., as a key) may be identified within or determined based on transaction information on a blockchain network and the platform service may identify a ContributorID value to obtain the corresponding record (e.g., ContributorIDs may be used as record number or mapped to a location of the record in a database) of the contributor. In another example, the platform server creates a contributor record and stores the contributor record to a blockchain network, the record accessible by a cryptographic hash address of the record (which, e.g., may be the ContributorID or mapped to a ContributorID). In some embodiments the ContributorID is platform specific and may serve as a key to identify an address of the contributor. The address may also be a key to identify a ContributorID value and different combinations of keys and values may be used to identify and use contributor records and their associated information in different ways as discussed herein.

At step 206, the platform server determines one or more key-value pairs as described above for a contributor record, at least one key-value pair associating an address of the contributor with a unique identifier of the contributor (e.g., a ContributorID). In some embodiments, the platform server determines whether to establish a key-value pair in response to determining whether one or more keys are unique to the contributor 208. For example, the platform server may verify the validity of the address of the contributor, such as by determining that the address is not in use on a blockchain network, which may optionally include requesting the public key on which the address is based, computing an address according to the public key, verifying the addresses match, and optionally verifying a signature (e.g., of the address or other data signed with the private key) to ensure the contributor has access to the necessary private key (e.g., to ensure the contributor can access digital bearer assets transferred to the address). If the address is duplicative on the blockchain network or cannot be verified, the platform server may reject 210 the registration request.

In some embodiments, at step 206, the platform server determines a second key-value pair to associate the ContributorID with a contributor record. The platform server may determine whether the ContributorID is unique 208 within the ContributorID space for retrieving records. For example, the platform service may determine that any new ContributorID does not collide with existing ContributorIDs. In some embodiments, the platform server publishes the ContributorID, like amongst a plurality of other platform servers, to determine whether the ContributorID is a duplicate, e.g., by detecting hash collisions and rejecting duplicates. The platform server (and other platform servers) may publish ContributorIDs and reject registration requests 210 having duplicate ContributorIDs during the registration process to ensure a contributor is individually identifiable for allocating and tracking rewards to the contributor. In some embodiments, preservation of the uniqueness of values within the ContributorID spaces serves to mitigate attacks on contributor identities and may enable identification of the platform server that originated the ContributorID (e.g., for a multi-platform ecosystem in which some digital bearer assets may be allocated to participating platforms).

If the registration request is not rejected (e.g., in response to determining that the registration request is not rejected), the platform server updates the contributor award distribution at step 212. In some embodiments, updating the contributor award distribution includes storing the ContributorID and the address to a list of key-value pairs authorized to receive awards. In some embodiments, the platform server updates the contributor award distribution by publishing the ContributorID and addresses to one or more other servers which may maintain a list of ContributorIDs and addresses for one or more platforms. For example, ContributorIDs and their addresses may be associated with a public key or other identifier of the platform contributors registered with, such as through the above described process 200.

In some embodiments, one or more of the above steps are encoded in a smart contract called by a platform server (or other entity) and executed by one or more computing nodes. For example, a platform server may structure a registration request and call a smart contract by the address of the smart contract. In turn, a computing node may receive 202 the request, obtain the smart contract at the specified address, and execute the smart contract on the information provided in the registration request. For example, the smart contract, when executed by a computing node, may create 204 a contributor record, determine 206 key-values pairs for the contributor record and whether those keys are unique, and update 212 contributor award distribution by effecting a transaction to store the contributor record to the blockchain network. Other computing nodes may execute one or more portions of the smart contract to verify results, like uniqueness of one or more keys, and report those results. In some embodiments, a plurality of computing nodes, like a consensus of computing nodes, agree upon the results and whether the contributor record is published (e.g., in a blockchain or other immutable data store) on the blockchain network. An executed smart contract may also return results to the requesting entity, such as the platform server, by returning key-value pair information, like the verified address, unique ContributorID, and transaction ID/address of the contributor record on a blockchain. In some embodiments, a smart contract may permit only authorized platform servers to register contributors, such as by signature verification of a registration request based on a public key of the platform server matching a list of public keys of authorized platform servers. The list of public keys corresponding to authorized entities may be published to the blockchain, such as within the smart contract or record accessible by the smart contract.

At step 214, a platform server may receive, from a registered contributor, contributions to the platform. For example, a contributor may login to the platform server or otherwise provide credentials when contributing to the platform. In some embodiments, a contributor provides a username and password to login to the platform and navigates to an interface for providing a contribution, such as by uploading content or specifying information about an asset. Depending on the type of contribution, different information may be requested and collected via the interface. For example, the platform server may receive a user selection of a content type or other asset type. In some embodiments a contributor may select a content type or asset type to contribute from a list, like a menu or sub-menu, from a user interface or through a sequence of interfaces. Available content and asset types may depend on a platform of the platform server. For example, a platform for providing media content to consumers may provide a menu for selecting video, audio, etc. while a platform for providing accommodations to consumers may provider a menu for selecting hotel room, extended stay hotel room, condo, home, camp site, etc. In either instance, as well as for other types of content and assets, one or more user interfaces are generated with options for the contributor to provide information about the content or asset type. In some cases, content type may be inferred, such as in response to a contributor uploading a file, and a content type may be determined based on file type (e.g., video for .wmv or .mov or audio for .mp3).

Thus, generally, at step 214, a record of the contribution may be created. The record may range from the contribution itself, like a content item with corresponding metadata, to a representation of an asset, like a description of the asset with one or more images of the asset, rating, associated cost, rate, location, and the like. The process may further include generating a unique identifier of the record, like a ContentID. An example ContentID may be a cryptographic hash of the record, e.g., a cryptographic hash of a file or entry corresponding to the record within a database.

Some embodiments may determine whether the record or information of the record (e.g., a file or other data) is a duplicate of an existing record or information of an existing record, e.g., by detecting hash collisions and rejecting duplicates. Other types of analysis may also be used to detect and reject duplicates, such as one or more transforms of audio or video data to enable comparisons between various media files or various image recognition techniques. For example, on some platforms, it may be desirable to detect and reject duplicate contributions or detect and reject unauthorized contributions, like content or assets a contributor does not have rights to contribute or objectional content. Thus, in some embodiments, received contributions are filtered before being made accessible to consumers.

At step 216, the record of the contribution is associated with the contributor. For example, a ContributorID may be appended to the record of the contribution or otherwise associated with the contribution record. In some embodiments, the ContentID is associated with the ContributorID, such as in a key-value store, such that the ContentID is operable to identify the ContributorID. In some embodiments, the ContentID is associated with the ContributorID, such as by adding the ContentID to a listing of contributions in a contributor record.

In some embodiments, a record of the contribution may be stored within a blockchain network, such as according to a specified schema for recording contributions. Accordingly, in some embodiments, a cryptographic hash address of the record within the blockchain network may serve as the ContentID. In some embodiments, such as for media content, the media content may be stored within a content delivery network and the record stored within the blockchain network. In some embodiments, the content delivery network is a distributed file storage system, and the location of the media content when stored within the distributed file storage system, like a cryptographic hash address, may also serve as the ContentID. In some embodiments, one or more of steps 214 and 216 are performed by a computing node executing a smart contract which returns results, like a cryptographic hash address of the record, to the platform which the smart contract corresponds. In some embodiments, steps may be performed in different orders, steps added, alternative steps performed, or steps omitted. By way of example, additional steps may be performed to avoid duplicate or unauthorized contributions, and records, associations, and the like may be formed in different orders or use alternative data structures, which is not to suggest that other descriptions are limiting.

Figure 3A:
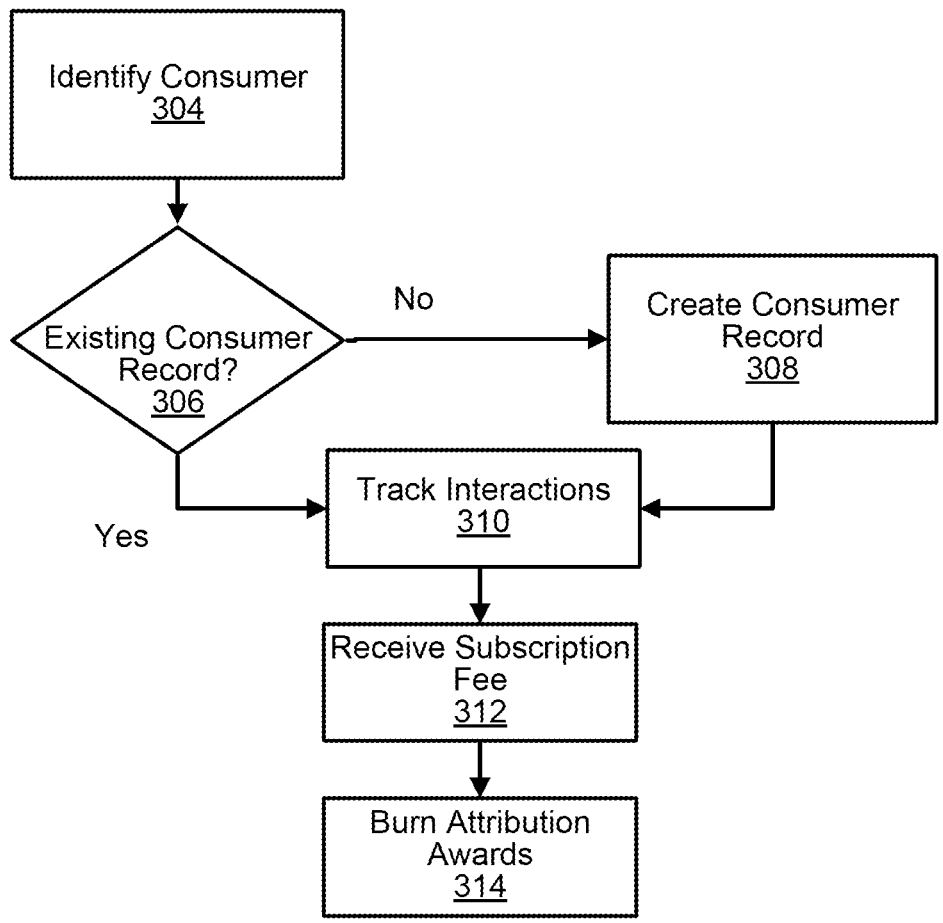
FIG. 3A is a flowchart depicting an example of a process by which consumers may access assets or other content items in accordance with some embodiments.

FIG. 3A is a flow chart illustrating an example process 300A of consumer record creation according to some embodiments. In some embodiments, a platform server performs the steps of process 300A. In some embodiments, one or more entities within an ecosystem layer perform one or more of the steps of process 300A, such as one or more entities described with reference to FIG. 1A or FIG. 1B. For example, in some embodiments, a platform server or federated server may perform one or more steps of process 300A. In some embodiments, one or more computing nodes of a blockchain network (or distributed file storage system) perform one or more of the steps of process 300A, such as by execution of a smart contract.

According to some embodiments, a consumer may be identified 304 when the consumer (via their computing device) interacts with a platform server. In some embodiments, the platform server tracks the interactions. In some embodiments, another server in addition to or instead of the platforms server tracks one or more of the interactions. In either instance, as described previously, a platform server may provide a web page, web application, native application or other means by which a computing device of a consumer may interface with the platform server to access contributions. For example, a consumer may execute a web browsing application and navigate to a web page to view and access uploaded content items, such as videos, or interact with other types of assets. Cookies, JavaScript, or other tracking means may establish one or more identifiers operable to identify a given computing device of a consumer or identity of a consumer. In some embodiments, an identifier is relatively unique and relatively stable. A unique and stable identifier may be able to, in many cases, identify a given computing device and consumer from among other computing devices used by other consumers during the course of a browsing session and sometimes longer, such as over the course of a day, week, until a cache of the browser is cleared, etc. The computing device may report an identifier in a cookie value in association with an HTTP request or response, in a JavaScript request or response, in a request to an application programming interface, or by other means.

Thus, an identifier for a computing device may be received in association with an interaction of the computing device with a platform server or other entity within the ecosystem layer, and the identifier is operable to identify 304 the consumer computing device over the course of a plurality of interactions. In some embodiments, the platform server (or other server receiving one or more identifiers) determines at step 306 whether a received identifier can be matched to an existing consumer record. In the case of a known consumer, such as a registered consumer or returning consumer utilizing a known computing device, the identifier may be matched 306 to an existing consumer record. In the case of an unknown consumer that has not previously (or recently) interacted with a platform server, the consumer may be prompted to provide login credentials. If login credentials are provided, an existing consumer record may be identified 306 and updated to include a received identifier (e.g., for identification without requiring login credentials while the identifier is valid).

In some embodiments, the consumer may browse content or assets without providing login credentials, in which case a consumer record may be created 308 (e.g., by a platform server or other entity). The consumer record may be associated with the identifier and stored within a database as potential new consumer record. Should the consumer choose to register (e.g., with the platform server or other entity) the potential new consumer record may be updated with information such as a unique ConsumerID and associated login credentials. A consumer record may contain other or additional information. In some embodiments, the ConsumerID is a cryptographic hash of the record, which in some cases is a cryptographic hash address of the record stored within a blockchain network. Alternatively, the ConsumerID may be an address for receiving digital bearer assets on a blockchain network, or a public key, or cryptographic hash thereof, any of which may be included in a record stored within a database or blockchain network. In some embodiments, a consumer record is stored within a database maintained by a platform server and a version of the consumer record (like a subset of the record information or cryptographic hashes of record information) is also stored within a blockchain network. For example, a consumer record may be stored off-chain and cryptographic hashes thereof may be stored on-chain responsive to various events (such as the example events discussed in more detail below) to update the on-chain record.

In some embodiments, as a consumer uses their computing device to interact with a platform server, various ones of those interactions are tracked 310. In some embodiments, one or more tracked 310 interactions may be stored in association with a consumer record (or ConsumerID), which may be identified (or created) based on a unique identifier associated with the computing device (or provided credentials). For example, the computing device may request a given content item or asset or the content items or assets of a given contributor (e.g., the consumer may browse contributions). The different contributors and content (or assets) may each be associated with a unique identifier, such as a ContributorID and ContentID, respectively. Thus, for example, which contributors a consumer accesses (or views) may be tracked by associating ContributorIDs with the consumer record. Similarly, which content a consumer accesses (or views) may be tracked by associating ContentIDs with the consumer record. Accordingly, a consumer record or other data structure may reflect that a consumer accessed a Contributor A's video channel and subsequently watched video A and video C, accessed a Contributor A's video channel and did not watch any videos, or accessed video A directly and did not access Contributor A's video channel. Alternatively, or in addition, those interactions may be tracked with respect to a ContentID or ContributorID, such as within a record of interactions corresponding to a ContentID or ContributorID, and those respective records may indicate which consumers (e.g., by ConsumerID) and how those consumers interacted with content or other assets and contributors.

Tracked interactions 310 may be associated with one or more timestamps, such as a timestamp of the corresponding request. In some embodiments, duration may also be tracked or determined, such as a time between a request and a subsequent request, duration over which content was streamed in association with servicing the request (e.g., for audio or video content), or duration over which the consumer interacted with the content (e.g., for an article or text) from reported scroll events, or JavaScript or other API request from interactions within the content (e.g., requesting availability of an accommodation, such as a calendar indicating availability). In some embodiments, a quality of an interaction or interactions a consumer exhibits in relation to a content item or asset or contributor may be determined based on an analysis of associated timestamps and durations. Different types of content and assets may have different criteria for determining a quality of an interaction or set of interactions. A quality may be quantified based on the criteria for the type of content or asset, and may have a value based on a scale, like 1-10 or other range, or selected from a set of values, like 0 or 1, or "High", "Medium", "Low", "Unknown", or other classification. For example, interaction(s) indicative of watching a video in full or selecting options pertaining to an asset (e.g., viewing availability, accessing associated data like images of the asset, etc.) may be assigned a higher quality than interaction(s) indicative of requesting the video or asset and then another video or asset within a short duration (e.g., as indicated by a difference of timestamps between requests, ratio of video provided relative to full video, amount of API requests serviced, etc.). Some embodiments may also analyze tracked interactions and associated timestamps to determine whether a consumer is actively interacting and not a bot or trying to influence awards by acting in an unusual way. For example, consumers actively interacting with a platform server are expected to have both higher quality interactions and lower quality interactions, such as by browsing through a variety of content or assets (e.g., lower quality) and settling on content or assets to engage with more fully (e.g., higher quality). In some embodiments, a plurality of tracked consumer interactions are analyzed collectively to determine whether the interactions of a consumer are indicative of active consumer participation, a bot, or other rewards gaming. For example, patterns within tracked interactions including information such as ContentID, ConsumerID, type, quality, timestamps, duration, etc. may be identified and compared to expected patterns of normal consumer behavior (e.g., over the duration of a session the consumer interacts with a platform server and across multiple different sessions). Some embodiments may adjust a quality of the interactions of a consumer based on the determination, such as by discounting those interactions deemed as performed by a bot or to game rewards for a contributor.

Accordingly, at step 310, a consumer record (or other record in a data structure) may be updated to track a consumer's utilization of contributions and contributors, store metadata, or a combination thereof. In some embodiments, the utilization of contributions and contributors refers to the consumer's interactions with various contributions and the contributors of those contributions and associated data describing those interactions, such as timestamps. Other interactions may also be tracked, such as specific events corresponding to the consumer's engagement with a platform, like a registration event, subscription event, purchase event, and the like, each of which may be stored to the consumer record with a corresponding timestamp. In some embodiments, a registration event may correspond to a subscription event or purchase event (e.g., a customer registers coincident with subscribing or registers for a free trial, such as a 30 day trial, and subscription fees are processed at the end of the trial period unless the consumer terminates access).

In some embodiments, an award allocation is calculated based in part on the consumers interactions indicative of utilization of contributions proximate to an event or between events. For example, a subscription event, purchase event, or other event corresponding to monetary (e.g., fiat currency or digital bearer assets having transactional value) input by a consumer may trigger or correspond to one or more award calculations based the utilization data surrounding the consumer's interactions with contributed content or assets. For example, in some embodiments, a consumer may submit payment for a subscription fee (e.g., a monthly subscription fee) to access contributed content or assets. In some embodiments, a consumer may submit a one-time payment for a purchase of contributed content or assets, or a rental of contributed content or assets, which may be handled in a fashion similar to subscription fee events.

In some embodiments, a platform server receives 312 a subscription fee from a consumer. The subscription fee may be received in association with a subscription event, such as via an interface of a web page, web application, native application or the like provided by the platform server to receive payment information from the consumer. In some embodiments, the payment information comprises credit or debit card information that may be processed to charge the consumer a specified fee. In some embodiments, the payment information comprises transaction information, like a transaction identifier corresponding to a transfer of an amount of digital bearer assets to a specified address associated with a platform server for receiving digital bearer assets. The consumer may provide verification they submitted the payment via digital signature (e.g., proof they have access to a private key or other secret knowledge only the entity that effected the transfer possesses). Once payment for a subscription is verified, in some embodiments a consumer record of the consumer may be updated to reflect that the consumer is a paid subscriber. In some embodiments, a consumer record or ConsumerID may be associated with a record of consumer payment of the subscription fee such that a consumer may be identified as having an active subscription based on one or more records, which may be stored locally, within a blockchain network, or combination thereof. In some embodiments, the payment information comprises transaction information, like a transaction identifier corresponding to a transfer of an amount of digital bearer assets to a specified address on a blockchain network from which the amount of digital bearer assets cannot retrieved, or execution of a smart contract at the specified address that receives as input the amount of digital bearer assets (e.g., the consumer burns and provides proof of a burn transaction to a platform server, rather than the platform server effecting the burn as described in more detail below). The consumer may provide verification they submitted the payment (e.g., burned an amount of circulating digital bearer assets) via digital signature (e.g., proof they have access to a private key or other secret knowledge only the entity that effected the transfer possesses).

At step 314, circulating attribution awards are burned (e.g., taken out of circulation, destroyed, removed, or designated as consumed) with correspondence to monetary input by consumer. In some embodiments, a platform server burns circulating attribution awards with correspondence to fees received from consumers on the platform. For example, if a consumer purchases a $10 subscription to access content via the platform server, the platform server burns a corresponding amount of circulating attribution awards (e.g., $10 worth of attribution awards, which may be based on a current exchange or market rate of attribution awards). In another example, in an embodiment in which a platform server lists accommodations, such as hotel rooms and vacation rentals, circulating attribution awards corresponding to a reservation fee paid by the consumer may be burned at time of reservation fee collection (or at a time when the reservation fee is no longer refundable). Other assets, such as services, may be handled in a similar fashion, such as by one or more burns of circulating attribution awards corresponding to an amount consumer paid to reserve a service and an amount paid upon completion of the service. In another example, in an embodiment in which a platform server lists content items or other assets (digital or otherwise) for purchase (or rental), circulation attribution awards corresponding to a payment for a content item or other asset paid by the consumer may be burned at time of payment.

In some embodiments, depending on the payment method used by the consumer, a $10 subscription may cost the consumer $10+3%, where 3% corresponds to a transaction fee (e.g., a credit card transaction fee), and the corresponding amount of circulating attribution awards burned may remain at $10. Alternatively, for example, a ratio of values may be used, e.g., 1:2, 5:6, 2:1, or 6:5, without departing from the scope of the disclosed embodiments or, in another example, a ratio of values may be used for some assets (or platforms) but not others. The ratio may depend on a desired (e.g., configurable) scarcity of digital bearer assets, e.g., whether entities transact on the order of 0.01, 0.1, 1, 10s, 100s, or 1000s of digital bearer assets relative to a fiat currency or stable coin value. In some embodiments, the ratio tracks an amount of digital bearer assets that are minted (e.g., decreases as the number of digital bearer assets minted decreases) or based on other factors, though altering the ratio need not be required as the burn amount of digital bearer assets is based on current exchange rate (e.g., in fiat or stablecoin value that consumers transact with the platform). Thus, generally, for ease of explanation below, and within the context of subscriptions, a 1:1 correspondence of consumer input value to burned value of a circulating attribution awards, such as at a market rate of the attribution award in the input value, is discussed, but should not be considered limiting. Further, while burns are discussed at length relative to a platform server burning in response to received consumer input to the platform, embodiments contemplate consumer burn of circulating attribution awards in a similar fashion whether by transfer to a specified address or smart contract in association with a given platform server the consumer desires to access and proving ownership of the burn by digital signature. Association with a given platform server may be based on a given address or smart contract, input or transaction information identifying a given platform server, or claimed proof of ownership of the burn (e.g., consumer provides proof of ownership to a given platform server which claims the burn).

In some embodiments, the circulating attribution awards are digital bearer assets, like a digital bearer asset allocated as awards to contributors. Thus, for example, contributors receive an amount of a digital bearer asset as an award for contributing to a platform and can transfer those digital bearer assets to an exchange (e.g., for other digital bearer assets or fiats based on market value) or otherwise transfer them to a platform server. The platform server, in turn, may obtain digital bearer assets from the exchange (or from a contributor) and burns 314 an amount of digital bearer assets based on the receiving monetary input, like in the form of a subscription fee, from a consumer. As mentioned above, the value of digital bearer assets the platform server burns 314 corresponds to the monetary input, such as with a 1:1 correspondence, where the reference value may be a fiat currency (e.g., USD) or relatively stable digital bearer asset (e.g., a stablecoin pegged to a fiat currency). In a specific example, a $10 USD (or equivalent value in some other denomination) subscription fee or indication of collection thereof is received by a platform server, the platform server burns $10 USD worth of digital bearer assets, where the value of a digital bearer assets (e.g., in USD) may be determined at the time of burn based on a current exchange rate (e.g., a timestamped value reported by an exchange). If the platform server does not have access to (e.g., in association with an address on a blockchain network) the required amount of digital bearer assets to burn, the platform server may obtain (e.g., from an exchange) at least the required amount of digital bearer assets and subsequently burn the necessary amount of digital bearer assets.

In some embodiments, a smart contract may be called by a platform server to execute a burn function. In some embodiments, the burn function is operable to transact on an exchange on behalf of the requesting entity (e.g., a computing node executing the smart contract performs one or more operations to effect one or more transactions based on agreed upon criteria) to obtain a necessary amount of the digital bearer asset from a source, verify compensation of the source, and burn the digital bearer assets. For example, calling of the smart contract by the requesting entity may cause the smart contract to return a commitment to the requesting entity, like an instruction to transfer an amount of another digital bearer asset (like an amount of stable coin) to a specified address within a set amount of time. The computing node executing the smart contract may monitor published transactions for a transaction honoring the commitment, like a transaction from the requesting entity to the specified address with the specified amount of stable coin. In turn, the computing node executing the smart contract may execute the burn according to the smart contract (e.g., by effecting a transaction to burn the digital bearer assets) upon detecting (e.g., with finality) a transaction from the requesting entity to the specified address in the appropriate amount of the specified digital bearer asset within a threshold period of time. In other words, the smart contract may temporarily obtain from a source (e.g., from an exchange) and hold, like in escrow, the necessary amount of digital bearer assets to burn until detecting the requesting entity transferred a specified amount of another digital bearer asset to the source. Should the requesting entity fail to honor the commitment by effecting a transaction to the source as specified, the smart contract may cause the computing node to release the digital bearer assets obtained for the burn back to the source. In some embodiments, the smart contract may receive the specified amount of other digital bearer asset from the requesting entity and then effect both the burn transaction with the held digital bearer assets obtained for burn and transaction to transfer the other digital bearer assets to the source. In some embodiments, a smart contract may burn digital bearer assets by holding received digital bearer assets in escrow, such as indefinitely, or according to a distribution timeline which may be based on a minting schedule. In other words, the smart contract (which is addressable at a given address), may be the address to which circulating digital bearer assets are burned and are irretrievable from (e.g., by an entity) other than according to the agreed upon logic of the smart contract (which, in some embodiments, may not include logic to redistribute those digital bearer assets back into circulation, and in some other embodiments may include logic to redistribute some of those digital bearer assets based on agreed upon criteria, like based on an amount of digital bearer assets minted into circulation according to a minting contract or a number of mints of the digital bearer asset, to one or more entities, such as entities having burned circulating digital bearer assets or entities to which minted digital bearer assets were distributed during prior burn or minting periods, like a redistribution of a portion of burned digital bearer assets held in escrow at a later time as reward for continued participation within the ecosystem).

Figure 3B:
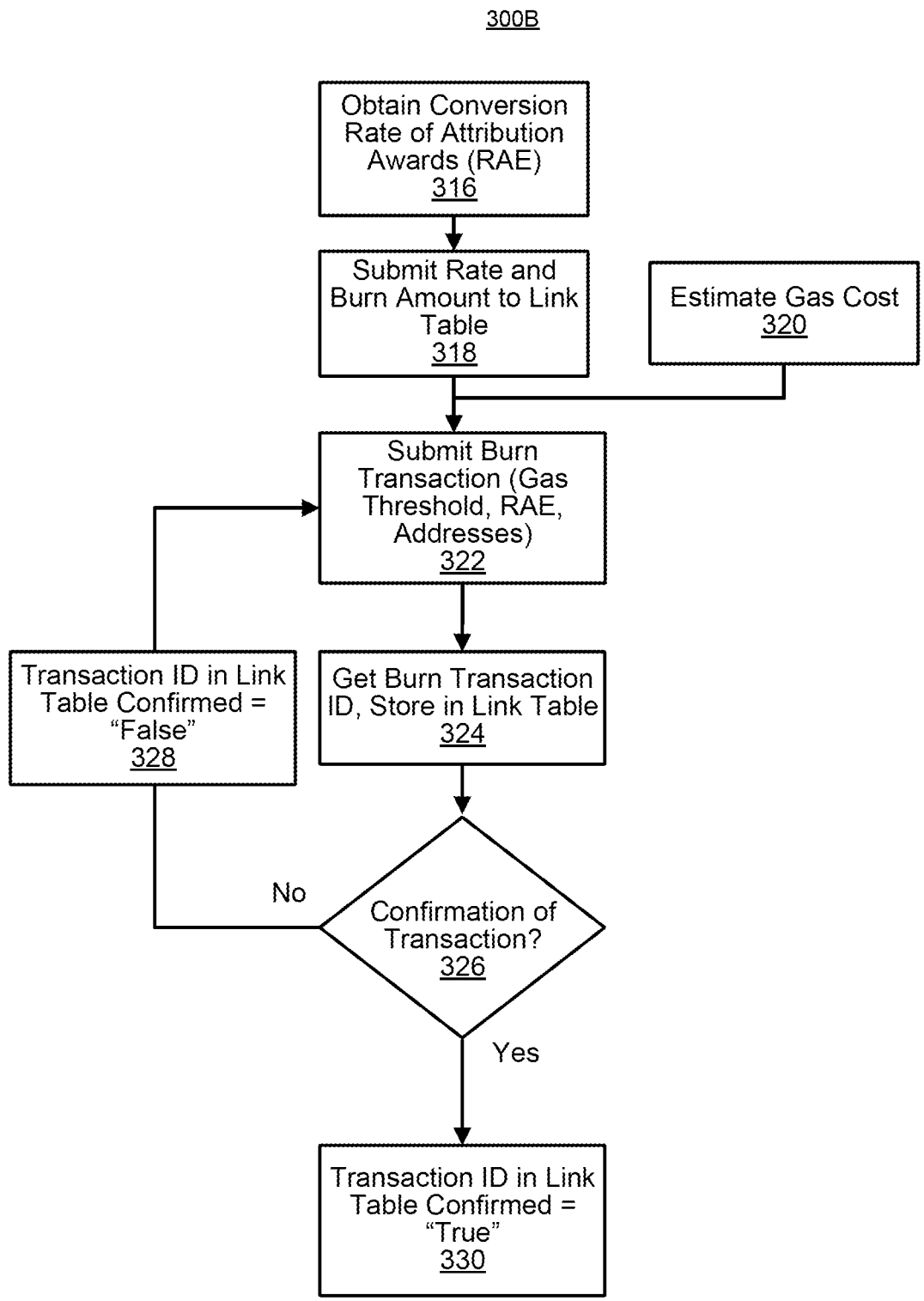
FIG. 3B is a flowchart depicting an example of a process by which circulating attribution tokens may be removed from circulation in accordance with some embodiments.

FIG. 3B is a flow chart illustrating an example process 300B for burning attribution awards according to some embodiments. In some embodiments, attribution awards are burned by an entity associated with a platform, like a platform server (or other entity associated with the platform server within the ecosystem layer) in response to consumer fees payed to (or through) the platform. For example, following the example of FIG. 3A, a platform receives a subscription fee payment (or verification of payment) and burns attribution awards, some embodiments of which include calling a smart contract by the platform server or other entity associated with the platform server. In some embodiments, a consumer may burn attribution awards in association with a platform to access the platform rather than submitting fees, like a subscription fee, to the platform which the platform burns on behalf of the consumer. Thus, in some embodiments, one or more steps of process 300B may be performed by a computing node of a blockchain network that loads and executes one or more smart contracts. Some steps of the process 300B, however, may be performed by other entities in some embodiments. Various examples are provided below.

In some embodiments, the number of attribution awards burned is based on a fee paid or committed to be paid by a consumer to an entity (e.g., associated with a platform) within the ecosystem layer. For example, the amount of attribution awards burned may be based on the monetary value of the attribution awards in the currency of the fee, such as according to a conversion rate. For simplicity, the currency of the fee may be reported in a given currency, like USD as discussed below, although other fiat or digital bearer assets are equally applicable (e.g., where those fiat or digital bearer assets have a relatively stable value, like a stable coin). For example, in an embodiment in which a platform server provides a subscription service, attribution awards may be burned when a subscription fee is received, where the amount of attribution awards burned corresponds to the subscription fee amount.

Accordingly, process 300B may include a step 316 for obtaining a conversion rate of attribution awards. For example, an API of an exchange may be queried to determine a conversion rate of attribution awards to another currency. In the above example, the conversion rate may indicate a conversion rate of attribution awards to USD or vice versa. Thus, for an example $10 USD subscription fee, a corresponding amount of attribution awards to burn may be determined responsive to the conversion rate. In other words, for a $10 USD subscription fee, an amount of attribution awards having a value equal to $10 USD on the exchange can be determined based on the conversion rate.

In some embodiments, a computing node executing a smart contract obtains 316 the conversion rate of attribution awards at time of execution, such as by querying an API of an exchange. In some embodiments, the conversion rate is obtained 316 to verify a submitted conversion rate. For example, the smart contract may receive, as inputs in a request, an identifier of the requesting entity, a fee amount, and a conversion rate, along with a digital signature of the request by the requesting entity to be verified based on a public key of the requesting entity. In some embodiments, conversion rates may be obtained as a conversion rate in association with a timestamp along with a digital signature of the conversion rate and timestamp, which may be verified by the public key of the exchange. In some embodiments, obtaining 316 the conversion rate comprises verifying the conversion rate provided as input as authentic and obtained within a threshold period of time for acceptance; obtaining a current conversion rate from the exchange; and determining whether the conversion rate provided in the input is within a threshold value of the current conversion rate. If the input conversion rate is verified, within a threshold period of time, and within a threshold amount of the current conversion rate, the input conversion rate may be honored and used. In some cases this enables the requesting entity to properly account for expected burn, such as by obtaining (or ensuring an adequate amount of) digital bearer assets are held for the burn temporally proximate to requesting a smart contract. Alternatively, the current conversion rate obtained from the exchange may be used (in which case, the requesting entity may receive that conversion rate to ensure enough digital bearer assets have been obtained and may respond with a digital signature of the conversion rate to indicate approval).

In some embodiments, at step 318, the process includes submitting conversion rate and burn amount to a link table or other record. For example, a computing node executing a smart contract may return a conversion rate (i.e., the conversion rate used for the burn) and burn amount to the requesting entity or other entity. In some embodiments, an input to the smart contract includes a ConsumerID or other identifier by which a link table, other record, or entry therein may be constructed. For example, an entry in a link table or other record may include fields to indicate one or more of a ConsumerID, burn address of the requesting entity (or other identifier of the requesting entity), conversion rate, burn amount, TransactionID, and confirmation, as explained in more detail below.

In some embodiments, the burning of attribution awards includes a transaction (e.g., on a blockchain network) where a required amount of attribution awards are transferred to a valid public key address (e.g., an address that is a valid public key or is derived from a valid public key according to a protocol of the blockchain network) which has not been derived from a known private key. In other words, a transaction is effected to transfer attribution awards (e.g., digital bearer assets allocated to contributors and in current circulation) obtained by a platform (or other entity receiving payment from a consumer) to an address, like a wallet address, (referred to herein as a burn address or eater address, which in some embodiments may be an address of a smart contract) from which attribution awards cannot be retrieved (e.g., with computational feasibility by virtue of a valid private key to the address being unknown). In some embodiments, an eater address is generated for and associated with each platform or other entity collecting fees from consumers. Thus, for example, an amount of burn (and therefore fees reported) corresponding to each platform or other entity collecting fees may be tracked, such as by monitoring for and tabulating burn transactions to one or more eater addresses. In some embodiments, a given eater address may be used by multiple platforms. In some embodiments, a single eater address, such as a 0x0 address (e.g., 0x0000000000000000000000000000000000000000), like on Ethereum, or other prefix address identifier (e.g., according to a protocol of a given blockchain network for generating addresses) plus zeros, or other specified single address may be utilized by multiple platforms. Depending on the embodiment, transfers out of the address may not be permitted by virtue of protocol of the given blockchain network, by virtue of a valid private key to the address being unknown, or other assurance (e.g., transfers of the digital bearer asset out of the address are not honored by protocol or participants or by one or more smart contracts that effectuate protocol). Thus, for example, an amount of burn (and therefore fees reported) corresponding to each platform or other entity collecting fees may be tracked, such as by monitoring for and tabulating burn transactions to the eater address by one or more platform servers (or related entities). In other words, in some embodiments, a given eater address may be monitored for burn transactions corresponding to different platforms (e.g., by their respective addresses).

In some example blockchain networks, operations within the blockchain network require fees, like gas fees, which are paid to participants of the blockchain network that execute and agree upon results of those operations (e.g., one or more computing nodes of the blockchain network). Accordingly, in some embodiments, the process may include a step 320 to determine an estimated gas cost of the transaction. For example, an API of an entity participating within the blockchain network may be queried to return an average gas cost. In some embodiment, the smart contract includes an input for a gas threshold, like the maximum amount of gas the questing entity will pay for effecting a burn transaction. In some embodiments, the smart contract obtains a current gas cost estimate and determines whether the gas threshold meets or exceeds the average gas cost to ensure the transaction is likely to be processed. If the gas threshold does not meet or exceed current average gas cost, a new threshold may be returned for approval by the requesting entity. Accordingly, in some embodiments, requesting entities may be responsible for transaction fees. In some other embodiments, another entity on the ecosystem layer may be responsible for transaction fees and reimbursed by allocation of a value of digital bearer assets to the entity based on value of gas fees paid (e.g., between each minting and distribution of the digital bearer assets). In some embodiments, that entity may sign burn transactions to indicate approval of gas fee payment. In either instance, a gas threshold based on, or consistent with, estimated gas cost 320 may be specified for one or more transactions, like a burn transaction 322, submitted onto the blockchain network.

In some embodiments, accounts are created for one or more participating entities, such as platform servers (and optionally their related entities) and contributors (and optionally consumers), which generates a private key(s). The private key may then be used to derive public RAE address(es) (discussed below) which may be able to receive transactions involving digital bearer assets, like attribution awards. In some embodiments, the RAE addresses can be public key pairs arranged and bound to a private key of an entity using a public key infrastructure. In some embodiments, an entity may create a public RAE address or other address for burning digital bearer assets in burn transactions. This address may be a same or different address from the public RAE address for receiving attribution awards.

According to some embodiments, two or more addresses are utilized according to the protocol of the blockchain network to facilitate the burning of attribution awards. For example: one or more addresses from which valid transactions cannot originate (non-transferrable address) (referred to as an eater address) by virtue of an unknown private key, protocol, or other configuration (e.g., smart contract holding in escrow) may be utilized to remove from circulation (e.g., burn) tradeable tokens referred to as RAE received at the address, which serve as attribution awards. In some embodiments, one or more eater address are established for respective platforms (and which in some embodiments may be referred to as FIN addresses) for burning digital bearer assets (e.g., RAE tokens), and the RAE addresses are established for respective platforms to receive digital bearer assets (e.g., when RAE tokens are minted). Thus, for example, eater addresses (or FIN addresses) and RAE addresses corresponding to a platform may each be operable to receive a digital bearer asset, like an amount of RAE, but the platform (and other platforms and other entities) are unable to access (e.g., transfer out) RAE tokens received by the eater address (e.g., transferred to the eater address during a burn transaction). Other embodiments may not utilize a 1:1 correspondence of eater addresses to platforms, but rather fewer eater addresses than platforms or even a single eater address, as transaction information of burn transactions may be operable to identify corresponding platform servers (e.g., by a RAE address the platform utilizes in a burn transaction).

In some embodiments, the ecosystem utilizes a digital bearer asset, which may be referred to as RAE, and which may be ERC20 compliant tokens that serve as digital bearer assets. According to some embodiments a minting schedule, implemented according to a protocol of the blockchain network and ecosystem layer, such as by smart contract, is configured to create (mint) a specified number of RAEs (e.g., a fixed amount or amount according to a formula) for a time period (e.g., a week, a month or other time period)

when established criteria for minting are met. Transfers of RAE, generally, and particularly in relation to a burn transaction may be tracked in another value (e.g., FIN, as referenced herein) as a record keeping component, such as a value pegged to or representative of a value of a fiat currency or other relatively stable value (or even a fixed value), like the USD, to track burn of RAE (e.g., according to conversion rate of RAE to FIN). In other words, FIN value may be pegged to or representative of a value, like the USD or other relatively stable or fixed value. Accordingly, an amount of RAE transacted to an eater address may be tracked in a point in time value of FIN, like a current exchange rate of RAE to a record keeping component, FIN, as a representative denomination of USD, or other stable of fixed value as the time of transaction (e.g., burn) of RAE. In some embodiments, the record keeping component may be implemented according to a protocol of the blockchain network and ecosystem layer (e.g., when an amount of RAE is burned an amount of FIN may be minted and issued as a token by a smart contract based on the exchange rate of RAE to FIN (or vice versa) as a record keeping component), some embodiments of which are discussed below. In other embodiments, the record keeping component, FIN (which is representative for ease of explanation and should not be construed as conferring any requirement to be expressed as such or have an explicit associated unit), may be determined and tracked or stored within an off-block data structure based on on-block transactions (e.g., based on amount of RAE transacted and conversion rate temporally proximate to the transaction, such as based on an exchange rate obtained temporally proximate to the transaction, like within a threshold period of time or an exchange rate obtained subsequent to the transaction based on a timestamp associated with the transaction).

For example, when payment is received by an entity from a consumer (e.g., payment of subscription fee, payment for reservation) or at the occurrence of another defined event (e.g., reserving an accommodation, but not yet paying), in some embodiments, the entity burns (e.g., by request to smart contract executing process 300B) an equivalent amount of market tradeable tokens (RAEs) by sending the RAEs to a non-transferable address (e.g., an eater address or a burn address). An indication of the address to which the amount of RAEs were sent is recorded on the blockchain network, such as by a transaction, which includes or otherwise is associated with information describing the burn (e.g., Consumer Identifier, Subscription Identifier, Payment Verification Identifier, Transaction Identifier, Timestamp, etc. or other combination of information described herein). In some embodiments, the transaction includes associated transaction information like a transaction identifier, public address (e.g., a RAE address) corresponding to the entity that requested the burn transaction, such as a public address from which the amount of RAE was transferred out of, the amount of RAE transferred, a timestamp corresponding to the transaction, and the public address the amount of RAE was transferred to, which in a burn transaction is an eater address (e.g., from which the amount of RAE transferred thereto is inaccessible). In some embodiments, the transaction may include an address of a smart contract, like a smart contract executing a process like described for process 300B, and in some embodiments the transaction information may include some or all of the information describing the burn (e.g., as transaction information of inputs to a function of a smart contract or in other transaction information data fields). In some embodiments, the transaction includes a conversion rate of RAE (e.g., like an exchange rate) relative to a value of the FIN component (or vice versa), like an exchange rate at time of transaction submission, such that a record keeping value (e.g., 10 FIN) may be determined based on the amount of RAE transacted (e.g., 20 RAE) and the conversion rate (e.g., 0.5); other embodiments may determine one or more of the above values based on the amount of RAE transacted and timestamp of the transaction temporally proximate to the transaction or later in time, such as by querying an API for a (current or historical) conversion rate or one or more (current or historical) market values of digital bearer assets based on the timestamp of the transaction. Alternatively, or in addition, some or all of the information describing the burn may be associated with the transaction within a relational database or other data structure, like a table, link table, key-value pair, or other suitable data structure for associating transaction information (e.g., like a transaction identifier) with corresponding burn information.

In addition, according to some embodiments, one or more entities (or records on a blockchain network) may store a list of public addresses (e.g., RAE addresses) associated with a respective platform in a set of platforms, like at least one current RAE address for each platform from which that platform transfers an amount of RAE tokens to an eater address such that burn transactions transferring RAE to an eater address may be tracked for the platform, and a value corresponding to an amount of RAE tokens burned credited to the platform based on the burns (e.g., to track RAE burned in an amount of a record keeping component (e.g., FIN) value, which may have a relatively stable value, such as the USD or a stable coin). Thus, for example, transactions to an eater address may be inspected to identify burn transactions submitted by a given platform based on the stored association of the public address with the platform (e.g., the RAE address of the platform by which the platform submits the burn transaction). Accordingly, in some embodiments where multiple platforms utilize a same eater address, a set of burn transactions corresponding to a given platform (and other sets of burn transactions corresponding to respective other platforms) may be identified from transactions to the eater address based on their transaction information (e.g., including identifying information for the platform, like a public address utilized by the platform).

In some embodiments, multiple eater addresses may be utilized. For example, a given eater address may be assigned to a given platform, and other eater addresses may be assigned to respective ones of other platforms. Thus, for example, the burn transactions of different platforms may be generally segmented by eater address. The segmenting is general in the sense that other entities within a blockchain network may submit a transaction to an eater address, because the address is operable to receive digital bearer assets. As a result, transaction information of burn transactions to an eater address may be inspected to confirm that a given platform submitted the transaction, which in some cases may be confirmed if the transaction was effected by a smart contract including logic to permit a given platform to submit burn transactions to a specified eater address for the platform. Alternatively, or in addition, the transaction information may be inspected to determine which address the transaction is from or submitted by, and an association of an address with a given platform confirms the burn for the platform (e.g., when the from address of the transaction matches the address associated with the platform). In some embodiments including multiple eater addresses (referred to as FIN addresses in some embodiments below), such as an eater address for each platform, the address may have a balance of zero or more RAE tokens, or a balance in another token, like a FIN token (e.g., a token pegged to USD or a stable coin value) as a record keeping component. Other embodiments may store a record keeping value in an off-chain data structure.

A record keeping token (which may be utilized in at least some embodiments where the record keeping component value is tracked on-chain), referred to herein as a FIN token, may have a stable value (say $1 USD or other predetermined value per token, which may be referred to as a FIN token, or otherwise as a FIN). A FIN address balance, according to some embodiments, is approximately 1 FIN for every $1 (or other stable value amount) of subscription fees (or other payments) received from consumers for which RAE was burned to the FIN address (e.g., according to exchange rate of RAE to FIN/USD at time of burn). Thus, for example, if $1 USD=2 RAE at time A and a $10 subscription fee is paid, 20 RAEs are burned (transferred) to the FIN address at time A, and if $1 USD=1 RAE at time B and a $10 subscription fee is paid, 10 RAEs are burned to the FIN address at time B. As the FIN is pegged to a relatively stable value, like the USD, the 20 RAEs at time A are tabulated as 10 FIN (e.g., based on the conversion rate used for the burn) and the 10 RAEs at time B are tabulated as 10 FIN (e.g., based on the conversion rate user for the burn). In turn, a total of 20 FINs are tabulated for the FIN address, 10 at time A, and 10 at time B, irrespective of the market fluctuation in the value of RAE, and the 20 FINs are indicative of the $20 USD in fees paid by consumers. Note that, as a tabulating mechanism, FINs may be recorded and tracked using ERC-20 tokens allocated to the FIN address, or via other means. For example, an amount of FIN/USD may be reported in association with or in transaction data of burn transactions of RAE to FIN addresses (or other eater address), and total amount of FIN/USD may be tabulated by inspecting each valid transaction involving burn of RAE to a given FIN address. In some embodiments, a record keeping value (like in FIN, which may be representative of a USD, or other stable or fixed value) may be determined based on burn transaction information (e.g., amount of RAE burned) and exchange rate of the RAE to the record keeping value, FIN, (e.g., based on a timestamp or included in the transaction information) and stored off-chain rather than within the blockchain network (e.g., as a token value held by an eater address). Accordingly, as outlined above, the record keeping value, FIN, may be tracked on-block by FIN tokens, on-block by a denoted FIN value without requirement to issue a token (such as by including FIN value in transaction information, whether by input to smart contract, output by smart contract, or otherwise) or off-block as FIN value for a transaction in a link table or other data structure, depending on the embodiment, which is not to suggest that record keeping component redundancy is disclaimed. Some embodiments may alternatively, or in addition, include an exchange rate by which FIN value may be determined RAE tokens (as digital bearer assets) may be transferrable and have a value depending on the market in which they are traded. A computing node executing a smart contract (as well as other entities) may request a market value/conversion rate of RAE in connection with the burn process. According to some embodiments, a computing node executing a smart contract creates and submits a burn transaction 322 to transfer an amount of RAE to an eater address to burn that amount of RAE, where the amount of RAE depends on the record keeping component to RAE value (e.g., conversion rate) and amount paid by a consumer (e.g., in the currency to which the record keeping value is pegged). More particularly, a burn transaction 322 is submitted onto the blockchain network to send an amount of RAE equivalent to the fees (e.g., for a subscription, service, accommodation, or the like) received from a consumer to an eater address (e.g., the eater address associated with the entity requesting the burn, or the eater address to which entities submit burn transactions). In turn, the record keeping component value, like FIN value, can be denoted based on the conversion rate of RAE to FIN.

In some embodiments, burn transactions are processed to a specified set of eater addresses, such as a set of eater addresses assigned to respective ones of the entities authorized to collect fees from consumers. In some embodiments, the set of eater addresses are stored in a record on a blockchain network, which may be accessed by a cryptographic hash address corresponding to the record, and the record may include an association of eater addresses to identifiers, such as public keys or cryptographic hashes of public keys, of entities authorized to collect fees from consumers. Thus, for example, a smart contract may access one or more records to determine an eater address that corresponds to an identifier (e.g., based on the public key) of the requesting entity (e.g., to verify a correct eater address was provided as input or to obtain a correct eater address for the transaction). Other embodiments may request an eater address from an off-chain entity or a list of eater addresses and identifiers. Thus, responsive to an authorized entity receiving a $10 subscription fee from a consumer, a burn transaction can be submitted 322 to send $10 worth of RAE to the eater address of the entity that requested the burn. As each eater address in the set does not have an associated private key capable of authorizing a transaction to another address (e.g., because a private key to an eater address is unknown), the transaction removes (e.g., burns) the specified amount of RAE from circulation.

In some embodiments, burn transactions are processed to a single or reduced number of eater addresses. In some cases, this can reduce overhead as the number of eater addresses monitored can be less than the number of entities authorized to collect consumer fees (and burn corresponding amounts of RAE) and, in some cases, other entities not having a specified address may also submit a burn transaction. For example, in some embodiments, a consumer may submit (e.g., rather than the consumer paying the platform which then burn an amount of RAE) a burn transaction in relation to an entity (e.g., like a platform) or an entity (e.g., like a platform) may claim a burn transaction submitted by the consumer. Accordingly, the consumer burn transactions and platform burn transactions may be identified from the same pool of transactions identifying a single eater address (or a reduced set of eater addresses). In some embodiments, respective ones of the entities authorized to collect fees from consumers may utilize a reported or known public address associated therewith (e.g., in a list, record, or other data structure accessible by a computing system or node monitoring for burn transaction) to submit burn transactions to the (single) eater address (which may be a single eater address) and burn transactions corresponding to the respective ones of the entities may be identified based on transaction information. In some embodiments, the known public RAE addresses of entities authorized to collect fees are stored in a record on a blockchain network, which may be accessed by a cryptographic hash address corresponding to the record, and the record may include an association of RAE addresses to identifiers, such as public keys or cryptographic hashes of public keys, of entities authorized to collect fees from consumers. Other embodiments may store such records off-chain. Thus, for example, a smart contract may access one or more records to determine whether a provided address corresponds to an identifier (e.g., based on the public key) of the requesting entity (e.g., to verify a correct RAE address was provided as input to credit the requesting entity). Other embodiments may store associations of RAE addresses with platforms off-chain and transactions on the eater address may be monitored to identify burn transactions, such as by identifying transactions that transfer an amount of RAE to the eater address from a RAE address stored in the record (e.g., in association with a platform). Thus, responsive to an authorized entity receiving a $10 subscription fee from a consumer (or a consumer that desires to obtain a $10 subscription), a burn transaction can be submitted 322 to send $10 worth of RAE to the eater address. As each eater address in the set does not have an associated private key capable of authorizing a transaction to another address (e.g., because a private key to an eater address is unknown), the transaction removes (e.g., burns) the specified amount of RAE from circulation. In the case of the consumer that desires to obtain a $10 subscription and submits a burn transaction, the consumer may provide a proof (e.g., by digital signature verifiable based on a same public key as that for the burn transaction) to the platform the user wishes to subscribe to such that the platform may claim the transaction.

In some embodiments, a balance of FIN tokens (e.g., each having a value of 1 FIN) at a FIN address may be based on a stable value. For example, if a "FIN" is considered to be equal to one dollar, and the value of RAEs transferred to a FIN address in response to a received fee is equal to $10, the balance of the FIN address may be denominated as 10 FINs (assuming the payment in this example is $10 for a subscription). In some embodiments, the domination is included with the burn transaction indicating a transfer of Y amount of RAE held by address A to the FIN address and a transfer (and mint) of X amount of FIN based on the conversion rate and Y amount of RAE to the FIN address, or effected by another transaction (either later upon confirmation of RAE burn or by the process 300B as described above by a transfer (and mint) of X amount of FIN based on the conversion rate of the burn transaction).

Other embodiments may determine a record keeping value by an analysis of transactions on the blockchain network without generation of record keeping tokens (e.g., FIN tokens) as ERC-20 assets to represent the value (e.g., because a record keeping value may be determined based on transaction information such as conversion rate or historical conversion rate according to transaction timestamp and amount of RAE burned). Thus, for example, a submitted transaction 322 may include a gas threshold (e.g., max payment amount for an entity or entities to process and validate the transaction), amount of RAE to transfer, RAE holding address of the requesting entity, eater address, validation information (e.g., one or more signatures and public keys for verifying those signatures). In some embodiments, validation information may include a request, a signed request by the requesting entity, public key of the requesting entity, a signed burn transaction (e.g., by the computing node executing the smart contract), and public key of the computing node executing the smart contract for verification of results (e.g., the burn transaction or other data) based on the inputs. In some other embodiments, a requesting entity may compile and structure the information for a burn transaction as described above, such as according to an input schema of the smart contract, and the smart contract may verify the input information as described above and submit the burn transaction onto the blockchain network.

In some embodiments, execution of the smart contract concludes after step 322 once the burn transaction is submitted. In turn, other entities may monitor the blockchain network, determine whether a submitted burn transaction can be considered confirmed or not, and update one or more tables or records locally or otherwise on the blockchain based on the determination. In some embodiments, a computing node executing the smart contract may perform one or more additional steps, such as those included process 300B (which may alternatively be or also performed by one or more other entities).

In some embodiments, an identifier, like a transaction ID, of the burn transaction is stored 324 in the link table. The link table or other record may be updated as described above (e.g., in reference to step 318) to include the identifier for the burn transaction. In turn, the blockchain network may be monitored to determine whether the burn transaction, having the identifier, can be confirmed (e.g., is included in a state considered valid). In some embodiments, the link table or other record includes some or all of the following information: a TxID (e.g., a hash), Platform Eater Address or Platform RAE address, Block # (e.g., block including the TxID), Block Timestamp, Rate (e.g., RAE to Record Keeping Component conversion rate for a transaction), RAE transferred, Record Keeping Component Value (e.g., FIN, USD, other etc.), Confirmation Blocks (e.g., number of blocks deep), Confirmation True/False, and PeriodID (e.g., a current burn period). Some of the information in the link table may be populated based on transaction information of burn transactions, from other sources based on the transaction information, based on blockchain network state, or other informational sources described herein.

In some embodiments, confirmation of transaction 326 monitors a blockchain network to which the burn transaction was submitted to identify whether the burn transaction (e.g., by transaction ID) is included in a valid state. Whether a state is considered valid may be based on whether the state including the burn transaction is part of a sequence (e.g., chain) of valid states (e.g., blocks) and the time to finality. As an example, in an Ethereum blockchain network, a state may be considered valid and have finality when that state (e.g., block) has been extended upon ~35 times (e.g., blocks at a depth greater than or equal to 35 from a current block are considered to have finality). In other words, the confirmation of transaction 326 may identify a state including the burn transaction and wait until the state has finality on a blockchain network. If the state including the burn transaction reaches finality, the link table or other record may be updated to indicate that the burn transaction is confirmed "True" 330. Alternatively, if no state including the burn transaction reaches finality (e.g., the transaction could not be effected either due to too low of a gas threshold or not enough balance of digital bearer assets to transfer, either for gas or for RAE), the link table or other record may be updated to indicate that the burn transaction is confirmed "False" 328. In the case of a confirmation "False" 328, the transaction may be retried with a higher gas threshold based on estimated gas cost or based on an indication that an account balance has increased (e.g., by virtue of another transaction) to include enough digital bearer assets. Alternatively, in some cases, the process 300B may indicate to the requesting entity that the burn transaction failed and should be retried with an updated request (e.g., based on a current conversion rate, current gas cost, etc.). In some embodiments, the requesting entity may determine that the burn transaction failed (e.g., by monitoring the blockchain network as indicated above) and retry a burn transaction with an updated request (e.g., by increasing gas threshold, verifying account balances for effecting the transaction, etc.).

As a result of the burn transaction reaching finality, the amount of RAE (or other digital bearer assets) transferred to an eater address are removed from circulation as no entity possesses a private key corresponding to the eater address. In some alternate embodiments a smart contract holds the amount of RAE, like in escrow to remove the amount of RAE from circulation, either indefinitely or until certain conditions are met (e.g., to redistribute a portion thereof), and no entity is permitted to alter the logic of the smart contract to access the amount of RAE. In some embodiments, when a single eater address is utilized, the single eater address is a 0x0 address (e.g., 0x0000000000000000000000000000000000000000), like on Ethereum, or other prefix address identifier (e.g., according to a protocol of a given blockchain network for generating addresses) plus zeros, which no entity participating on the given blockchain network reasonably (either by computation infeasibility or by design) has access to a corresponding private key.

In some embodiments, to mitigate incentive for a bad actor to obtain a private key (or hold onto a private key) corresponding to an eater address (e.g., one holding a substantial value in digital bearer assets, like RAE), new eater addresses may be specified for burn transactions such that RAE holdings are not highly consolidated amongst only a single or a few eater addresses. For example, in some embodiments, a smart contract may be configured to randomly generate an eater address (e.g., without determining an associated private key operable to access held assets or discarding any private key), determine that the address does not otherwise exist on the blockchain network on which it is to be used, and issue the eater address to an entity for burning digital bearer assets in response to payments received from consumers. Although transfers may be effected to a pre-existing, now disused eater address, those transactions may be ignored (e.g., because they occurred after a new eater address was issued or were not submitted by an authorized smart contract, such as by process 300B, and therefore considered invalid by entities participating within the ecosystem layer).

In some embodiments, such as for subscription fees, a status of the subscription fee may be tracked in one or more records on the blockchain network. For example, if a consumer record or representation thereof is stored on the blockchain network, a cryptographic hash address of the consumer record may be included with a submitted burn transaction, and any off-chain records may be updated to associated the burn transaction (e.g., directly, via reference in a link table, or otherwise) with the consumer. Consumer records also be referenced by ConsumerID in some embodiments. According to some embodiments, a duration may be specified, such as in a link table, to indicate the duration of a subscription. In some embodiments, duration may be tracked by smart contract, such as by a server (e.g., federated server, platform server, etc.) requesting execution of a smart contract configured to publish (e.g., hourly, daily, etc.) a record of subscriptions (e.g., by ConsumerID, transactionID, etc. or hashes thereof) and their activated duration (or timestamp(s) indicative thereof) such that validity of a subscription may be determined based on the record. For example, a platform may access the record, identify subscriptions pertaining to the platform, and update a local record of ConsumerIDs having active subscriptions based on the respective durations (or timestamp(s) indicative thereof). In some embodiments, duration may be tracked by eater address, such as by which eater address the burn transaction was submitted where the eater address is used for or active for a set period of time, e.g., a given day. In some embodiments, duration may be tracked by a first block (or state) having finality in which the burn transaction corresponding to the subscription was published, like by block number or by block timestamp, and subscriptions corresponding to a block number or timestamp thereof having a difference to a current expiration block (or state) or timestamp thereof having finality (e.g., the most recent) that is less than the duration of the respective subscriptions are considered valid. In some embodiments, block (or state) number may be interchangeable (practically) with timestamp in blockchain networks where state finality is biased to a relatively fixed schedule (e.g., average number of blocks generated per unit time, like an hour or day). In some embodiments, duration may be tracked in a similar fashion as described above for states but based on the minting periods as described herein (e.g., as minting periods may be biased to a predictable schedule). In some embodiments, a counter (e.g., a 30-day or other counter) is initialized to time out a subscription. Alternatively, subscription validity may be verified based on a timestamp indicative of when the subscription was paid plus the duration not exceeding a current time. The use of a counter may be used, for example, to ensure that a payment, such as a subscription fee, is only valid for a limited time period. In example embodiments utilizing distributed file storage (e.g., IPFS), subscription validity may be checked for a consumer based on a ConsumerID or consumer record and a proof of ownership (e.g., account access), which may be provided by a platform server.

Figure 4:
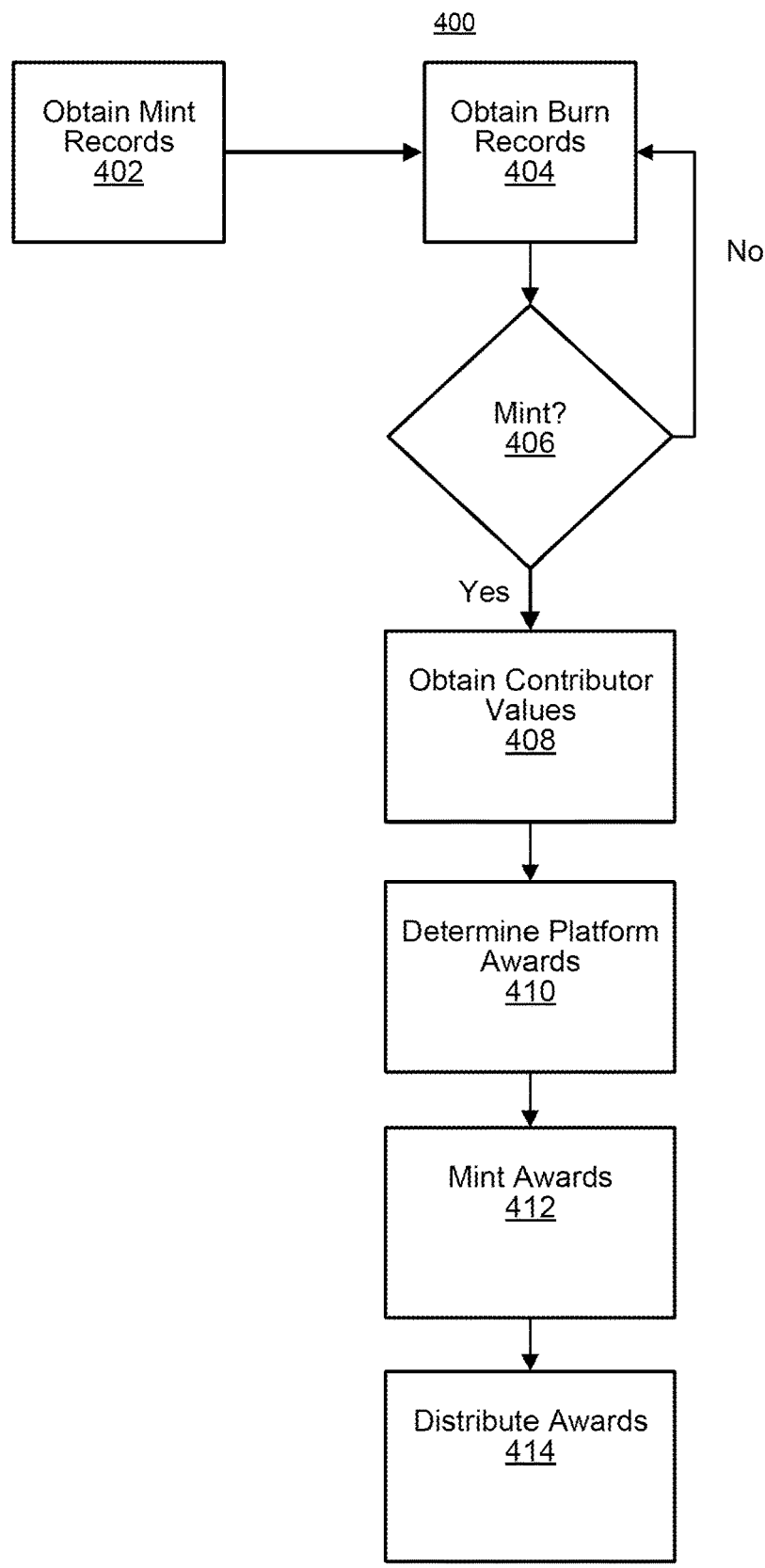
FIG. 4 is a flowchart depicting an example of a process by which attribution tokens may be created in accordance with some embodiments.

FIG. 4 is a flowchart illustrating depicting an example of a process 400 by which attribution awards may be created in accordance with some embodiments. Example process 400 may further assign and distribute created attribution awards in accordance with one or more embodiments. In some embodiments, one or more steps of process 400 may be performed by a computing node of a blockchain network that loads and executes one or more smart contracts. Some steps of the process 400, however, may be performed by other entities in some embodiments. In some embodiments, those other entities reach consensus on results of one or more steps and those results are processed by a smart contract. Various examples are provided below. In some embodiments, the awards may be based on a measure of network centrality determined based on graphs of consumer utilization data (e.g., tracked interactions of the consumer).

In some embodiments, the process 400 includes obtaining 402 mint records. Mint records may be stored on-chain, off-chain, or a combination thereof. In some embodiments, a mint record includes one or more entries identifying a period (e.g., PeriodID), Timestamp, record keeping value (e.g., FIN value) transacted, and amount of RAE minted for one or more mints. In addition, entries may include cryptographic hash addresses corresponding to mint records stored on a blockchain network by which entry values can be verified. A mint record may also contain data about a next (e.g., current mint), such as an entry specifying a current PeriodID, Timestamp, record keeping value (e.g., FIN value as a target value), and amount of RAE to be minted. The amount of RAE to be minted may be based on PeriodID, such as by logic encoded within a smart contract. For example, in some embodiments, an amount of RAE minted may decrease over time, such as after a fixed or variable number of mints, the number of which may be tracked by PeriodID and verified based on mint records stored on the blockchain network. For example, an amount of RAE minted may start at an initial value and decrease after X many, after f(x) many, or other amount of mint Periods. For example, if an initial amount of RAE to create per mint is 10,000, the amount may be halved every 1700 mints, e.g., to 5000 at PeriodID 1700, 2500 at PeriodID 3400, and so on. Thus, for example, a total amount minted may converge on a fixed value (e.g., 34,000,000), but allocated in ever decreasing amounts. The above noted amounts are illustrative, in some embodiments an initial amount may be fixed (e.g., remain the same) or decrease according to another mechanism (e.g., a decay function, linearly, other exponential value, logarithmically, by some other function, or otherwise).

As described above, in some embodiments, a target in the record keeping value may be specified for a current mint period. The target in the record keeping value, like a target FIN value, may be obtained from a mint record specifying information for a next mint or determined for the next (or current) mint from prior mint records. In some embodiments, the target in FINs is determined based on a measure of central tendency (e.g., mean, mode, or median) over a trailing duration of exchanges of one or more digital bearer assets. For example, as described above, a conversion rate of RAE to FIN for a burn transaction may be obtained, or a value in FIN corresponding to the burn transaction may be obtained, or an amount of FIN tokens issued for the burn transaction may be obtained, and the respective FIN values across transactions of a prior mint may be aggregated and those aggregate values for respective mints across a number of mints may be analyzed to determine a measure of central tendency over a trailing duration of exchanges. In some embodiments, a trailing duration of exchanges is based on a number of days, such as 30 days, or approximately a month. In some embodiments, a trailing duration of exchanges is based on a number of mint periods, such as last 30 mint periods. In some embodiments, a trailing duration is the lesser or greater of either a specified number of mint periods or number of days. In either instance, the duration may specify a plurality of mints to analyze, e.g., each mint within the last 30 days, the last 30 mints, etc. As described previously, entities, like a platform server, burn an amount of RAE corresponding to consumer monetary input based on an exchange rate. Information about those burn events may be stored within a link list and may be independently verifiable by interrogation of records on the blockchain network. For example, for each burn event, information like a TxID (e.g., a hash), Eater Address, Block # (e.g., block including the TxID), Block Timestamp, Rate, FIN value, Confirmation Blocks (e.g., number of blocks deep), Confirmation True/False, and PeriodID (e.g., a current burn period), may be identified.

Thus, for example, confirmed burn transactions, associated FIN values, and the corresponding mint PeriodID may be identified and burn transactions for a given PeriodID, or across multiple PeriodIDs, may be analyzed. For example, burn transactions corresponding to PeriodIDs occurring with the trailing duration may be analyzed. In some embodiments, the analysis includes determining a mean, median, or mode of FIN value. For example, FIN values associated with burn transactions for respective PeriodIDs may be summed (e.g., the FIN of each burn transaction event having PeriodID Val=0, Confirmation "True" can be summed to determine the amount of FIN for mint period 0 and so on), and a mean, median, or mode of FIN value of the considered periods may be determined. As an example, for a current PeriodID Val=45, if a last 30 periods are considered, the FIN value of each burn transaction event for respective PeriodID Vals 15-44 may be summed, forming a set of FIN values corresponding to the respective periods, and a mean, median, or mode from the set may be selected. In another example, for a current PeriodID Val=45, if periods over a last 30 days are considered, timestamps associated with mint records may be examined to identify PeriodID values within the last 30 days (e.g., from a current time or most recent mint timestamp), such as PeriodID Vals >=16, where PeriodID Val 16 corresponds to a last mint within the 30 day trailing duration.

In some embodiments, a target in FIN value may be biased to converge mints to a desired minting schedule, such as approximately one mint per a given period of time, such as approximately 1 day or 24 hours, or some other period of time. Accordingly, in some embodiments, the duration of a mint period may be factored into FIN value determined for the mint period. For example, if a PeriodID 24 has a timestamp of 02:00 hours, a PeriodID 25 has a timestamp of 04:00 hours on the same day, and the set of FIN values for PeriodID 25 has a value of 500 FIN, the set of FIN values (or aggregate FIN Value) for PeriodID 25 may be adjusted to bias the target FIN value for following periods (e.g., periods considering PeriodID 25 in the trailing duration). In the above example, PeriodID 25 has an actual duration of 2 hours (from the prior mint) over which a record keeping value of 500 FIN is transacted (e.g., based the conversion rate of RAE to the record keeping value for the respective burn transactions during the period) where 500 FIN is greater or equal to target FIN value for that period. If a desired duration for a period is approximately 24 hours (other values may be used), the target FIN value was reached ahead of schedule based on the target duration minus actual duration being positive (whereas a negative value of target duration minus actual duration would indicate target FIN value was reached behind schedule). In other words, in the above example, the target FIN value for PeriodID 25 was reached ~22 hours ahead of schedule. To bias target FIN values for following periods, a desired duration adjusted rate in FIN value for PeriodID 25 may be determined, such as by Actual FIN value*24 (desired duration)/2 (actual duration)=Adjusted FIN value. As a result, PeriodID 25 may have an adjusted FIN value of 6,000 FIN. In instances where an actual duration is longer than the desired duration, the above process may also be used to determine an adjusted FIN value (e.g., which is less than actual FIN value).

In some embodiments, the process 400 includes obtaining 404 burn records. Burn records may be stored on-chain, off-chain, or a combination thereof. In some embodiments, a burn record includes one or more entries including a TxID (e.g., a hash), Eater Address, Block # (e.g., block including the TxID), Block Timestamp, Rate, FIN value, Confirmation Blocks (e.g., number of blocks deep), Confirmation True/False, and PeriodID (e.g., a current burn period). TxID may correspond to (or the entry may include) a cryptographic hash address corresponding to the transaction (which includes transaction information like the cryptographic hash addresses of parties to the transaction, which may include an address of a smart contract) as recorded on a blockchain network by which entry values can be verified. As described above, a FIN target value may be specified for a current mint period. Accordingly, burn events occurring during the current period, whether by timestamp corresponding to the current period (e.g., based on a starting timestamp in a current mint record) or by current PeriodID (e.g., based on current PeriodID in a current mint record) may be identified. From those burn events, burn events having a confirmation block greater than a threshold value, such as a threshold value corresponding to finality of a block (e.g., >=35 in Ethereum, 6 in Bitcoin, or other value based on the underlying blockchain network), and part of the current chain, (e.g., Confirmation=True), may be identified to a set of burn events. The FIN values corresponding to those events identified to the set of burn events may be summed (or, in some alternate embodiments, a measure of central tendency may be determined if the FIN target value is a mean, median, or mode across burn transactions in the period, or that measure may be multiplied by number of events in the set). In some example embodiments, and for ease of explanation, the sum of the FIN values corresponding to the burn events in the set is used. In either instance, a determined value (e.g., a sum, a measure of central tendency, or measure of central tendency times number of burn events in the set, noting that the mean times the number of burn events in the set also yields the sum) may be compared to the target FIN value (which may be based on a measure of central tendency in similarly determined values for considered PeriodIDs over a trailing duration as described above). The comparison may yield a determination as to whether mint criteria is met or not met 406. For example, if the determined FIN value for the current period does not exceed the target FIN value for the period, the process 400 may obtain additional burn records meeting the above described criteria until the set of burn events for which a FIN value for the current period is determined meets or exceeds the target FIN value. For example, as additional blocks (or states) containing one or more burn events reach finality as determined from obtained burn records 404, the burn events of one or more additional blocks may be added to the set of burn events for the current period and an updated FIN value is determined for comparison to the target FIN value (e.g., until determined FIN value meets or exceeds target FIN value). In turn, at step 406, when the determined FIN value for the current period exceeds the target FIN value for the period, mint operations for the current period may commence.

In some embodiments, when mint criteria is met, a record of the determination to mint 406 may be published. The record may include an indication that mint criteria is met and information corresponding to the set of burn events on which the determination was based. For example, in some embodiments, a platform server, federated server, computing node or other entity may publish the results to one or more other entities for verification. In some embodiments, the record of the determination is published to the blockchain network. In some embodiments, the record of the determination may be published amongst entities participating within the ecosystem layer. In either instance, one or more entities may verify the determination, which may confer authoritativeness, such as by digital signature of verifying entities. Records of verification may be similarly published according to one or more of the above described protocols or other protocols discussed herein. In some embodiments, verification of the determination includes a consensus protocol, by which a threshold (e.g., at least a majority) of entities agree upon the determination, and mint operations for the current period may commence subject to consensus.

In some embodiments, when mint criteria is met for a current mint period, information for a next mint period may be determined and published. Example information for a next mint may include a next PeriodID, Timestamp, FIN value (e.g., as a target value), and amount of RAE to be minted. As a result, burn events occurring after a last burn event (or last block containing one or more burn events) added to the set of burn events for the current period are include in a next set of burn events for determining FIN value of the next period. In some embodiments, a platform server, federated server, computing node or other entity may publish the information for the next mint period to one or more other entities for verification. In some embodiments, the information, like a record, for the next mint period is published on the blockchain network. In some embodiments, the record for the next mint period is published amongst entities participating within the ecosystem layer. In either instance, one or more entities may verify the information, which may confer authoritativeness, such as by digital signature of verifying entities. Records of verification may be similarly published according to one or more of the above described protocols or other protocols discussed herein. In some embodiments, verification of the information includes a consensus protocol, by which a threshold (e.g., at least a majority) of entities agree upon the information, such as to set criteria for the next mint period.

In some embodiments, contributor values for the current mint are obtained 408, such as from platform servers or other entity determining contributor values for one or more platforms. Some embodiments may include requesting contributor values for a platform based on burn events corresponding to the platform within the set of burn events for the current period. In some embodiments, for example, each burn event in the set may have associated therewith an address, like an eater address, associated with a given platform server (or platform) (e.g., a specified eater address to which one or more burn transactions associated with the platform are submitted). In some embodiments, for example, each burn event in the set may have associated therewith an address, like a public address (based on a public key of a public-private key-pair), associated with a given platform server (or platform) (e.g., an address from which an entity associated with the platform utilizes to submit or authorize burn transactions to an eater address). Accordingly, a set of burn events may be identified for the current period (e.g., transactions bu based on their timestamps or which block or state they are included in) and subsets of burn events may be identified as corresponding to different ones of the platforms based on transaction information. Thus, a request for contributor values for a platform may include at least a subset of burn events corresponding to that platform. Alternatively, contributor values for a platform may be reported by the responsible entity based on information (e.g., about burn events in the set) published in the record of the determination to mint for the current period. An example report many include addresses corresponding to contributors and associated values for rewards to be allocated during the mint. An example report for a platform may include information like that in the data structure below:

```
rewards = [
  { tx__hash: 1    addresses: [0x3d, 0x44, 0x55]
                   percents: [0.4, 0.32, 0.28] },
  { tx__hash: 2    addresses: [0x3d, 0x44, 0x68, 0x55]
                   percents: [0.4, 0.22, 0.10, 0.28] }
]
```

In the above example, contributor addresses and corresponding values are reported for each burn event, like each burn event in the subset of burn events associated with the reporting platform. However, in other example embodiments, such as based on a given reporting structure, those values may be normalized and aggregated. For example, such as where burn events 1 and 2 have a same or similar FIN value (e.g., corresponding to a same $10 subscription fee), an example report for the platform may include normalized and aggregated information across the reported burn events like that in the data structure below:

```
rewards = [
  { tx_hashes: [1, 2]    addresses: [0x3d, 0x44, 0x55, 0x68]
                         percents: [0.4, 0.27, 0.28, .05] },
]
```

Thus, contributor values may be reported in a variety of different ways and confer similar information. Moreover, reported contributor values may be normalized and aggregated by the receiving entity in a similar fashion. In either instance, contributor values may be normalized such that a given set thereof adds up to 1 (or some other static value). In some embodiments, reports include an associated FIN value, such as for each burn event or collection thereof. Further, in some embodiments, reported contributor values or FIN values may be audited and verified by one or more other entities, such as by analyzing one or more records upon which the contributor values are based or burn transactions upon which the FIN values are based according to one or more techniques described above. For example, in some embodiments, FIN values may be determined independently (or audited) based on the burn transaction hashes for burn events, which may include ensuring the burn event information reported by a platform matches the burn event information in the subset of burn events corresponding to the platform for the current mint period.

In some embodiments, platform awards are determined 410 according to FIN value share. As described above, the one or more subsets of burn events in the set of burn events for the current mint period correspond to respective ones of the platforms. Thus, for example, a FIN value for each subset of burn events can be determined. In turn, the FIN value for a subset corresponding to a given platform may be expressed as a percentage of total FIN value of the set. A percentage may be determined for each subset such that a share of awards is determined for each platform according to the percentage. For example:

```
Platform Share = [
  { Platform: [1, 2]
      percents: [0.4, 0.6] },
]
```

In some embodiments, platform share may also include platform addresses for distribution of platform awards (e.g., platforms, like contributors, may also be awarded). For example:

```
Platform Share = [
  { Platform: [1, 2]    addresses: [0xb1, 0xd5]
                        percents: [0.4, 0.6] },
]
```

In some embodiments, platform share and contributor values may be combined into an award share. For example, for platform 1:

```
Award Share = [
  { Platform: 1    address: 0xb1
                   percent: 0.4
                   contributor addresses: [0x3d, 0x44, 0x55, 0x68]
                   contributor percents: [0.4, 0.27, 0.28, .05] },
]
```

Regardless of the specific implementation, addresses and values may be arguments to a smart contract configured to mint awards 412.

In some embodiments, a computing node executing a smart contract obtains addresses and values as arguments, some example of which are described above. For example, a smart contract configured to mint awards 412 may receive, as inputs in a request, an identifier of the requesting entity, addresses, and values, along with a digital signature of the request by the requesting entity to be verified based on a public key of the requesting entity. In some embodiments, a platform server or federated server submits the request. In some embodiments, one or more other platform servers or federated servers may verify the request or request values, and digitally sign the request or those values, and the digital signatures may be provided along with an identifier of the verifying entity (e.g., public key operable to verify the signature). In some embodiments, the smart contract includes, or accesses a record on a blockchain network that includes, public keys of entities authorized to request the smart contract. For example, the smart contract may determine whether a public key (e.g., identifier) of the requesting entity matches a public key of an authorized entity and verify the signature of the entity based on the public key, the signature, and the data that was signed (e.g., the request or data in the request like addresses and values or cryptographic hash thereof and a timestamp) according to a signature verification algorithm. The smart contract may verify the signatures of the other entities in a similar fashion. For example, in some embodiments, authorized verifying entities may digitally sign a cryptographic hash of the request or request data, and those signatures and timestamps may be included by the requesting entity in the request, and by which the smart contract may verify a cryptographic hash of request data or the request satisfies the signature verification algorithm. Thus, the smart contract may be configured to ensure that the requesting entity is authorized to call the smart contract and the request or data in the request was verified by a threshold number of other authorized entities. If the request cannot be verified, such as by signature confirmation of the requesting entity, or a threshold number of authorized entities have not verified the request (or addresses and values therein), the request may be rejected. If the smart contract verifies the request, the smart contract may mint awards 412.

As described above, the smart contract may mint an amount of rewards in digital bearer assets (e.g., RAE), which may be digital bearer assets conforming to a standard like ERC20 based on a current mint PeriodID. 10,000 RAE for PeriodIDs<1700, for example. Award allocations to various entities may be determined based on values, which may be percentages of RAE. For example, platform 1 may have an award share of 0.4, which corresponds to 4,000 RAE. A portion of platform award share may be allocated to the corresponding platform, such as 15-35%. For an example, for a 30% platform award, 1200 of the 4000 RAE are allocated to the address corresponding to the platform. The remaining 70%, or 2800 RAE, is divided amongst the contributors. For example, for 0x3d, 2800*.4 RAE, i.e., 1120 RAE, are allocated to that address and so on. In some embodiments, one or more of the entities verifying results may be awarded in RAE, or an entity supplying gas fees are awarded in RAE. Accordingly, in some embodiments, addresses for one or more other entities may be specified an percentages of awards specified or determined at time of mint 412. In turn, for example, if an award share of 5% of RAE (e.g., 500) are allocated to addresses of those entities, platform 1 may have an award share of 0.4 of the remaining 9500 RAE. The percentages may be adjusted in other ways, such as normalized to each correspond directly to a RAE share (e.g., for 0x3d, a direct share can be determined as 0.4 (contributor value)*0.7 (contributor share)*0.4 (platform share)*0.95 (available platform share after 5% compensation for verification or gas) and so on for other entities).

Thus, some embodiments can include: processing a payment from a consumer for a subscription (e.g., in USD); burning an equivalent amount of market tradeable token (RAE) by sending the RAE to non-transferable eater address(es). In some embodiments, when a single eater address is utilized, the single eater address is a 0x0 address (e.g., 0x0000000000000000000000000000000000000000), like on Ethereum, or other prefix address identifier (e.g., according to a protocol of a given blockchain network for generating addresses) plus zeros, which no entity participating on the given blockchain network reasonably (either by computation infeasibility or by design) has access to a corresponding private key. In some alternate embodiments, a smart contract corresponds to an eater address and holds the amount of RAE, like in escrow to remove the amount of RAE from circulation, either indefinitely or until certain conditions are met (e.g., to redistribute a portion thereof), and no entity is permitted to alter the logic of the smart contract to access the amount of RAE. In some embodiments, when multiple eater addresses are utilized, a given eater address may correspond to a given platform. In some embodiments, a record keeping value, like a FIN value, may be determined for a transaction. According to some embodiments, a FIN has a fixed or pegged value (e.g. 1 FIN=$1 USD). Thus, the amount of RAE burned (e.g., removed from circulation) in a first burn transaction at a first time having a FIN value of 10 may differ from an amount of RAE burned in a second burn transaction at a second time that also has a FIN value of 10 according to market value of RAE in USD/FIN at the first time and the second time. Accordingly, FIN value becomes a representation of the value input by consumers onto the network (e.g., paid to a platform). In some embodiments, a consumer inputting value to a platform may burn an amount of RAE corresponding that consumer's desired input value to the platform (e.g., to obtain a subscription), and that transaction may be associated with the platform (e.g., claimed by the platform based on proof of ownership provided to the platform by the user to obtain the subscription) for identifying burn events associated with the platform. In some embodiments, an eater address associated with the platform may be specified. In turn, at step 408, a subset of burn events identified as corresponding to a platform by eater address may consider a collection of eater addresses associated with the platform. In some embodiments, at step 408, a subset of burn events corresponding to a platform may be identified from transaction information based on a public address (or addresses) associated with the platform from which burn transactions are requested by or submitted by in which amounts of RAE are transferred to an eater address. Thus, a variety of different ways for removing RAE from circulation in burn transactions and identifying those burn transactions in relation to a corresponding platform are described. Further, in some embodiments, such as subscription based embodiments, such as where each consumer input affords a period of access at a given subscription rate, then RAE distribution can be done on a pro-rata basis (e.g., based on total # active subscribers/total supply of RAE minted for period) and FIN value can be used as an intermediary unit to allow for different subscription price points to be offered while maintaining accurate attribution.

In step 414, the newly minted network attribution awards for the current award period are distributed according to the results of the process described above. For example, awards (e.g., in RAE) are distributed to the specified addresses receiving awards in a mint/award period based on the specified values and any other implemented rules (e.g., platform to contributor award ratio, federated server or other entity awards, and the like). In some embodiments, distribution is effected by a transaction to an address in an amount of RAE as a percentage of total RAE minted as described above. In some embodiments, a smart contract may monitor the blockchain network until the transaction(s) are (each) recorded in a block having finality, such as by that block reaching a threshold depth in chain of blocks being extended (e.g., denoting completed transfer of RAE), at which point the minting and allocation process for the current minting period is complete.

In some embodiments, the smart contract may be called at step 412 by a federated server, platform server, or other authorized entity (e.g., according to signature verification). In some embodiments, execution of the smart contract concludes at step 414 once the allocation transaction(s) are submitted. In some embodiments, other entities may monitor the blockchain network, determine whether the mint allocation or one or more constituent transactions can be considered confirmed or not, and update one or more tables or records locally or otherwise on the blockchain based on the determination, and by which one or more transaction may be resubmitted. In some embodiments, a computing node executing the smart contract may perform one or more additional steps, such as those described in one or more steps preceding step 412 of the process 400 (which may alternatively be or also performed by one or more other entities).

Figure 5A:
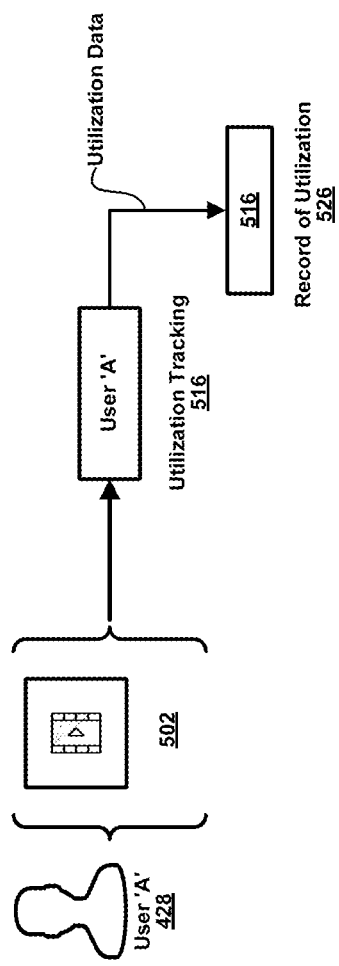
FIG. 5A and FIG. 5B are diagrams depicting examples of a process by which consumer interactions are monitored for allocating attribution tokens in accordance with some embodiments.

FIG. 5A illustrates an example process for monitoring consumer utilization of contributions in accordance with some embodiments. In the illustrated example, a first consumer (User A) 428 uses a contribution 502 in a first session for that user. For example, user A 428 accesses a video 502 contributed by another entity (not shown).

In some embodiments, the video 502 is video content uploaded by a contributor to a platform provided by a platform server (not shown). In some embodiments, the video 502 is served by a CDN associated with the platform server. For example, the platform server may receive a request for the video 502 from a computing device of user A and instruct the CDN to serve video content (e.g., stream video data) to the computing device in response to the request. In some embodiments, the CDN is a distributed file storage system, like an IPFS, and the platform server responds the request for the video 502 from a computing device of user A with an address of the video 502, like a cryptographic hash address, for retrieving the video from the distributed file storage system. In some embodiments, the platform server may also provide one or more keys, like cryptographic keys, by which encrypted video data may be decrypted for playback.

In some embodiments, the video 502 is video content uploaded by a contributor to a CDN, like a cloud storage, or a distributed file storage system, like an IPFS. In turn, in some embodiments, the contributor may provide access to the video 502 to authorized entities, such as one or more platforms, which in turn may confer access to users. For example, the first contributor may provide one or more cryptographic keys or other access control information to the platform such that the platform may subsequently provide users access to the content without involvement of the contributor. A user, like user A, may be permitted to access the video 502 by virtue of subscribing to a given one of those platforms. In some embodiments, a platform server implementing the given platform may service a request received from a computing device of user A for the video 502 as described above. Alternatively, another entity may service the request in accordance with one or more of the above described operations. However, a request may also be serviced in other ways. For example, in some embodiments, an entity may receive and service the request by determining that the user A has an active subscription to a given platform (e.g., based on a consumer record or other record indicative of active subscription(s) stored within a blockchain network for the user) and the given platform is authorized to permit users access to the video (e.g., based on a content record, contributor record or other record within a blockchain network indicative of authorized access granted by the contributor). Upon determining that user A is permitted to access the video 502, the entity may serve the video in accordance with one or more of the above described operations.

In accordance with various ones of the above described embodiments, utilization data corresponding to user A accessing the video 502 may be tracked 516. Tracked 516 utilization data may include information about one or more interactions attributable to user A's access of the video. For example, the platform server that serviced the request for the video may determine, receive, or otherwise collect interaction information indicative of the request, like a timestamp corresponding to receipt of the request and a ContentID of the requested content; data indicative of user interaction with the video, like a timestamp corresponding to a start of data streaming, a timestamp corresponding to an end of data streaming, media player events such as pause, start, movement of playhead, and corresponding timestamps (either received as feedback from the player or determined from stream transport protocol events or messages); or other interactions (e.g., events within a web page, web application, or native application within which video playback occurs). In some embodiments, the platform server stores the tracked utilization data in association with a ConsumerID or within a consumer record corresponding to user A. In other words, a record of utilization 526 corresponding to user A 428 accessing video 502 may be constructed based on the tracked 516 utilization data and stored within a consumer record of user A or otherwise associated with user A (e.g., by association with a unique ConsumerID of user A).

In some embodiments, the utilization data may be stored within a record on a blockchain network, locally by one or more entities, or a combination thereof. Stored utilization data may be associated with or include one or more identifiers described herein, like a ContentID and ConsumerID, such that utilization data can be analyzed in accordance with one or more the techniques described herein, such as to determine attribution awards for a contributor (e.g., for the contributor of video 502).

In some embodiments, additional user interactions are tracked and stored in association with a ConsumerID or within a consumer record corresponding to the user A. Additional interactions may also correspond to events, like a registration event, subscription event, purchase event, and the like. For example, user A may access video 502 and elect to register with a platform or other entity to view additional videos available to registered users. In another example, user A may access video 502 and elect to subscribe (e.g., pay a subscription fee, or commit to paying a subscription fee after a trial period) with a platform or other entity to view additional videos available to paid subscription users. In another example, user A may access video 502, which may be a preview of a full video (e.g., a movie) or a series of videos (e.g., an episodic video series), and elect to purchase access to the full video or the series. Information corresponding to the above example events and other events may be stored in association with a consumer record, such as an indication of the type of event with a timestamp. In some embodiments, one or more transactions, such as one or more transactions on a blockchain network, are effected in response to one or more of the above events. One or more of those transactions may include identifying information about user A, like a ConsumerID or other identifier (like a cryptographic hash address of a consumer record of user A on the blockchain network), and information about the event. Thus, for example, one or more of those transactions may be mapped to a consumer record storing utilization data, and a timestamp associated with the transaction, such as of the transaction or of the event, may be mapped to one or more timestamped interactions attributable to user A's access of content (e.g., within a threshold period of time of the timestamp associated with the transaction, nearest neighbors, etc.). In the context of subscription fee payment, for example, the timestamp associated with the transaction may map to timestamped interactions within the utilization data 516. Accordingly, user A's decision to subscribe may be attributed to user A's access of the video 502 (e.g., video 502 influenced user A to pay a subscription fee). In some cases, one or more of those transaction may include identifying information about specific content for some events. For example, a transaction may include a ContentID corresponding to the video 502 (or ContentID(s) corresponding to a full video or videos in a series of videos), to indicate which content items (or collection of content items) the user purchased.

As is often the case, a user may not be influenced to subscribe based on a single video, but rather a number of videos. Accordingly, as described below, utilization data may be collected for sessions during which a user accesses a number of contributions.

Figure 5B:
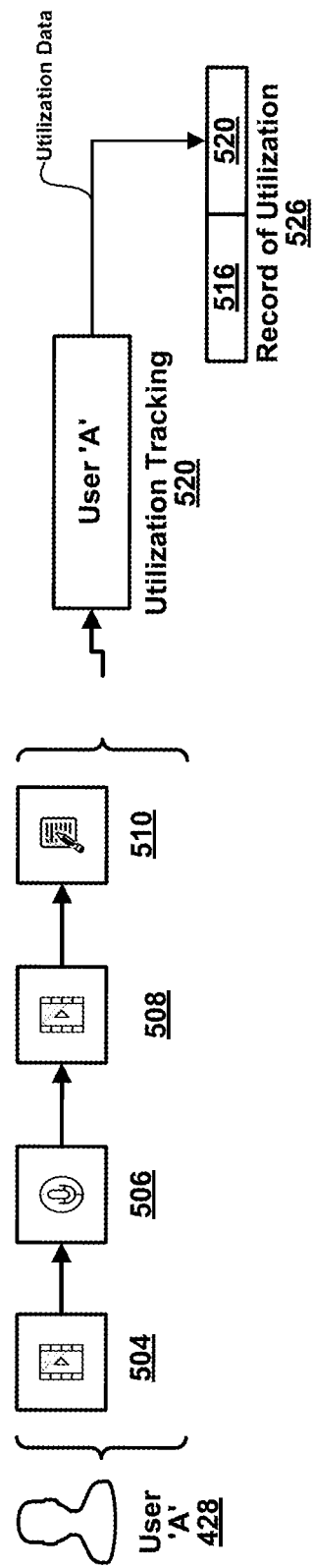

FIG. 5B illustrates a process for monitoring consumer utilization of contributions in accordance with some embodiments. In the illustrated example, a first consumer (User A) 428 uses a number of contributions in a second session for that user. For example, user A 428 accesses a first video 504, audio 506, a second video 508, and text 510, contributed by one or more other entities (not shown). Thus, for example, during a session a user may access a variety of different content items 504, 506, 508, 510. In other examples, a user may access a variety of different assets, such as to browse different accommodations and the like.

In some embodiments, the content items 504, 506, 508, 510 are uploaded by one or more contributors to a platform provided by a platform server (not shown). In some embodiments, the content items 504, 506, 508, 510 are served by a CDN associated with the platform server. For example, the platform server may receive a request for the first video 504 from a computing device of user A and instruct the CDN to serve video content (e.g., stream video data) to the computing device in response to the request. The audio 506 and the second video 508 may be served in a similar fashion, such as in response to the user requesting access to those content items via an interface of a web page, web application, native application, and the like. In some embodiments, the text 510 content is served in response to a request, like an HTTP get request for web page content corresponding to the text 510, or request for the text file itself (e.g., where the text 510 content is standalone content, like an ebook). In some embodiments, the CDN is a distributed file storage system, like an IPFS, and the platform server responds requests for content items 504, 506, 508, 510 from a computing device of user A with an address of a given content item, like a cryptographic hash address, for retrieving the video from the distributed file storage system. In some embodiments, the platform server may also provide one or more keys, like cryptographic keys, by which content items may be decrypted and viewed.

In some embodiments, the content items 504, 506, 508, 510 are uploaded by one or more contributors to a CDN, like a cloud storage, or a distributed file storage system, like an IPFS. In turn, in some embodiments, a contributor of a respective content item, like a first contributor that contributed the first video 504, may provide access to the video 504 to authorized entities, such as one or more platforms, which in turn may confer access to users. For example, the first contributor may provide one or more cryptographic keys or other access control information to the platform such that the platform may subsequently provide users access to the content without involvement of the contributor. A user, like user A, may be permitted to access the first video 504 by virtue of subscribing to a given one of those platforms. In some embodiments, a platform server implementing the given platform may service a request received from a computing device of user A for the first video 504 (or other one of the content items 506, 508, 510) as described above. Alternatively, another entity may service the request in accordance with one or more of the above described operations. However, a request may also be serviced in other ways. For example, in some embodiments, an entity may receive and service a request for a content item by determining that the user A has an active subscription to a given platform (e.g., based on a consumer record or other record indicative of active subscription(s) stored within a blockchain network for the user) and the given platform is authorized to permit users access to the given content item (e.g., based on a content record, contributor record or other record within a blockchain network indicative of authorized access granted by the contributor for the given content item). Upon determining that user A is permitted to access a given content item, the entity may serve the content item in accordance with one or more of the above described operations. Thus, for example, user A may request access to a plurality of different content items, like content items 504, 506, 508, 510, in a sequence during a session (e.g., in a second session).

In accordance with various ones of the above described embodiments, utilization data corresponding to user A accessing a sequence of content items 504, 506, 508, 510 during a session may be tracked 520. Thus, for example, in some embodiments, utilization data may be tracked over the course of a session, and utilization data may be indicative of user access of content over the course of the session in addition to individual content items. Tracked 520 utilization data, such as for access of a content item, may include information about one or more interactions attributable to user A's access of the content item. For example, a platform server that serviced a request for video or audio may determine, receive, or otherwise collect interaction information indicative of the request, like a timestamp corresponding to receipt of the request and a ContentID of the requested content; data indicative of user interaction with the video or audio, like a timestamp corresponding to a start of data streaming, a timestamp corresponding to an end of data streaming, media player events such as pause, start, movement of playhead, and corresponding timestamps (either received as feedback from the player or determined from stream transport protocol events or messages); or other interactions (e.g., events within a web page, web application, or native application within which video playback occurs). In another example, a platform server that service a request for text content may determine, receive, or otherwise collect interaction information indicative of the request, like a timestamp corresponding to receipt of the request and a ContentID of the requested content; data indicative of user interaction with the text content, like a timestamp corresponding events (e.g., scroll, selections or highlights, interactions with web elements, such as within an XML or HTML, document, and the like) within a web page, web application, or native application within which the text content is displayed.

Tracked 520 utilization data, such as for a session corresponding to user A accessing a sequence of content items, may include information about one or more interactions attributable to user A over the course of the session during which those content items were accessed. In some embodiments, a session may be defined by a threshold period of time between user interactions with contributions. For example, a session may include utilization associated with requests for content items (e.g., example content items 504, 506, 508, 510) received by an entity (or entities) servicing those requests within a threshold period of time, like within a threshold period of time from a prior request, within a threshold period of time from an interaction (e.g., competition of streaming of audio or video data, last user scroll event, etc.) with a content item served in response to a prior request, or within a threshold period of time from other interactions (e.g., browsing, search, browsing search results, etc.) with a web page, web application, or native application between requests.

In some embodiments, a platform server stores the tracked utilization data in association with a ConsumerID or within a consumer record corresponding to user A. In other words, a record of utilization 526 corresponding to user A 428 accessing a sequence of content items 504, 506, 508, 510 may be constructed based on the tracked 520 utilization data and stored within a consumer record of user A or otherwise associated with user A (e.g., by association with a unique ConsumerID of user A). As shown, the record of utilization 526 for user A includes utilization data 516 and utilization data 520, which can correspond to two different sessions. However, that is not to suggest that utilization data of a session cannot be tracked across multiple records, such as a record constructed for each accessed content item 504, 506, 508, 510, but rather that a record, or multiple records, include information (e.g., identifiers, interactions, timestamps, etc.) operable to construct one or more logical groupings, like a session, of user activities.

In some embodiments, the utilization data may be stored within a record on a blockchain network, locally by one or more entities, or a combination thereof. Stored utilization data may be associated with or include one or more identifiers described herein, like a ContentID and ConsumerID, such that utilization data can be analyzed in accordance with one or more the techniques described herein, such as to determine attribution awards for a contributor or contributors of the different ones of the content items 504, 506, 508, 510.

As is often the case, a user may not be influenced to subscribe based on a single session involving multiple contributions. For example, a user may not be influenced to subscribe based on contributions the user has access to, but rather other contributions the user cannot access without a subscription. A nearest neighbor and threshold approach for analyzing interactions in sessions surrounding events may capture some of those aspects, and may be pertinent to identifying which content (and thus which contributors) influenced a new user to register, or become a paid subscriber, or purchase access to specific content. However, for some events, such as an event corresponding to a subscription paid on a recurring basis, content that influenced the user to subscribe initially is not necessarily indicative of content currently influencing the user to continue a subscription. Nor is content that the user accessed (e.g., nearest neighbor or within a threshold) proximate to the timing of the event necessarily indicative of content currently influencing the user to continue a subscription. Accordingly, embodiments may analyze utilization data pertaining to individual contributions, sessions in which multiple contributions were accessed, and across multiple sessions. In some embodiments, the analysis is performed on utilization data tracked over a period of time, such as between subscription events or between award allocations, to determine awards owed to contributors.

Figure 6:
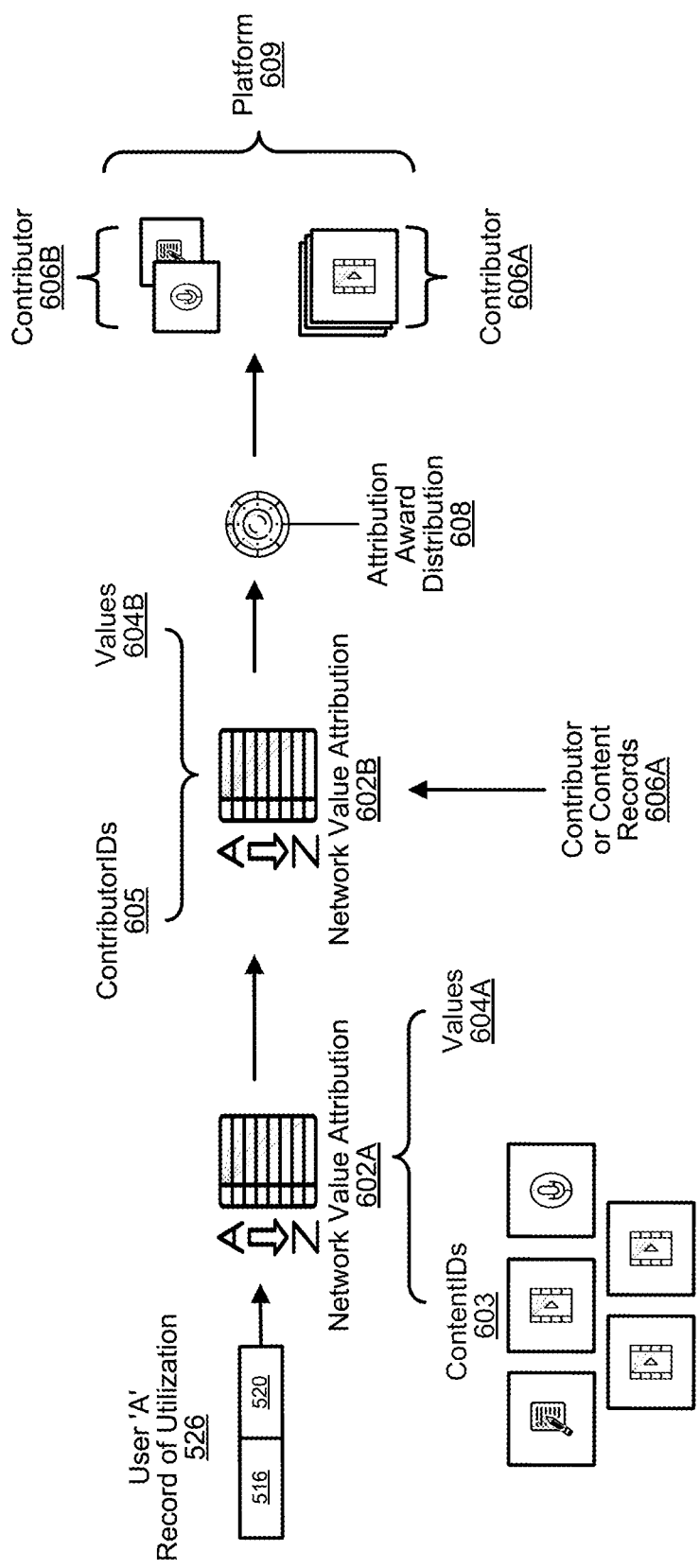
FIG. 6 is a diagram depicting an example of a process by which attribution tokens may be allocated in accordance with some embodiments.

FIG. 6 is a block diagram illustrating some embodiments of a process for allocating awards to contributors. According to some embodiments, contributions (and, by virtue, contributors of those contributions) are assigned network values. As described above, such as with reference to FIGS. 5A and 5B, interactions of consumers within the ecosystem layer are tracked in various embodiments. In some embodiments, interactions of a consumer, like a record of utilization 526, may be stored within a consumer record or otherwise associated with the consumer or consumer record. Although FIG. 6 only depicts a record of utilization 526 for a single user A, embodiments may include thousands, hundreds of thousands, or even millions of users and a corresponding number of records of utilization that interact with one or more platforms or other entities within the ecosystem layer.

In accordance with some embodiments, the record of utilization 526 for a consumer is populated with utilization data tacking events, like registration, subscriptions, and the like, interactions before and after those events, like browsing, selecting, consuming, or otherwise accessing content and other assets, and other operations performed by consumers. A record of utilization 526 may include a utilization data corresponding to a number of different sessions during which the user consumer accessed content or other assets, As shown, the record of utilization 526 for user A includes utilization data 516 and 520, each of which may correspond to a session during which the consumer accessed content or other assets.

As a consumer accesses content or assets, embodiments monitor for and track consumers interactions pertaining to and surrounding that access. For example, monitoring may be performed by various bodies of code executing on various computing devices, example of which may include an analytics suite of a platform or a digital-rights management (DRM) agent executing on a computing device of the consumer that selectively decrypts and monitors access of content (e.g., downloading, starting to play or otherwise read a media file, reading more than a threshold amount, or completing a read of such a file), or both. In some embodiments, a DRM agent is included in an application provided to consumer computing devices. Or in some cases, such an agent executing on a platform, content delivery network, or distributed file system (e.g., an IPFS) in which the files are resident (and retrieved after a corresponding URL is sent to consumer computing devices) may monitor such use. In some cases, reports of use may be cryptographically signed with a private key of the reporting entity, such that reports may be validated by other participations. Other examples are discussed herein. Regardless of the specific implementation, embodiments track user interactions and access of content or assets associated with the respective contributors, and that utilization data may be stored within a utilization record. Further, embodiments may track user interactions surrounding that access within the utilization data, such as when a user elected to register, subscribe or otherwise purchase access, thereby capturing events within the context of the content items or assets accessed.

In some cases, such utilization records may indicate which content items were consumed, an identifier of the consuming party, and various metrics indicative of the user interactions to and appreciation for the content items (e.g., dwell time after click-through, whether the supply element was searched for by the user or reached through automated content recommendation, direct access via URL or other resource locator, whether playback completed, and the like). In some cases, utilization records may include segmented utilization data, such as utilization data associated with a session identifier in which a given consumer accesses a sequence of content items or other assets or performs other actions. In some embodiments, other interactions, like registration events, subscription events, purchase events, and other events, like a login event (which may include a consumer inputting credentials to login or may be determined based on the consumer accessing the platform after some threshold period of time of a prior a session) may be associated with a session or individual content item or asset (e.g., purchase of access to specific content item(s) or asset, like a digital or purchase of a physical item or rental or reservation). In some embodiments, events are indicated within the sequence of content items accessed. For example, in some embodiments, some events may have a corresponding EventID, like a ContentID, and a corresponding record representative of the event.

In some embodiments, the utilization data is stored in (e.g., for a session) or tabulated to form a plurality of directed graphs in which nodes correspond to content items or other assets, and edges indicate transitions from one content item or asset to the next in such a session. In some embodiments, one or more nodes correspond to events represented within the utilization data. Thus, one or more edges may indicate transactions from a content item or asset to an event and from the event to a content item or asset. In some cases, edges may be weighted according to the various metrics indicative of the user's interactions to and appreciation for the content item or asset (e.g., with a weighted score based on a plurality of values of attributes, or a vector with various scalars corresponding to the different attributes). In some cases, the edges may also be associated with the user or various collections of users, e.g., those paying a particular subscription, those in a demographic or psychodemographic class, those on a particular distribution platform, or the like. The ongoing monitoring and tracking of consumer utilization of content or other assets may occur on an ongoing basis (e.g., data structures are formed and populated during a session) or in batch, such as prior to determining an allocation of awards to contributors.

In some embodiments, different entities collect different subsets of utilization data, and that subset of utilization data may be reported to some other entity that tabulates one or more subsets of utilization data into a larger body of data. For example, a platform may collect a subset of utilization data and a CDN may collect another subset of utilization data. In some embodiments, such as where the CDN is operated by the platform, the CDN may report the utilization data it collects to the platform, which may tabulate both subsets of utilization data into a utilization data report for the platform. Similarly, if the CDN serves multiple platform, respective subsets of utilization data may be reported to the corresponding platforms. In some embodiments, a platform may request utilization data from the CDN, such as utilization data related to the content or assets associated with the platform. In some embodiments, applications executing on consumer devices for accessing content items or other assets may report utilization to an entity. Different subsets of utilization data may be merged to form graphs or other data structures responsive to one or more identifiers (e.g., ContentID, ConsumerID, etc.) and timestamps associated with the different ones of the interactions captured within the utilization data. Thus, for example, one or more entities may tabulate utilization data and form utilization records, and utilization data within those records may be tabulated into, analyzed, or otherwise processed to form one or more graphs. In some embodiment, respective ones of the platforms tabulate utilization data to form a graph of consumer utilization of content items and assets on the platform.

In some embodiments, an entity, like a platform server, collects the record of utilization 526 comprising utilization data 516, 520 for user A and determines a network value attribution 602 by which awards may be distributed. For example, as described above, a network value attribution 602A may include determining one or more utilization graphs or appending to a graph based on user A utilization data 516, 520, such as for each session or by award distribution cycle. As described above, the graph may include identifying information about the content items or other assets which a user accessed, like ContentIDs, and information about the access and information describing relationships between different content items and events (like subscription events, purchase events, login events or other access events by which session may be defined or segment, etc.). From one or more analyses of the graph, attribution values 604A may assigned to ContentIDs 603 represented within the graph.

In some embodiments, an example attribution value 604A corresponds to a consumer acquisition value. For example, for a new consumer registration event, new subscription event, or initial purchase or rental event, one or more graphs may be analyzed to determine which content or assets were influential to the event. In some embodiments, the analysis is restricted to those graphs or nodes related to (e.g., as indicated by edges) or leading up to the event (e.g., within a threshold distance or time). In turn, a set of ContentIDs determined to have the highest measure of network centrality to the event may be selected and assigned a value based on the measure.

For example, in some embodiments, a new subscription event has a platform value (e.g., subscription cost to the consumer), and the platform value may be distributed. For example, if a consumer access some content items, purchases a new subscription, and access some more content items, the contributors may share the platform value as rewards. In some embodiments, a set of ContentIDs determined to have a threshold measure of network centrality to the event may be selected to share the platform value as rewards. In some embodiments, a value for each ContentID within the set is assigned a value, like a value corresponding to the determined measure of network centrality of the ContentID relative to the sum of measures in the set of ContentIDs.

For example, in some embodiments, initial purchase or rental events have a fixed value and a platform value (e.g., as components of the total cost to the consumer), where the fixed value is the minimum value owed to the contributor and the platform value may be distributed. For example, if a consumer rents access to a content item, the given contributor of the content item is paid according to the fixed value and the given contributor and other contributors may share the platform value as rewards. In some embodiments, payment for the fixed value is distributed with rewards, such as a fixed value plus reward share. In some embodiments, the ContentID(s) to which the fixed value corresponds is determined, such as by which content or assets were purchased or rented. In some embodiments, a set of ContentIDs determined to have a threshold measure of network centrality to the event may be selected to share the platform value as rewards. In some embodiments, a value for each ContentID within the set is assigned a value, like a value corresponding to the determined measure of network centrality of the ContentID relative to the sum of measures in the set of ContentIDs.

In some embodiments, an example attribution value 604A corresponds to a consumer retention value. For example, for a renewing subscription event, or later purchase or rental event, one or more graphs may be analyzed to determine which content or assets were influential to the event. In some embodiments, the analysis is restricted to those graphs or nodes occurring during one or more periods, such as those nodes (e.g., as indicated by edges) or leading up to the event (e.g., within a threshold distance or time). However, in various embodiments, the analysis is restricted to a period less so than for acquisition value. For example, the analysis may be restricted by a duration between subscription events or rental/purchase events, a duration that may covering a number of trailing events, a number of trailing events, or combination thereof. In turn, a set of ContentIDs determined to have the highest measure of network centrality over the the may be selected and assigned a value based on the measure.

In some embodiments, another example attribution value 604A corresponds to a consumer retention value. For example, for a renewing subscription event, or later purchase or rental event, one or more graphs may be analyzed to determine which content or assets were influential to the event. In some embodiments, the analysis is restricted to those graphs or nodes (e.g., as indicated by edges) occurring between a current period of analysis and a prior period of analysis. In some embodiments, the period of analysis is defined by events, such as for each subscription renewal event or purchase event, in some embodiments the period of analysis is defined by a minting schedule, such as when awards are to be distributed. In other words, an analysis may be performed at event time or at distribution time, or both, or one or the other depending on event type. For example, the analysis may be restricted to a duration between subscription events or rental/purchase events, a duration that may cover a number of trailing events, a number of trailing events, or combination thereof. In turn, a set of ContendDs determined to have the highest measure of network centrality over the period may be selected and assigned a value based on the measure.

For example, in some embodiments, a subscription renewal event has a platform value (e.g., subscription cost to the consumer), and the platform value may be distributed. For example, a consumer may access one or more content items during a period while a subscription is active and prior to renewal of the subscription (e.g., automatically or selectively), the contributors of those content items may share the platform value of the renewal as rewards. In some embodiments, a set of ContentIDs determined to have a threshold measure of network centrality during the period may be selected to share the platform value as rewards. In some embodiments, a value for each ContentID within the set is assigned a value, like a value corresponding to the determined measure of network centrality of the ContentID relative to the sum of measures in the set of ContentIDs.

For example, in some embodiments, purchase or rental events have a fixed value and a platform value (e.g., as components of the total cost to the consumer), where the fixed value is the minimum value owed to the contributor and the platform value may be distributed. For example, if a consumer rents access to a content item, the given contributor of the content item is paid according to the fixed value and the given contributor and other contributors may share the platform value as rewards. In some embodiments, payment for the fixed value is distributed with rewards, such as a fixed value plus reward share. In some embodiments, the ContentID(s) to which the fixed value corresponds is determined, such as by which content or assets were purchased or rented. During a period between purchases/rental, a user may access one or more content items or assets, such as a variety of different available accommodations within an area or a variety of content items within a category. In some embodiments, a set of ContentIDs determined to have a threshold measure of network centrality during the period may be selected to share the platform value as rewards. In some embodiments, a value for each ContentID within the set is assigned a value, like a value corresponding to the determined measure of network centrality of the ContentID relative to the sum of measures in the set of ContentIDs.

Utilization graphs may take a variety of forms. In some embodiments, the utilization graphs reflect use or other types of access of the content items by a single corresponding content-consumer, with a different utilization graph being computed for each content-consumer. For example, a utilization graph may include nodes corresponding to content items and edges indicating a sequence in which the content items were accessed by a given content-consumer, for instance, with directed edges indicating a direction of the sequence in time. In some embodiments, the edges are weighted according to an age of the access, for instances, with a half-life computation. In some embodiments, the relevant instances of access are within a threshold duration, are within a session, or span sessions of the content-consumer. Or in some cases, the utilization graph indicates cooccurrence rates of content items in sessions for a given content-consumer. For example, some embodiments may obtain a plurality of session records indicating which content items were accessed in each session (e.g., sequences of exchanges with a content distribution platform in which a single log-on serves to authenticate the user), and some embodiments may compute a cooccurrence matrix of the content items in which values of the matrix indicate frequency of cooccurrence of respective pairs of content items in the session records. In some embodiments, this matrix may be pruned to remove entries with less than a threshold frequency and remaining values may serve as weights of edges connecting corresponding content items associated with rows and columns of the matrix.

In some embodiments, utilization graphs may reflect use or other types of access of the content items by a plurality of content-consumers (e.g., all or more than 1%, 10%, 50%, or more on a platform). In some embodiments, a hidden Markov model or other dynamic Bayesian network is trained (for example with the Baum-Welch algorithm) based upon historical sequences in which content items are accessed to estimate likelihood of subsequent content items being accessed given a sequence of previously accessed content items. In some embodiments, such a prediction network may be implemented with a recurrent neural network, like a long-short term memory model, trained with stochastic gradient descent. In some embodiments, such a prediction model may be implemented with a transformer architecture or other type of autoencoder trained on sequences in which content items have been accessed by a plurality of content-consumers.

In some cases, the utilization graphs have nodes corresponding to individual content items or collections of content items, like sequences of content items, and directed edges to other content items indicate probabilities indicated by the models of transitioning to those other content items given the one or more content items away from which the edge points. In some embodiments, the utilization graph is encoded as a two, three, four, or higher dimension transition probability matrix having dimensions corresponding to the content items and values indicating a probability of content-consumers transitioning to a subsequent content item given a sequence of access of one or more previous content items corresponding to other dimensions of the matrix. For example, a two-dimensional matrix may reflect the probability of a content consumer accessing one content item corresponding to a row position after accessing another content item corresponding to a column position. These matrices may be populated by sampling or analyzing all of a set of content-consumer access records indicating sequences in which content items were accessed by a population of content-consumers to compute the ratio of instances in which each content item is accessed given a sequence of preceding content items being accessed. In some cases, the effects of such responsive sequences may be down-weighted according to age, for instance with a half-life score, to indicate a lower predicted frequency when all instances of such sequence occurring are relatively old or a higher predicted frequency when such instances are relatively recent.

In some embodiments, utilization graphs may be sequence agnostic and reflect use or other types of access of the content items by plurality of content-consumers. For example, some embodiments of the utilization graph may correspond to co-occurrence rates of content item access among sessions or among content consumers. Some embodiments may obtain session records for each session for each consumer or consumer record spanning multiple sessions for each consumer, each indicating which content items were accessed in that session or by that content-consumer. Some embodiments may then determine rates at which the content items cooccur in these records, for instance, with a term frequency-inverse document frequency score, like BM 25, where content items serve the role of n-grams and the access records serve the role of documents in which those n-grams appear. In some embodiments, the utilization graphs may be fully connected graphs in which weighted edges indicate these co-occurrence rates, and the utilization graphs may be pruned to remove those edges having less than a threshold cooccurrence rate.

A variety of measures of network centrality may be computed for each node of these resulting utilization graphs. Examples include betweenness centrality, in-degree centrality or out-degree centrality, percolation centrality, eigencentrality, or the like. In some embodiments, particularly for network-centrality measures that scale relatively poorly, the measure of network centrality may be determined through approximation, for example, with Monte Carlo analysis in which subsets of connections between nodes are randomly selected and traversed. In some embodiments, values indicative of centrality of nodes may be inferred with autoencoders, for example, with a node2Vec implementation trained on a plurality of random walks through the utilization graph that are sampled to form a training set, for instance, with techniques described in a paper titled *Learning to Identify High Betweenness Centrality Nodes from Scratch: A Novel Graph Neural Network Approach* by Fan et al, arXiv: 1905.10418v1, the contents of which are hereby incorporated by reference.

In some embodiments, node scores that serve as a measure of centrality may be based on output of a recommender system trained on records of content-consumer access to content items. For instance, strengths of recommendation scores for content items by such systems for default or collections of representative content-consumers may serve as scores of nodes. In some cases, the recommender system is one (or an ensemble) of the following: Spectral Collaborative Filtering (SpectralCF); Variational Autoencoders for Collaborative Filtering (Mult-VAE); Collaborative Deep Learning (CDL); Neural Collaborative Filtering (NCF); Collaborative Memory Networks; Metapath based Context for RECommendation (MCRec); or Collaborative Variational Autoencoder (CVAE). Content item's or a creator's propensity to be recommended may serve as a proxy of their marginal contribution of a coalition of content items or creators.

Thus, for example, one or more attribution values 604A may be determined for ContentIDs to which awards are to be distributed. In some embodiments, the award values 604A for ContentIDs based on consumer utilization data are determined when fees are received by the platform from that consumer. Thus, for example, awards corresponding to those consumer fees may be distributed when digital bearer assets corresponding to those fees are burned.

In some embodiments, a subscription duration may be divided into a subset of periods, such as over a duration between award allocations that occur between subscription renewals, for which values 604A may be modified in some embodiments. For example, if a current period between award allocations is 1 day (24 hours), the subscription renews monthly, and there are 30 days (720 hours) until the subscription next renews, the value 604A may be modified (e.g., multiplied) by the duration between award allocations divided by the subscription duration (e.g., 24/720, or 1/30). The award allocations to a same ContentID represented in multiple period subsets may be summed for distribution at the end of the total period (e.g., when a subscription fee is paid). In some embodiments, this modification offers the tradeoff of a smaller utilization data set analyzed but more frequent analysis and tracking of values 604A.

In some embodiments, the values 604A are adjusted based on current consumer input into the platform for which network value attribution 602A is being determined. For example, a given event may have a corresponding fee paid by the consumer to a platform, such as $10 USD for a subscription event. In turn, values 604A may be adjusted based on the fees input by the consumer and the multiple consumers having paid fees to a platform.

In some embodiments, a platform may adjust the values 604A based on fees received by the platform. For example, for total fees paid by consumers to a platform over a period, a given subscription event value may be determined as a component of the total fees paid, e.g., if a subscription fee is $10 and 1000 subscriptions are paid for by consumers, award distribution corresponding to a subscription is 0.001. In turn, for example, if a ContentID in a set of ContentIDs is assigned a value of 0.5 (e.g., corresponding to the determined measure of network centrality of the ContentID relative to the sum of measures in the set of ContentIDs for a subscription fee), the value that ContentID brought onto the platform may be adjusted to 0.0005 (e.g., event value component*ContentID value). As a result, in the above example, 0.0005*$10000 USD in total fees collected would yield a ContentID value of $5. In other words, the award values 604A determined for ContentIDs may be adjusted to a normalized amount across fees paid to a platform.

Embodiments may determine fees paid by consumers over a period based on amounts of digital bearer assets burned (e.g., by the platform to a specified eater address) at corresponding exchange rates at time of burn transactions. In some embodiments, an amount of burn may be tracked in a record keeping value, like FIN value, which may be responsive to the amount of digital bearer asset burned (e.g., RAE) and exchange rate/market value of the digital bearer assets relative to the record keeping value. Thus, for example, transaction records (e.g., for burn transactions) may be examined (e.g., for a public address associated with a given platform) to determine a current FIN value or change in FIN value for a platform over a given time period, such as minting or award period. In some embodiments, the record keeping value may be issued to an eater address (e.g., in embodiment utilizing multiple eater addresses where a given platform is associated with a given one or more eater addresses) as a token responsive to the amount of digital bearer asset burned and exchange rate. Thus, for example, transaction records (e.g., for burn transactions) may be examined to determine a current FIN balance or change in FIN balance of an eater address over a given time period, such as minting or award period. In either instance, and in accordance with other examples disclosed herein, fees paid are examples of content-consumer input scores, which indicate a content-consumer's assessment of the content-distribution platform (or content items thereon). Other examples include registering for a new subscription, viewing content, ratings provided by content-consumers, sharing content by content-consumers, viewing content for longer than a threshold duration, viewing an advertisement presented with the content, clicking on such an advertisement, etc.

In some embodiments, the values 604A determined for one or more ContentIDs 603A are normalized, such as by a technique like that described above. Thus, for example, in embodiments where multiple values 604A are determined for a ContentID (e.g., according to one or more of the analyses described above), those values may be summed to determine an attribution value for the ContentID based on the utilization data of a given consumer when fees are received from the consumer. Moreover, as the above techniques may be applied to analyze records of utilization pertaining to hundreds, thousands, or millions of consumers utilizing a platform, normalized attribution values 604A determined for a given ContentID 603 represented in a given award distribution may be summed. In other words, a network value attribution 602A process may include determining a network value 604A of a ContentID for award distribution that is representative of multiple consumers utilization data by summing normalized values determined for the respective consumers (e.g., those consumers having paid fees to the platform).

In some embodiments, a network value of a ContentID includes an acquisition component value and a retention component value. In some embodiments, a retention value is determined as described above. In other words, a retention value may correspond to awards distributed based on recent utilization data. Notably, as outlined above, some events may correspond to acquisition of a consumer, such as a new subscription or initial purchase, and rewards for those events may be captured in a current award period by the retention value calculation. For example, a consumer newly subscribes or makes an initial purchase, the utilization data reflects access of content or assets corresponding to the event, and corresponding awards may be distributed. However, in some embodiments, it may be desirable to award a contributor of content or asset leading to that new subscription or initial purchase for at least some additional number of award distribution periods so long as that consumer inputs additional value (e.g., subscription renewal or subsequent purchase). An example process for determining a retention component value is described below.

In some embodiments, a value 604A determined for a ContentID (and which may also be considered in the analysis described above) is stored as an acquisition value. For example, a value 604A determined for a ContentID in response to a consumer acquisition event may be stored as an acquisition value (e.g., whereas a value 604A determined for a ContentID in response to a consumer retention event may not be stored as an acquisition value). In some embodiments, acquisition values are stored in association with consumer records. Thus, for example, acquisition values for one or more ContentIDs may be identified in a record of utilization for a consumer. In some embodiments, the stored acquisition values are values corresponding to determined measures of network centrality of the ContentIDs. For example, a stored acquisition value for a ContentID may be determined based on the determined measure of the network centrality of the ContentID relative to the sum of measures in the set of ContentIDs, and thus the values may denote a share of acquisition awards.

In some embodiments, acquisition allocations are decayed, such as according to a linear or exponential decay rate, like $(0.99e^{-rt}+0.01)$, where t corresponds to time and r corresponds to a selected rate of decay. In turn, in some embodiments, an acquisition component value at time t (e.g., based on a current time less stored acquisition value time stamp) for a given rate is determined based on current decay rate, e.g., $(0.99e^{-rt}+0.01)$ and retention component value may be determined according to $1-(0.99e^{-rt}+0.01)$. Accordingly, stored acquisition values may be adjusted by the acquisition component value and current retention values may be adjusted by the retention component value. For example, for a set of acquisition values (e.g., 0.2, 0.3, 0.5) for ContentIDs (e.g., A, B, C) for a User A, a set of current retention values (e.g., 0.1, 0.4, 0.5) for ContentIDs (e.g., X, Y, Z) for User A based on current utilization data 516, 520, and an acquisition component value of 0.2 (with corresponding retention component value of 0.8), the acquisition values in the set may be adjusted by AcqVal*.2 and the retention values in the set may be adjusted by RetVal*.8. Accordingly, network value attribution 602A for ContentIDs A,B,C,X,Y,Z may be 0.04, 0.06, 0.1, 0.08, 0.32, 0.4, which again sum to a value (e.g., 1) denoting rewards share. In turn, for a subscription fee of $10 paid by User A, allocation to ContentID Z may correspond a reward share of $4 (0.4*$10) and so on for the other ContentIDs. Further, as described above, those values may be modified based on a total consumer input onto the platform to indicate share of allocation, e.g., if a subscription fee is $10 and 1000 subscriptions are paid for by consumers, award distribution corresponding to a subscription is 0.001, and thus a value of ContentID Z may be reported as 0.4*.001, or 0.0004 (0.0004*$10000 in fees yields $4).

As described above, a network value attribution 602A may comprise an assignment of values 604A to ContentID 603 represented within one or more graphs based on measures of network centrality. In some embodiments, a network values attribution 602B process comprises an assignment of values 604B to ContributorIDs 605. In some embodiments, Contributor or Content Records 606A are accessed to determine the contributors of the content items corresponding to the ContentIDs. In some embodiments, each of the contributors has associated therewith a unique identifier, like a ContributorID, which may be an address on a blockchain network or otherwise associated with an address on a blockchain network such that an address corresponding to a contributor can be identified.

In some embodiments, the network value attribution 602B process comprises identifying a set of contributors associated with at least one of the respective content items or assets corresponding to ContentIDs identified for award allocation (e.g., in 602A). In some embodiments, the values 604A determined for the ContentIDs 603 are assigned to their respective contributors by ContributorID. Where a contributor is associated with a plurality of content items or assets by ContributorID, the values corresponding to those ContentIDs may be summed to determine a value 604B for that ContributorID. As the values assigned to ContentIDs may already be normalized, those values may be tabulated for associated ContributorIDs and awards may be distributed 608 to the contributors at their respective addresses based on the tabulated values. For example, Contributor 606A and Contributor 606B having provided content items or assets to the platform 609 for which values 604A were assigned to the ContentIDs 604 of those respective items or assets may be awarded.

In some embodiments, the network value attribution 602B process may additionally comprise determining one or more graphs or appending to a graph based on user A utilization data 516, 520, such as for each session or by award distribution cycle. As described above, the graph may include identifying information about the content items or other assets which a user accessed, like ContendIDs, and information about the access and information describing relationships between different content items and events (like subscription events, purchase events, login events, etc.). In some embodiments, a first graph, such as a graph of nodes representing content items, is transformed in a second graph, such as a graph of nodes representing contributors (or contributors and content items). Contributors (e.g., by ContributorIDs) of respective ones of the content items may be determined based on contributor or content records 606A. Thus, for example, from one or more analyses of the second graph, attribution values 604B may assigned to ContributorIDs 605 represented within the graph, such as based on a measures of network centrality with respect to ContributorIDs 605. The values 604B may be determined, adjusted, or otherwise modified according to one or more of the techniques described above with respect to ContentIDs. Similarly, the values 604B determined based on the network centrality analysis for contributors may be normalized. Accordingly, an awards share between ContentIDs and ContributorIDs (noting that a ContributorID is also allocated a ContentID share) may be adjusted according to a ratio, like 1:1, or other ratio. In some embodiments, the ratio may be adjusted to strike an award balance between different types of contributors (e.g., high volume vs low volume) and properties of the content or assets they provide and how influential a given contributor is in acquiring or retaining consumers. For example, a contributor that provides new content every month may be most influential to retainment of a given consumer even though that content may be short in duration (e.g., a short skit) and the consumer accesses other content. A measure of network centrality calculated with respect to contributors may capture additional relationships for awards beyond a content focused analysis. Accordingly, in some embodiments, a content award share and contributor award share for a given contributor may be summed and assigned as an award value 604B for the ContributorID.

In some embodiments, values 604B for ContributorIDs 605 are reported to one or more federated servers, stored in a record on a blockchain, or input to a smart contract executed by a computing node. In turn, another entity or smart contract by which attribution awards are distributed 608 may determine an amount of awards attributable to the platform 609, such as by an amount of burn performed by the platform 609 relative to total burn across all platforms. In some embodiments, a portion of the awards (e.g., 15-35%) are allocated to the platform 609 and the other portion of the awards (e.g., 85-65%) is divided among the contributors 606A, 606B to the platform based on the values 604B associated with their ContributorIDs 605. In other words, if platform received fees for 1000 subscriptions, and other platforms received 4000 subscriptions (all at $10), 20% of awards are attributable to the platform 609, of which 30% are allocated to the platform (e.g., transferred to an address accessible by the platform) and 70% are allocated amongst contributors 606 based on the values 604B (e.g., transferred to addresses of contributors 606).

In some embodiments, one or more other entities are allocated awards, such as federated servers, which may be an amount (e.g., 1-5%) of total awards. In some embodiments, the amount is variable, such as based on an average gas rate or a number of transactions or operations performed duration a period for which awards are being distributed. In some embodiments, that amount of awards is allocated amongst the federated servers, such as based on amount of work performed, gas fees paid, or other metric indicative of participation within the ecosystem layer. For example, in some embodiments, each platform determines a set of ContributorIDs 605 and corresponding values 604B (e.g., by steps 602A and 602B) for attribution award distribution 608 which may be verified by federated servers. In another example, one or more other entities perform steps 602A and 602B, like one or more federated servers or computing nodes by executing a smart contract. Accordingly, some amount of total awards may be allocated to addresses associated with those entities effecting ecosystem layer protocols.

The above approaches of determining network centrality for award distribution are expected to scale better than more naive approaches, e.g., computing exact Shapley values. The approaches are expected to be particularly advantageous because they are empirically driven by actual consumption and avoid the combinatorial explosion of computation from direct computation of Shapley values. It should be emphasized that data structures need not be labeled as graphs in program code to constitute a graph. It is enough to encode the requisite entities and relationships, which can be done in various forms, e.g., key-value stores, relational databases, state of objects in object oriented programming languages, etc. Relevant scales of operation are expected to include more than 100, more than 1,000, and in many implementations, more than 10,000 different content items or assets, from similar numbers of contributors, with more than one, two, or three orders of magnitude more consumer computing devices interacting with the content items or assets.

Figure 7:
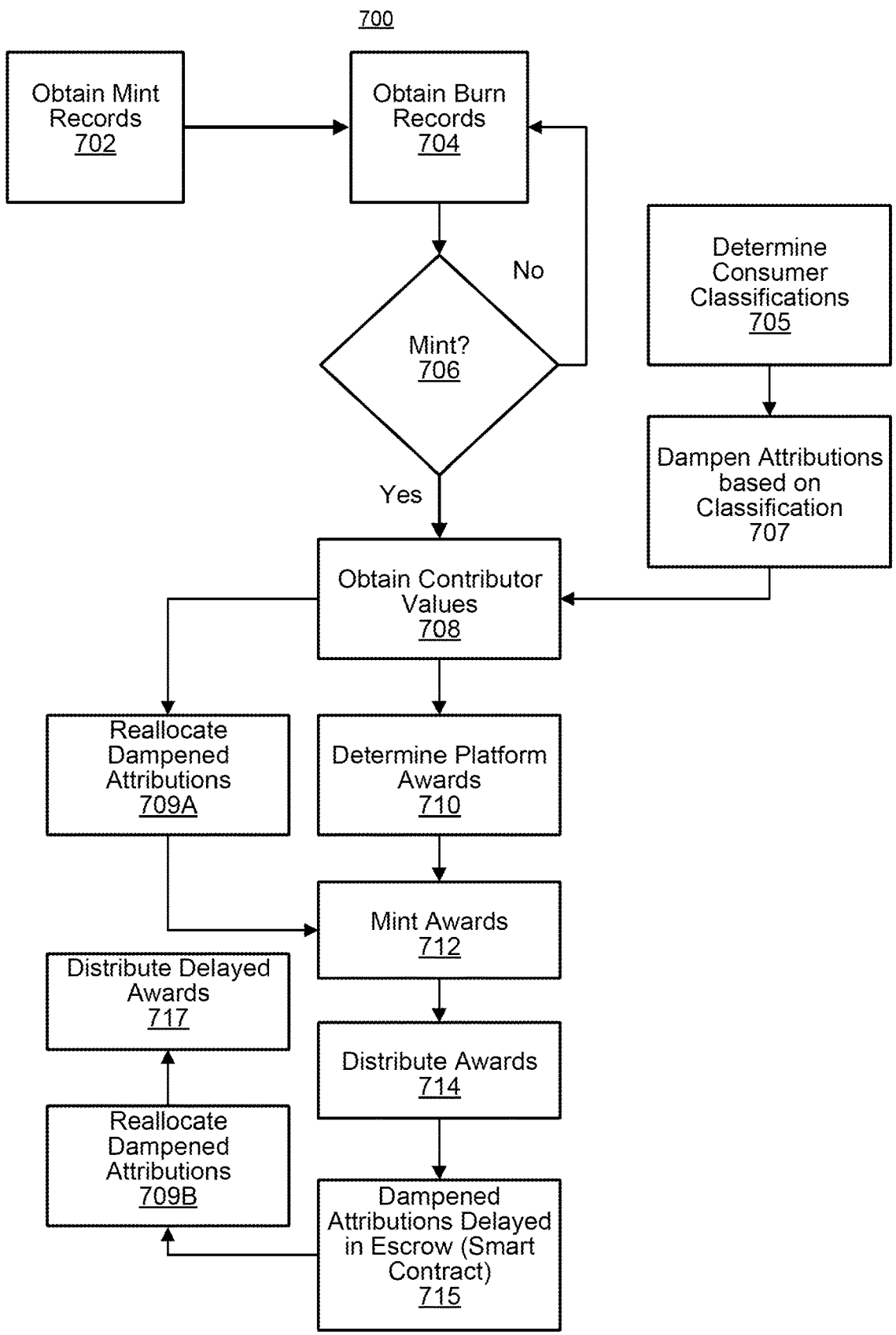
FIG. 7 is a diagram depicting an example of a process by which allocations of attribution tokens may be dampened based on non-organic subscriber behavior in accordance with some embodiments.

FIG. 7 is a diagram depicting an example of a process 700 by which allocations of attribution tokens may be dampened based on non-organic subscriber behavior in accordance with some embodiments. In distributed systems, and especially those in which different entities are engaging in exchanges, some amount of arbitrage can be expected. In example embodiments discussed here, attribution tokens are portioned and allocated to contributors, such as based on the interactions of subscribing consumers with content provided to a platform by the contributors.

As outlined with respect to FIG. 4, attribution awards may be created and allocated based on a measure of network centrality determined based on graphs of consumer utilization data (e.g., tracked interactions of the consumer). Thus, a consumer may subscribe (or renew subscription) at a time Ts, awards capturing the event (and interactions of the consumer) may be created (e.g., mint of attribution tokens) and allocated (e.g., as attribution of amount of tokens) to a contributor at time Ta, and those awards (e.g., tokens allocated for Ta mint period) may be redeemed by the contributor at a time Tr. As Ts<Ta<Tr, the value of awards at Tr in the denomination of the subscription may exceed the original subscription value input at Ts.

As a network grows, a resulting increase of value of attribution awards is to be expected, by virtue of network effects, and constitutes a reward those contributors which contributed positively to the growth of the network. Arbitrage can be detrimental in instances where contributors that do not positively affect growth of the network attempt to receive an allocation of awards at time Ta that, for example, exceeds consumer subscription value input at Ts. If the attempt is successful, those contributors may extract value greater than subscription value at Ts from the ecosystem at a time Ta (e.g., Tr=Ta, or shortly after Ta considering practical limitations) without any positive contribution that network effects. Embodiments may adjust allocations of attribution awards based on various metrics about consumers that may be processed to determine their respective contribution towards network effects (e.g., known positive consumer behaviors). In some embodiments, those metrics may be processed to determine classifications indicative of contribution towards networks effects for consumers. Allocations of awards based on consumers exhibiting illegitimate behavior or other behavior that does not positively drive network effects may be dampened (e.g., to mitigate or prevent arbitrage, but also to reinforce organic consumer engagement rather than reward non-organic consumer engagement). In some cases, those awards which would otherwise be allocated based on those consumers which are dampened are allocated based on other consumers, such as those other consumers determined to positively drive network effects.

Contributor arbitrage attempts may be characterized by and identified by inorganic consumer behaviors (or other forms of inauthentic consumer behaviors). For example, a consumer that subscribes to the platform in association with a given contributor and subsequently exhibits atypical consumption behavior. Examples of atypical consumption behavior may include patterns indicative of inorganic consumption of a single content item or contributor, or a limited subset of content or contributors, by a consumer or collection of consumers. Patterns indicative of inorganic consumption may be determined from one or more of interactions of individual consumers, interactions of collections of consumers (e.g., of a content item or contributor or subset thereof), or consumer interactions in the aggregate for a given contributor or content (or subset thereof). For example, patterns of inorganic consumption may be based on interactions indicative of low-quality consumption of a single content item or contributor, or within a limited subset of content or contributors, or even interactions indicative of high-quality consumption (but which may be distinguished from organic high-quality consumption patterns) of a single content item or contributor, or within a limited subset of content or contributors.

Such patterns, in extreme cases, may be associated with different arbitrage attempts by contributors, such as by covering a portion of a subscription fee for a consumer to subscribe (at least initially or for a period of time) to receive attribution rewards (e.g., at time Ta) greater than that portion of the subscription fee input. In some cases, (e.g., outside of a specific attempt by a contributor to arbitrage) consumer behavior may simply not be indicative of a positive contribution to the network relative to other consumers. Although embodiments disclosed in preceding processes for allocation of attribution awards may account for arbitrage in a variety of ways, such as based on measures of quality user interactions, decay of initial subscription value over time, and allocation of portions of subscription fees to platform providers, each of which may contribute to a limitation on allocations at Ta to a value less than proportional Ts input of a given consumer at subscription, disclosed embodiments below present specific processes to achieve such results within the relevant context and which may provide improvements over those prior processes or when implemented in combination.

Differences in behavior among subscribing consumers is expected. Utilization records of different consumers may indicate vastly different behaviors between two consumers that are each legitimate. Consumer A, for example, may frequently browse and consume new (or older) content provided by a variety of different contributors, such as in response to recommendations based on consumption of other content, and those interactions may be of high value to the network in terms of their contribution to network effects. Another consumer B, for example, may only consume content from a given contributor (or a very limited set of contributors, like two or three), and while those interactions may be legitimate or illegitimate, they may be of less value to the network in terms of their contribution to network effects than those of consumer A (e.g., their value to the network is, at best, low while their value to the given contributor is high). In cases of illegitimate consumers exhibiting behavior like consumer B in relation to a given contributor, they oftentimes serve only to facilitate an arbitration attempt by the contributor to liquidate value from, rather than contribute value to, the network. These illegitimate consumer behaviors arising in relation to contributors not acting in good faith may, in addition to not contributing to network effects, derive disproportional attribution awards for contributors not acting in good faith. Contributors acting in good faith may derive less attribution awards from consumers contributing positively towards network effects because the illegitimate consumers decrease the value of a subscribing consumer at a given time (e.g., over the period prior to Ta).

Some embodiments may flag consumers exhibiting illegitimate consumer behavior, such as to dampen allocations of attribution tokens based on the interactions of those consumers. In some embodiments, allocations of attribution tokens based on those flagged consumers may be dampened to a proportion of subscription cost, which may be implemented in addition to (or instead of) other proportional allocations disclosed herein. As described above, such as with reference to FIGS. 5A and 5B, interactions of consumers within the ecosystem layer are tracked in various embodiments. In some embodiments, interactions of a consumer, like a record of utilization 526, may be stored within a consumer record or otherwise associated with the consumer or consumer record, and FIG. 6 depicts an example record of utilization 526 for an example user A. Embodiments may include thousands, hundreds of thousands, or even millions of users and a corresponding number of records of utilization that interact with one or more platforms or other entities within the ecosystem layer.

A record of utilization for a consumer that is populated with utilization data tacking events, like registration, subscriptions, and the like, interactions before and after those events, like browsing, selecting, consuming, or otherwise accessing content and other assets, and other operations performed by consumers, may be processed to determine whether to dampen attribution awards associated with the consumer. The record of utilization for the consumer may be processed individually, or in association with other records of utilization of other consumers, to determine whether to dampen attribution awards associated with the consumer. In some cases, such as in processes where the record of utilization of the consumer is processed in association with other records of utilization of other consumers, a process may determine to dampen attribution awards associated with a collection of consumers. Some embodiments may cluster records of utilization, such as by encoding (e.g., within a vector or other data structure) values associated with different ones of utilization data tacking events based on interactions before and after those events, values associated with accessing content and other assets, or other operations performed by consumers, determining distances between different one of the records of utilization based on their respective vectors, and clustering records of utilization into sets of records of utilization exhibiting similar behaviors based on the distances. Multiple records of utilization may, in turn, be classified (e.g., in the aggregate within a given set) based on determined measures of network effects of a subset of those records (e.g., one or more seed utilization records indicative of a given measure of network effects or consumer records for which network effects were previously determined) within the cluster. For example, a set of utilization records may be classified based on whether they exhibit consumer behaviors that contribute positively (or negatively) to network effects (or degree thereof). An example classification may be binary (e.g., 1=determined positive, 0=determined negative), and an unassigned value may simply correspond to neutral or unknown. An example classification may also be a weight, such as from 0-1 (or some other range, like −1 to 1), where the higher the weight the more positive the determined effects and the lower (or more negative) the weight the more negative the determined effects, and a natural classification may be positioned between the upper and lower value.

In some embodiments, such as after determining whether to dampen attribution awards associated with a plurality of consumers, the utilization records of the plurality of consumers may be analyzed to determine whether to dampen one or more contributors of content with which those consumer engaged. In some embodiments, attribution awards resulting from the plurality of consumers classified as exhibiting inauthentic behavior may not be damped granularly, but rather the classification of those consumers may be analyzed to classify contributors for dampening at the contributor allocation level. In other words, a plurality of consumers may be classified as exhibiting inauthentic behavior, and the interactions of those consumers may be associated with a given contributor or content provided to the platform by the given contributor. Thus, for example, where a threshold number of consumers of content of a given contributor are classified as being inauthentic, the given contributor may be deemed inauthentic, and in turn, attribution awards to the given content contributor may be dampened. Embodiments may classify contributors as inauthentic based on utilization records of consumers as contributor behaviors which produce an imbalance of inauthentic to organic users are often external to the platform (e.g., in various arbitrage examples). For example, a plurality of subscriber accounts (e.g., of potential consumers) may be created by the contributor, potential consumers at the behest of the contributor, or even a bot farm, for the purpose of accessing content of the contributor to artificially enhance (apparent) value of that contributor on a distributed platform. Accordingly, in at least some example embodiments, imbalances in consumer classifications within a set of consumers having accessed contributed content of a given contributor (or a set of contributors) may be detected (e.g., for classifying those contributors as being inauthentic based on behaviors in their consumer base) to dampen the given contributor or the set of contributors. Some embodiments may apply dampening at both levels, e.g., awards to be allocated based on inauthentic consumers may be dampened and an aggregate award (e.g., which may include dampened allocations for inauthentic consumers as well as allocation for other consumers) for a contributor may be dampened. In either case, dampening may be applied at the contributor level, and some embodiments may utilize the classification of consumers to determine which content contributors to dampen. For example, as discussed in more detail below, one or more consumers may be classified as exhibiting inauthentic (e.g., inorganic or non-organic) user behaviors. Embodiments may determine to dampen attribution awards based on those one or more users, and that dampening may be applied on a granular per-user basis (e.g., based on classification), or the utilization records of those users may be further analyzed to determine whether to dampen one or more contributors. Embodiments configured to classify contributors for dampening (which as noted above may be applied in connection with or instead of damping on a per-consumer basis) may be based on one or more analyses of consumers, based on their respective classifications, having interacted with content provided to the platform by the given contributor. For example, a content contributor may be classified as inauthentic if a number consumers classified as exhibiting inauthentic behavior having interacted with content provided to the platform by the content contributor exceeds a threshold. An example threshold may be based on a number of consumers classified as exhibiting (or potentially exhibiting) inorganic behavior relative to other users (e.g., those not classified as exhibiting inorganic behavior or classified as exhibiting organic user behaviors that contribute positively towards network effects) having interacted, as indicated by the respective utilization records of the consumers, with content provided to the platform by the contributor. In some embodiments, such as where a number of consumers classified as exhibiting (or potentially exhibiting) inorganic behavior relative to other users exceeds a second threshold, like a second threshold greater than a first threshold for classifying the contributor, those other users may be classified as exhibiting (or potentially exhibiting) inorganic behavior for a configurable period of time, or until deemed to not be exhibiting inorganic behavior, by virtue of having interacted, as indicated by their utilization records, with content provided by the content contributor.

In some embodiments, the utilization data is stored in (e.g., for a session) or tabulated to form a plurality of directed graphs in which nodes correspond to content items or other assets, and edges indicate transitions from one content item or asset to the next in such a session. In some embodiments, one or more nodes correspond to events represented within the utilization data. Thus, one or more edges may indicate transitions from a content item or asset to an event and from the event to a content item or asset. Events may be indicative of access to the platform, such as a user subscribing to the platform, like an subscription event, or renewal of a subscription, which may occur initially (e.g., like an initial subscription event) and then periodically (e.g., like a renewal of a subscription), which in either instance may correspond to user permissions to access certain content, like content available to subscribers, and the one or more accesses to the platform prior to or over a duration of a subscription, such as by user login, or utilizing an application or browser to which the account of the user is logged in, to access platform content. Accessing platform content may include interacting with content, such as viewing content, or browsing content, which in either case may be associated with one or more content contributors. In some cases, edges may be weighted according to the various metrics indicative of the user's interactions to and appreciation for the content item or asset (e.g., with a weighted score based on a plurality of values of attributes, or a vector with various scalars corresponding to the different attributes). In some cases, the edges may also be associated with the user or various collections of users, e.g., those paying a particular subscription, those in a demographic or psychodemographic class, those on a particular distribution platform, or the like. In some embodiments, a clustering process may determine clusters based on the transitions between nodes and edge values of the transitions between nodes. For example, a set of utilization records may be identified based on a shared transition from a login event (or subscription event) to accessing a same content node (or content nodes associated with a same contributor) and the transitions may be analyzed based on associated edge values indicative of the interaction with the content node. Login events may include a consumer inputting credentials corresponding to an account of the consumer to access content items or may be determined based on the consumer accessing the platform after some threshold period of time of a prior a session (e.g., a consumer may access some content items in a session then after some threshold period of time access some content items in new session, and the beginning of each session may be determined to begin from a login event, or an access event, which may be represented by nodes from which the consumer may transition to a content item node or other node). In other words, periods of access or activity may correspond to sessions for a content-consumer and may be segmented (e.g., to define different sessions or determine new sessions) based on periods of inactivity (e.g., based on a threshold period of time) where a content consumer may not be required to re-login to access content items.

The records in identified set of utilization records may then be filtered from the set based on other metrics, such as number of transitions to other content nodes and associated edge values in a graph, which may occur in a same or different session, such as to filter out utilization records that contribute positively to network effects, and the respective records may be classified accordingly. In some embodiments, a clustering process may determine clusters based on number of content node transitions (and optionally associated edge values) and identify a frequency of occurrence of different nodes within a given cluster. Disparities in frequency of occurrence of nodes among consumers that engage more content and among consumers that engage less content may indicate content nodes associated with bad faith contributors. For example, a frequency of occurrence of a node (or pairwise combinations of nodes transitioned between by a consumer) may be normalized by total number of different content nodes within a cluster of utilization records, e.g., like a measure of popularity for a node (or pairwise combination), which may be compared to a normalized value determined for the node (or pairwise combination) in other clusters of utilization records. If certain nodes or pairwise combinations of nodes are popular with certain clusters of utilization records (e.g., those with few content node transitions indicative of targeted access) but not others (e.g., those with many content node transitions indicative of browsing), utilization records exhibiting targeted access of those content nodes (e.g., based on frequency of occurrence relative to other nodes) may be identified and classified accordingly.

In some embodiments, utilization data of utilization records may be analyzed in accordance with one or more specific metrics indicative of illegitimate behavior. Examples of specific metrics may be captured by evaluations like those described above, however, may be determined for evaluation in combination with, or instead of, those techniques. In cases, these specific metrics may be configured to classify near-term behaviors prior to more implementation of longer-term evaluations of utilization records, like an estimated classification based on limited information, but which may be confirmed or based on determinations described in the aforementioned techniques. Some embodiments may analyze a subset of utilization records, like a subset of utilization records corresponding to newly subscribed consumers, to identify whether those utilization records exhibit initial behaviors more similar to legitimate or illegitimate consumers. For example, consumers typically do not subscribe to a service and then fail to exhibit some threshold degree of user interaction. A new subscriber, for example, may access some content within a series of content, like episodic content, and may often access a first (or popular) episode of the content, followed by other content within the series. Legitimate subscribers (e.g., based on classification) characterized by a similar entry event (e.g., determined from utilization records of those subscribers) onto the platform may exhibit a higher degree of initiate engagement with that content, such as by viewing the content from start to finish, and other content within the series. Those legitimate subscribers may also browse and consume at least some other related content within a threshold period of time. In order words, legitimate subscribers may be drawn to subscribe to access some specific content but also attempt to engage at least some other content, such as to determine value proposition of the subscription beyond the initial impetus to subscribe. Moreover, those initial interactions may exhibit other traits, like dwell time between accessing a platform or content of a contributor and determining to subscribe to access the content or platform, and whether the consumer engages other content frequently accessed by other subscribers also accessing content initially interacted with by the new subscriber and associated dwell times between those interactions. Example metrics indicative of the user interactions to and appreciation for the content item(s) (e.g., dwell time after click-through, whether the supply element was searched for by the user or reached through automated content recommendation, direct access via URL or other resource locator, whether playback completed, and the like) initially accessed by the new subscriber may be determined and compared to those of other subscribers to determine whether new subscriber behavior is more similar to subscribers classified as exhibiting legitimate or illegitimate behavior. Generally, consumers do not subscribe to access some content and then exhibit disinterest in that content, or subsequently fail to browse other available content while maintaining a subscription. The utilization records of new (or even ongoing) subscribers exhibiting traits indicative of illegitimate behavior as determined from metrics indicative of their (lack of or lack of breadth of) interactions to and (lack of or targeted) appreciation for content item(s) may be examined relative to other new subscribers determined to exhibit traits indicative of legitimate behavior. For example, one or more trends among the content item(s) accessed by those potentially illegitimate subscribers as indicated by the utilization records may be analyzed relative to trends among the content items accessed by other new subscribers. For example, frequency of occurrence of content items within the utilization records of potentially illegitimate subscribers may be normalized and compared to normalized frequencies of occurrence of content items within the utilization records of other new subscribers. In turn, a set of ContributorIDs associated with content items disproportionately represented within the subset of potentially illegitimate subscribers may be identified. In some embodiments, frequencies of occurrence of content items may be summed by contributor, such as to determine which (if any) ContributorIDs occur disproportionately within the subset of potentially illegitimate subscribers but not for any one content associated with the contributor. New subscribers classified as being potentially illegitimate and which accessed given content or some content of a given contributor that occurs disproportionately (e.g., above a threshold value) relative to accesses by other new subscribers may be classified as being illegitimate. It is expected that some legitimate new subscribers may temporarily exhibit illegitimate behavior, and thus, accesses of content or content of contributors within the set of potentially illegitimate subscribers that occur proportionally to accesses by other new subscribers need not warrant classification as being illegitimate. It is also expected that some new subscribers may subscribe with ill intent but instead exhibit legitimate user behavior. These new subscribers need not be identified because their contribution to network effects is not consolidated to a single (or small set of) contributors.

The above noted set of ContributorIDs may be analyzed in connection with subscribers having accessed content of a respective contributor. Specifically, in response to determining whether a ContributorID occurs disproportionately within the subset of potentially illegitimate subscribers, utilization records of other subscribers may be analyzed to determine a second subset of subscribers not classified as illegitimate (or potentially illegitimate) for which the ContributorID is represented in their utilization records (e.g., by interactions with content associated with the ContributorID or other association discussed herein). Thus, for example, the size of the illegitimate subset may be compared to the size of the legitimate subset. In some cases, the comparison may be indicative of a ratio of legitimate subscribers to illegitimate (or potentially illegitimate) subscribers for which the ContributorID is represented in utilization records. In turn, if the ratio exceeds a threshold, like a threshold ratio of subscribers having an illegitimate (or potentially illegitimate) classification to legitimate subscribers, the ContributorID may be classified as being characterized by subscribers exhibiting inauthentic behavior and selected for dampening. For example, in response to determining greater than 20% are illegitimate, some embodiments may classify contributor as problematic, and some embodiments may combine tiers of such classifications with subscriber level dampening. The ratio may be based on representation of the ContributorID in utilization records over a trailing duration of time, such as to account for brigading attacks or a period of inauthentic subscriber behaviors that is otherwise transitory. Some embodiments may classify ContributorIDs as contributing positive towards network effects, such as by determining which ContributorIDs are characterized by subscribers exhibiting positive behavior, such as based on a ratio like that described above, but which may be compared to a different threshold, like a threshold indicative of less than a background ratio of illegitimate to legitimate subscribers determined for the platform.

Thus, dampening may be keyed to any one of three dimensions (or various permutations thereof) in some embodiments: dampening may be tied to the content consumer so that it affects compensation based on that consumer's behavior, dampening may be tied to contributors so that it affects compensation based on that contributor's content; and dampening may be tied to content (e.g., a subset of content of a contributor) so that it affects compensation based on the respective units of content.

Disclosed techniques may modify initial classifications of consumers or content contributors. The ongoing monitoring and tracking of consumer utilization of content or other assets may occur on an ongoing basis (e.g., data structures are formed and populated during a session) or in batch, such as prior to determining an allocation of awards to contributors. For example, as a consumer accesses content or assets, embodiments monitor for and track consumers interactions pertaining to and surrounding that access, such as to track user interactions and access of content or assets associated with the respective contributors, and the utilization record of the consumer may be updated based on those tracked interactions. Thus, for example, the measure of network effects determined for the utilization record for the consumer may be updated over time, and as a result, classification may also change over time. In some cases, utilization records may indicate which content items were consumed, an identifier of the consuming party, and various metrics indicative of the user interactions to and appreciation for the content items (e.g., dwell time after click-through, whether the supply element was searched for by the user or reached through automated content recommendation, whether playback completed, and the like). Ratios like those described above by which ContributorIDs may be determined to be dampened (or not dampened) may be redetermined subsequent to one or more changes in subscriber classifications.

Thus, for example, for a given content item, determined classifications of those consumers which interacted with the given content item may be tracked, and similarly may be tracked in the aggregate for a contributor based on the content items provided by that contributor.

Attribution values for contributors, in turn, may be determined based at least in part on the classifications of the consumers of the content provided onto the platform by the respective contributors. In some embodiments, an entity, like a platform server, collects the record of utilization comprising utilization data for a consumer and determines a network value attribution by which awards may be distributed to contributors. For example, a network value attribution may include determining one or more utilization graphs or appending to a graph based on consumer A utilization data, such as for each session or by award distribution cycle. As described above, the graph may include identifying information about the content items or other assets which a user accessed, like ContentIDs, and information about the access and information describing relationships between different content items and events (like subscription events, purchase events, etc.). From one or more analyses of the graph, attribution values may assigned to ContentIDs represented within the graph. In some cases, attribution values (e.g., for a given consumer) may be adjusted based on a determined classification for the consumer. For example, attribution values derived from a consumer classified as illegitimate may be dampened (e.g., reduced) to mitigate (or prevent) arbitrage by one or contributors to which those attribution values are allocated. The amount of dampening may be based on one or more factors described below. In some cases, the difference between the dampened amount that is allocated and undampened amount may be allocated to a pool for reallocation to other contributors based on attribution values derived from other legitimate consumers.

In some embodiments, such as where classifications of consumers are granular (e.g., weighted or at least positive, neutral, negative) the amount added to the pool may be reallocated to contributors by adjusting attribution values derived from other consumer based the respective classification of the consumers (e.g., based on weights or evenly for a given classification). Some embodiments may redistribute the attribution awards in the pool in the mint period in which they were determined, e.g., when they would have been allocated. Some embodiments may implement a delay between the pooling of an amount of attribution awards for reallocation and the reallocation of those awards, such as by attributing the amount of attribution award for reallocation into escrow, such as to a smart contract configured to hold the amount for some configured period of time and then distribute those awards. In some examples, the smart contract may be configured to receive redistribution amounts for contributors (e.g., prior to redistribution), which may be based on classifications of consumers that are adjusted over an escrow period. Thus, for example, should a consumer for which attribution value were dampened be determined not to exhibit illegitimate behavior, at least a portion of that attribution value may be reallocated to one or more contributors that were awarded less based on the dampened attribution value. In some embodiments, the full difference may be awarded, however, the reallocation may also distribute based on utilization record information gathered during at least a portion of the escrow period for the consumer or the utilization record information which results in the reclassification (e.g., to prevent a delayed arbitrage). Accordingly, configurations implementing a delay may mitigate false positives in initial classifications of consumers by reducing reliance on dispositions of classifications for noisy immature utilization records (e.g., of new subscribers). The escrow period may be defined in days, or weeks, or as a function of mint periods (e.g., processed after 1, 3, 5 or more subsequent mint periods), after the amount of attribution award which was placed in the escrow pool rather than distributed in a mint.

FIG. 7 illustrates an example of a process 700 by which allocations of attribution tokens may be dampened based on non-organic subscriber behavior in accordance with techniques like those described above. Process 700 is illustrated within the context of that by which attribution awards may be created, but some steps may be implemented within the context of other processes like those described with reference to FIGS. 5 and 6. Example process 700 may assign and distribute created attribution awards in accordance with one or more embodiments, which may incorporate the above described techniques to reward contributors based on consumer behaviors that positively drive network effects. In some embodiments, one or more steps of process 700 may be performed by a computing node of a blockchain network that loads and executes one or more smart contracts. Some steps of the process 700, however, may be performed by other entities in some embodiments. In some embodiments, those other entities reach consensus on results of one or more steps and those results are processed by a smart contract. Various examples are provided below. In some embodiments, the awards may be based on a measure of network centrality determined based on graphs of consumer utilization data (e.g., tracked interactions of the consumer).

In some embodiments, the process 700 includes obtaining 702 mint records. As outlined previously, mint records may be stored on-chain, off-chain, or a combination thereof. In some embodiments, a mint record includes one or more entries identifying a period (e.g., PeriodID), Timestamp, record keeping value (e.g., FIN value) transacted, and amount of RAE minted for one or more mints. In addition, entries may include cryptographic hash addresses corresponding to mint records stored on a blockchain network by which entry values can be verified. A mint record may also contain data about a next (e.g., current mint), such as an entry specifying a current PeriodID, Timestamp, record keeping value (e.g., FIN value as a target value), and amount of RAE to be minted. The amount of RAE to be minted may be based on PeriodID, such as by logic encoded within a smart contract. For example, in some embodiments, an amount of RAE minted may decrease over time, such as after a fixed or variable number of mints, the number of which may be tracked by PeriodID and verified based on mint records stored on the blockchain network. For example, an amount of RAE minted may start at an initial value and decrease after X many, after f(x) many, or other amount of mint Periods. For example, if an initial amount of RAE to create per mint is 10,000, the amount may be halved every 1700 mints, e.g., to 5000 at PeriodID 1700, 2500 at PeriodID 3400, and so on. Thus, for example, a total amount minted may converge on a fixed value (e.g., 34,000,000), but allocated in ever decreasing amounts. The above noted amounts are illustrative, in some embodiments an initial amount may be fixed (e.g., remain the same) or decrease according to another mechanism (e.g., a decay function, linearly, other exponential value, logarithmically, by some other function, or otherwise).

In some cases, a RAE to unit subscription value may be tracked in mint records, e.g., to track an amount of RAE which corresponds to a unit subscription value in accordance with exchange rate over time. The amount of RAE which corresponds to a (e.g., fixed over time) unit subscription value may decrease over time (e.g., RAE token increases in value) due to the burning of attribution awards and decrease in amount of RAE created per mint, which may influence exchange rate. A RAE to unit subscription value may be determined for a current mint, and may serve as a basis for dampening. Unit subscription value may be tracked in record keeping value (e.g., FIN value) by which RAE to unit subscription value may be determined. In some embodiments, a RAE to unit subscription value for a current mint is determined based on a measure of central tendency (e.g., mean, mode, or median) of RAE to unit subscription value over a trailing duration of mint periods, or over the last mint period, or from the last period to when a determination to mint for the current period is made (e.g., in block 706). Other measures may be utilized, like a current value at time of mint, or a fixed threshold may be utilized. Step 702 may incorporate all or some of the functionality described with reference to FIG. 4.

In some embodiments, the process 700 includes obtaining 704 burn records. Burn records may be stored on-chain, off-chain, or a combination thereof. In some embodiments, a burn record includes one or more entries including a TxID (e.g., a hash), Eater Address, Block # (e.g., block including the TxID), Block Timestamp, Rate, FIN value, Confirmation Blocks (e.g., number of blocks deep), Confirmation True/False, and PeriodID (e.g., a current burn period). TxID may correspond to (or the entry may include) a cryptographic hash address corresponding to the transaction (which includes transaction information like the cryptographic hash addresses of parties to the transaction, which may include an address of a smart contract) as recorded on a blockchain network by which entry values can be verified. As described above, a FIN target value may be specified for a current mint period. Accordingly, burn events occurring during the current period, whether by timestamp corresponding to the current period (e.g., based on a starting timestamp in a current mint record) or by current PeriodID (e.g., based on current PeriodID in a current mint record) may be identified. From those burn events, burn events having a confirmation block greater than a threshold value, such as a threshold value corresponding to finality of a block (e.g., >=35 in Ethereum, 6 in Bitcoin, or other value based on the underlying blockchain network), and part of the current chain, (e.g., Confirmation=True), may be identified to a set of burn events. The FIN values corresponding to those events identified to the set of burn events may be summed (or, in some alternate embodiments, a measure of central tendency may be determined if the FIN target value is a mean, median, or mode across burn transactions in the period, or that measure may be multiplied by number of events in the set). In some example embodiments, and for ease of explanation, the sum of the FIN values corresponding to the burn events in the set is used. In either instance, a determined value (e.g., a sum, a measure of central tendency, or measure of central tendency times number of burn events in the set, noting that the mean times the number of burn events in the set also yields the sum) may be compared to the target FIN value (which may be based on a measure of central tendency in similarly determined values for considered PeriodIDs over a trailing duration as described above). The comparison may yield a determination as to whether mint criteria is met or not met 706. For example, if the determined FIN value for the current period does not exceed the target FIN value for the period, the process 700 may obtain additional burn records meeting the above described criteria until the set of burn events for which a FIN value for the current period is determined meets or exceeds the target FIN value. For example, as additional blocks (or states) containing one or more burn events reach finality as determined from obtained burn records 404, the burn events of one or more additional blocks may be added to the set of burn events for the current period and an updated FIN value is determined for comparison to the target FIN value (e.g., until determined FIN value meets or exceeds target FIN value). In turn, at step 406, when the determined FIN value for the current period exceeds the target FIN value for the period, mint operations for the current period may commence.

In some embodiments, when mint criteria is met, a record of the determination to mint 706 may be published. The record may include an indication that mint criteria is met and information corresponding to the set of burn events on which the determination was based. For example, in some embodiments, a platform server, federated server, computing node or other entity may publish the results to one or more other entities for verification. In some embodiments, the record of the determination is published to the blockchain network. In some embodiments, the record of the determination may be published amongst entities participating within the ecosystem layer. In either instance, one or more entities may verify the determination, which may confer authoritativeness, such as by digital signature of verifying entities. Records of verification may be similarly published according to one or more of the above described protocols or other protocols discussed herein. In some embodiments, verification of the determination includes a consensus protocol, by which a threshold (e.g., at least a majority) of entities agree upon the determination, and mint operations for the current period may commence subject to consensus.

In some embodiments, when mint criteria is met for a current mint period, information for a next mint period may be determined and published. Example information for a next mint may include a next PeriodID, Timestamp, FIN value (e.g., as a target value), and amount of RAE to be minted. In some cases, a RAE to unit subscription value may be determined for the current mint period and published. For example, an amount of RAE which corresponds to a unit subscription value may be determined and published. The amount of RAE which corresponds to a unit subscription value may be determined in accordance with an above described technique for the mint, such as based on a measure of central tendency (e.g., mean, mode, or median) of RAE to unit subscription value over a trailing duration of mint periods, or over the last mint period, or from the last mint to the determination to execute the current mint, or other measure, like a current value at time of mint, or based on a fixed threshold (e.g., amount of RAE at mint time that equals some percentage of subscription unit value).

As a result, burn events occurring after a last burn event (or last block containing one or more burn events) added to the set of burn events for the current period are include in a next set of burn events for determining FIN value of the next period. In some embodiments, a platform server, federated server, computing node or other entity may publish the information for the next mint period to one or more other entities for verification. In some embodiments, the information, like a record, for the next mint period is published on the blockchain network. In some embodiments, the record for the next mint period is published amongst entities participating within the ecosystem layer. In either instance, one or more entities may verify the information, which may confer authoritativeness, such as by digital signature of verifying entities. Records of verification may be similarly published according to one or more of the above described protocols or other protocols discussed herein. In some embodiments, verification of the information includes a consensus protocol, by which a threshold (e.g., at least a majority) of entities agree upon the information, such as to set criteria for the next mint period.

In some embodiments, contributor values for the current mint are obtained 708, such as from platform servers or other entity determining contributor values for one or more platforms. Some embodiments may include requesting contributor values for a platform based on burn events corresponding to the platform within the set of burn events for the current period. In some embodiments, for example, each burn event in the set may have associated therewith an address, like an eater address, associated with a given platform server (or platform) (e.g., a specified eater address to which one or more burn transactions associated with the platform are submitted). In some embodiments, for example, each burn event in the set may have associated therewith an address, like a public address (based on a public key of a public-private key-pair), associated with a given platform server (or platform) (e.g., an address from which an entity associated with the platform utilizes to submit or authorize burn transactions to an eater address). Accordingly, a set of burn events may be identified for the current period (e.g., transactions based on their timestamps or which block or state they are included in) and subsets of burn events may be identified as corresponding to different ones of the platforms based on transaction information. Thus, a request for contributor values for a platform may include at least a subset of burn events corresponding to that platform. Alternatively, contributor values for a platform may be reported by the responsible entity based on information (e.g., about burn events in the set) published in the record of the determination to mint for the current period. An example report many include addresses corresponding to contributors and associated values for rewards to be allocated during the mint. An example report for a platform may include information like that in the data structure below:

```
rewards = [
  { tx_hash: 1    addresses: [0x3d, 0x44, 0x55]
                  percents: [0.4, 0.32, 0.28] },
  { tx_hash: 2    addresses: [0x3d, 0x44, 0x68, 0x55]
                  percents: [0.4, 0.22, 0.10, 0.28] }
]
```

In the above example, contributor addresses and corresponding values are reported for each burn event, like each burn event in the subset of burn events associated with the reporting platform. However, in other example embodiments, such as based on a given reporting structure, those values may be normalized and aggregated. For example, such as where burn events 1 and 2 have a same or similar FIN value (e.g., corresponding to a same $10 subscription fee), an example report for the platform may include normalized and aggregated information across the reported burn events like that in the data structure below:

```
rewards = [
  { tx_hashes: [1, 2]    addresses: [0x3d, 0x44, 0x55, 0x68]
                         percents: [0.4, 0.27, 0.28, .05] },
]
```

Thus, contributor values may be reported in a variety of different ways and confer similar information. Moreover, reported contributor values may be normalized and aggregated by the receiving entity in a similar fashion. In either instance, contributor values may be normalized such that a given set thereof adds up to 1 (or some other static value). In some embodiments, reports include an associated FIN value, such as for each burn event or collection thereof. Further, in some embodiments, reported contributor values or FIN values may be audited and verified by one or more other entities, such as by analyzing one or more records upon which the contributor values are based or burn transactions upon which the FIN values are based according to one or more techniques described above. For example, in some embodiments, FIN values may be determined independently (or audited) based on the burn transaction hashes for burn events, which may include ensuring the burn event information reported by a platform matches the burn event information in the subset of burn events corresponding to the platform for the current mint period.

Some embodiments may determine or obtain consumer classifications, such as in a step 705. Classification of a consumer may be based on the utilization records of the respective consumer. Classifications may be determined for subscribing consumers which are represented in the obtained burn records 704. For example, when a consumer subscribes to a platform, the platform burns a corresponding amount of RAE in a burn event. Thus, burn events over a mint period may be tracked in relation to subscribers associated with those burn events. Utilization records of consumers may be processed to determine classifications for consumers. For example, a record of utilization for a consumer that is populated with utilization data tacking events, like registration, subscriptions, and the like, interactions before and after those events, like browsing, selecting, consuming, or otherwise accessing content and other assets, and other operations performed by consumers, may be processed to determine a classification for the consumer, and thus whether to dampen attribution awards associated with the consumer. The record of utilization for the consumer may be processed individually, or in association with other records of utilization of other consumers, to determine whether to dampen attribution awards associated with the consumer. In some cases, such as in processes where the record of utilization of the consumer is processed in association with other records of utilization of other consumers, a process may determine to dampen attribution awards associated with a collection of consumers. Utilization records may be classified based on whether they exhibit consumer behaviors that contribute positively (or negatively) to network effects (or degree thereof). An example classification may be binary (e.g., 1=determined positive, 0=determined negative), and an unassigned value may simply correspond to neutral or unknown. An example classification may also be a weight, such as from 0-1 (or some other range, like −1 to 1), where the higher the weight the more positive the determined effects and the lower (or more negative) the weight the more negative the determined effects, and a natural classification may be positioned between the upper and lower value. The determined or obtained classifications of consumers represented in the burn records may indicate whether a burn event associated with a given consumer is to be dampened 707 (e.g., for one or more contributors to which attribution tokens (e.g., RAE) are to be awarded in the current mint).

In a step 707 of the process 700, attributions to contributors may be dampened based on consumer classification associated with a given burn record. The attributions may be dampened by virtue of dampening on the subscriber level, or in addition to, or instead of subscriber level damping, consumer classifications may be processed to determine which contributors to dampen on the contributor level (e.g., where a ratio of illegitimate to legitimate consumers having utilization records within which content items of the contributor or the contributor is represented). A report for a platform may incorporate damping, or damping may be applied based on agreement (e.g., consensus) of consumer classifications or any contributor classifications. In either instance, determinations and attributions may be audited. In some embodiments, dampening may be implemented by allocating a portion of awards to a pool, like an escrow, which may be implemented by a smart contract. Thus, for example, for tx_hashes of burn events associated with consumers classified for dampening, an address of a smart contract may be appended to contributor addresses, and allocated a percentage. The percentage may be a fixed value, like 28% of allocation, or the percentage may be based on a value of RAE which would be allocated to dampen the subscription value to a fixed percentage (e.g., 72%). In some embodiments, the percentage may be determined based on a last or trailing number (e.g., selected over a duration or in a number of prior mints) of a conversion multiple of subscription value (e.g., in FIN tracking values) to RAE value, e.g., 1.5× may correspond to 50%, which in some cases may be added to a baseline percentage, like in addition to the 28%, to dampen subscription value to 22% in the example. The value of RAE to unit subscription value (e.g., in FIN tracking value) may be determined based on a measure of central tendency of RAE to unit subscription value over a trailing duration of time prior to the current mint. An example report for a platform may include information like that in the data structure below, where the address 0x77 corresponds to a smart contract implementing escrow for dampening, and a 28% dampening is implemented to reduce portion of burn event allocated to contributors to 72%:

```
rewards = [
{ tx_hash: 1  addresses: [0x3d, 0x44, 0x55, 0x77] // Allocation dampened based on
Classification of consumer corresponding to burn event, smart contract appended to addresses
              percents: [0.288, 0.2304, 0.2016, .28] } // old percents: 0.4, 0.32, 0.28]
{ tx_hash: 2  addresses: [0x3d, 0x44, 0x68, 0x55] // Allocation not dampened for legitimate
Consumer
              percents: [0.4, 0.22, 0.10, 0.28] }
]
```

Thus, contributor values may be dampened 707 based on consumer classification, and the dampened amount may be allocated to a smart contract or other escrow address for redistribution. Contributor values may be dampened in a fashion similar to that above, such as where that contributor is represented for allocation, e.g., some contributor values may be dampened while others are not, instead of dampening on the consumer level for each contributor represented, or a combination of these techniques may also be implemented, such as by stacking consumer level and contributor level dampening (e.g., based on indication of dampening for both a consumer and a contributor represented by address). In some embodiments, the dampened amount may be reallocated 709A to (e.g., other) contributors based on other legitimate consumers (e.g., based on classification as legitimate or determined positive network effects) in the current mint. As an example, for tx_hash 2 of a burn event corresponding to such a consumer:

tx_hash: 2 addresses: [0x3d, 0x44, 0x68, 0x55]
    percents: [0.512, 0.2816, 0.128, 0.3584]}//old percents: [0.4, 0.22, 0.10, 0.28] Allocation augmented for legitimate Consumer above sum of 1, e.g., to 1.28, where the 0.28 is afforded by the 0.28 reduction for the other tx_hash 1 dampened for the burn (in cases with more tx_hashes the dampened amount may be summed and distributed evenly for reallocation based on legitimate consumers or based on weighted contribution to network effects—and dampening may also be implemented in accordance with those principles), and contributor values may be augmented in a fashion similar to that above, such as where that contributor is represented for allocation, e.g., some contributor values may be augmented while others are not, instead of augmenting on the consumer level for each contributor represented, or combination of these techniques may also be implemented, such as by stacking consumer level and contributor level augmenting (e.g., based on indication of augmenting for both a consumer and a contributor represented by address)
]

In some embodiments, platform awards are determined 710 according to FIN value share. As described above, the one or more subsets of burn events in the set of burn events for the current mint period correspond to respective ones of the platforms. Thus, for example, a FIN value for each subset of burn events can be determined. In turn, the FIN value for a subset corresponding to a given platform may be expressed as a percentage of total FIN value of the set. A percentage may be determined for each subset such that a share of awards is determined for each platform according to the percentage. For example:

---
Platform Share = [
  { Platform: [1, 2]
      percents: [0.4, 0.6] },
]
---

In some embodiments, platform share may also include platform addresses for distribution of platform awards (e.g., platforms, like contributors, may also be awarded). For example:

---
Platform Share = [
  { Platform: [1, 2]    addresses: [0xb1, 0xd5]
                           percents: [0.4, 0.6] },
]
---

In some embodiments, platform share and contributor values may be combined into an award share. In some embodiments, platform shares may be dampened or adjusted based on ratios of consumer classifications, like dampening allocations to contributors (or classifying contributors for dampening), based on the classifications of consumers associated with the set of burn events for the platform. Thus, for example, allocations of awards to contributors (and optionally platforms) based on burn events of consumers exhibiting illegitimate behavior may be reduced. The dampened amounts may be held in escrow, such as by appending an address of a smart contract for platform escrow, or redistribution among other platforms. Regardless of the specific implementation, addresses and values may be arguments to a smart contract configured to mint awards 712.

In some embodiments, a computing node executing a smart contract obtains addresses and values as arguments, some example of which are described above. For example, a smart contract configured to mint awards 712 may receive, as inputs in a request, an identifier of the requesting entity, addresses, and values, along with a digital signature of the request by the requesting entity to be verified based on a public key of the requesting entity. In some embodiments, a platform server or federated server submits the request. In some embodiments, one or more other platform servers or federated servers may verify the request or request values, and digitally sign the request or those values, and the digital signatures may be provided along with an identifier of the verifying entity (e.g., public key operable to verify the signature). In some embodiments, the smart contract includes, or accesses a record on a blockchain network that includes, public keys of entities authorized to request the smart contract. For example, the smart contract may determine whether a public key (e.g., identifier) of the requesting entity matches a public key of an authorized entity and verify the signature of the entity based on the public key, the signature, and the data that was signed (e.g., the request or data in the request like addresses and values or cryptographic hash thereof and a timestamp) according to a signature verification algorithm. The smart contract may verify the signatures of the other entities in a similar fashion. For example, in some embodiments, authorized verifying entities may digitally sign a cryptographic hash of the request or request data, and those signatures and timestamps may be included by the requesting entity in the request, and by which the smart contract may verify a cryptographic hash of request data or the request satisfies the signature verification algorithm. Thus, the smart contract may be configured to ensure that the requesting entity is authorized to call the smart contract and the request or data in the request was verified by a threshold number of other authorized entities. If the request cannot be verified, such as by signature confirmation of the requesting entity, or a threshold number of authorized entities have not verified the request (or addresses and values therein), the request may be rejected. If the smart contract verifies the request, the smart contract may mint awards 712.

As described above, the smart contract may mint an amount of rewards in digital bearer assets (e.g., RAE), which may be digital bearer assets conforming to a standard like ERC20 based on a current mint PeriodID. 10,000 RAE for PeriodIDs<1700, for example. Award allocations to various entities may be determined based on values, which may be percentages of RAE. For example, platform 1 may have an award share of 0.4, which corresponds to 4,000 RAE. A portion of platform award share may be allocated to the corresponding platform, such as 15-35%. For an example, for a 30% platform award, 1200 of the 4000 RAE are allocated to the address corresponding to the platform. The remaining 70%, or 2800 RAE, is divided amongst the contributors. For example, for 0x3d, 2800*.4 RAE, i.e., 1120 RAE, may be allocated to that address and so on (e.g., undampened). The allocated amounts may take into account the dampening of attributions in step 707. For example, in the escrow example for 0x3d, the aggregate percent may be (0.288+0.4)/2, i.e., 0.344 rather than 0.4 and less RAE is allocated to that contributor. The 0.28 may be transacted to the smart contract based on the appended address. In the reallocation example, 0x3d would receive less RAE as a result of the dampening for tx_hash 1 (e.g., to 0.288) and in increase for tx_hash 2 due the 0.28 being reallocated to that consumer for which the (0.4) percent of allocation was increased to 0.512, thus yielding (0.288+0.512)/2, i.e., 0.4. Platform awards may be dampened in accordance with similar principles. In some embodiments, one or more of the entities verifying results may be awarded in RAE, or an entity supplying gas fees are awarded in RAE. Accordingly, in some embodiments, addresses for one or more other entities may be specified an percentages of awards specified or determined at time of mint 712. In some cases another entity may be a smart contract for the purpose of an escrow holding, and different smart contracts may hold different escrows, such as where contributor and platform escrows are handled discretely. In turn, for example, if an award share of 5% of RAE (e.g., 500) are allocated to addresses of those entities, platform 1 may have an award share of 0.4 of the remaining 9500 RAE. The percentages may be adjusted in other ways, such as normalized to each correspond directly to a RAE share (e.g., for 0x3d, a direct share can be determined as 0.4 (or 0.344) (contributor value)*0.7 (contributor share)*0.4 (platform share)*0.95 (available platform share after 5% compensation for verification or gas), and so on for other entities).

Thus, some embodiments can include: processing a payment from a consumer for a subscription (e.g., in USD); burning an equivalent amount of market tradeable token (RAE) by sending the RAE to non-transferable eater address (es). In some embodiments, when a single eater address is utilized, the single eater address is a 0x0 address (e.g., 0x0000000000000000000000000000000000000000), like on Ethereum, or other prefix address identifier (e.g., according to a protocol of a given blockchain network for generating addresses) plus zeros, which no entity participating on the given blockchain network reasonably (either by computation infeasibility or by design) has access to a corresponding private key. In some alternate embodiments, a smart contract corresponds to an eater address and holds the amount of RAE, like in escrow to remove the amount of RAE from circulation, either indefinitely or until certain conditions are met (e.g., to redistribute a portion thereof), and no entity is permitted to alter the logic of the smart contract to access the amount of RAE. In some embodiments, when multiple eater addresses are utilized, a given eater address may correspond to a given platform. In some embodiments, a record keeping value, like a FIN value, may be determined for a transaction. According to some embodiments, a FIN has a fixed or pegged value (e.g. 1 FIN=$1 USD). Thus, the amount of RAE burned (e.g., removed from circulation) in a first burn transaction at a first time having a FIN value of 10 may differ from an amount of RAE burned in a second burn transaction at a second time that also has a FIN value of 10 according to market value of RAE in USD/FIN at the first time and the second time. Accordingly, FIN value becomes a representation of the value input by consumers onto the network (e.g., paid to a platform). In some embodiments, a consumer inputting value to a platform may burn an amount of RAE corresponding that consumer's desired input value to the platform (e.g., to obtain a subscription), and that transaction may be associated with the platform (e.g., claimed by the platform based on proof of ownership provided to the platform by the user to obtain the subscription) for identifying burn events associated with the platform. In some embodiments, an eater address associated with the platform may be specified. In turn, at step 708, a subset of burn events identified as corresponding to a platform by eater address may consider a collection of eater addresses associated with the platform. In some embodiments, at step 708, a subset of burn events corresponding to a platform may be identified from transaction information based on a public address (or addresses) associated with the platform from which burn transactions are requested by or submitted by in which amounts of RAE are transferred to an eater address. Thus, a variety of different ways for removing RAE from circulation in burn transactions and identifying those burn transactions in relation to a corresponding platform are described. Further, in some embodiments, such as subscription based embodiments, such as where each consumer input affords a period of access at a given subscription rate, then RAE distribution can be done on a pro-rata basis (e.g., based on total # active subscribers/total supply of RAE minted for period) and FIN value can be used as an intermediary unit to allow for different subscription price points to be offered while maintaining accurate attribution.

In step 714, the newly minted network attribution awards for the current award period are distributed according to the results of the process described above. For example, awards (e.g., in RAE) are distributed to the specified addresses receiving awards in a mint/award period based on the specified values (which may include an escrow smart contract) and any other implemented rules (e.g., platform to contributor award ratio, federated server or other entity awards, and the like). In some embodiments, distribution is effectuated by a transaction to an address in an amount of RAE as a percentage of total RAE minted as described above. In some embodiments, a smart contract may monitor the blockchain network until the transaction(s) are (each) recorded in a block having finality, such as by that block reaching a threshold depth in chain of blocks being extended (e.g., denoting completed transfer of RAE), at which point the minting and allocation process for the current minting period is complete.

In some embodiments, a smart contract may be called at step 712 by a federated server, platform server, or other authorized entity (e.g., according to signature verification). In some embodiments, execution of the smart contract concludes at step 714 once the allocation transaction(s) are submitted. In some embodiments, other entities may monitor the blockchain network, determine whether the mint allocation or one or more constituent transactions can be considered confirmed or not, and update one or more tables or records locally or otherwise on the blockchain based on the determination, and by which one or more transaction may be resubmitted. In some embodiments, a computing node executing the smart contract may perform one or more additional steps, such as those described in one or more steps preceding step 712 of the process 700 (which may alternatively be or also performed by one or more other entities). In some embodiments, a separate escrow smart contract may be implemented as described below to address attribution awards delayed in escrow for reallocation.

In some embodiments described above, an amount of attribution awards may be transferred to an address of a smart contract which may hold those attribution awards in escrow for redistribution. Thus, for example, rather than reallocation of dampened attributions in step 709A for distribution of awards during the mint in step 714, an amount of RAE tokens (attribution award tokens) may be delated in escrow at step 715 by a smart contract. The smart contract may delay reallocation based on a predefined period of time, like 1-7 days, or after a predefined number of next mints, e.g., 1-7 mint periods. The smart contract may receive the amount of attribution award tokens for redistribution and information about the awards distributed during the mint (or contributor values or platform awards). As previously outlined above, such as with reference to steps 708, 709A, and 710, reallocations of amounts of dampened attributions may be determined. The process may occur similar to that as would be implemented to reallocate during at time of mint/distribution, but may be based on updated consumers classifications. For example, the processes of steps 705 and 707 may be performed or updated results of those processes obtained prior to, or in association with, a reallocation step 709B. Thus, reallocation determinations at step 709B may account for updated information in utilization records of consumers for which amounts were dampened. In some cases, the reallocation may include reallocation back to a contributor for which value was dampened, or the reallocation to additional contributors for the consumer (e.g., which might occur outside of the mint period due to a lack of utilization record information during the mint period in which the amount was dampened). Amounts which are not determined to be reallocated in relation to a consumer which was dampened, such as where that consumer classification is unchanged, those reallocation amount may be summed and redistributed to contributors based on other consumers associated with burn transactions, e.g., as described above.

Thus, for example, step 709B may determine how to allocate the amount of attribution tokens which were delayed in escrow amount contributors (or platforms) based on updated classifications of consumers determined for more mature utilization records or classifications of contributors (e.g., that might result from revised consumer classifications affecting a ratio of illegitimate to other (e.g., legitimate) subscribers accessing content of a contributor). Those reallocation amounts may be specified as percentages to addresses (e.g., of contributors), which may be input to or ingested by the smart contract implementing the escrow holding at (or proximate to) the termination of the escrow period. Participating entities, such as platform servers, may reach consensus on the respective reallocation percents (e.g., to contributors or platforms) for attribution tokens in escrow. In turn, the smart contract may distribute 717 the awards delayed in escrow based on the indications of addresses with associated percentages and the amount of attribution tokens which we placed in escrow for that mint period. In some embodiments, the smart contract may be called by a federated server, platform server, or other authorized entity (e.g., according to signature verification). In some embodiments, execution of the smart contract concludes at step 717 once the reallocation transaction(s) are submitted to distribute the delayed awards which were transferred to the smart contract to hold in escrow for the escrow period. In some embodiments, other entities may monitor the blockchain network, determine whether the reallocation or one or more constituent transactions can be considered confirmed or not, and update one or more tables or records locally or otherwise on the blockchain based on the determination, and by which one or more transaction may be resubmitted. In some embodiments, the smart contract may be called in association with a determination of a later mint, or by a smart contract by which the mint or distribution is implemented, which may indicate a prior mint for reallocation based on an offset number of mint periods corresponding to a desired escrow delay defined by mint periods.

Figure 8:
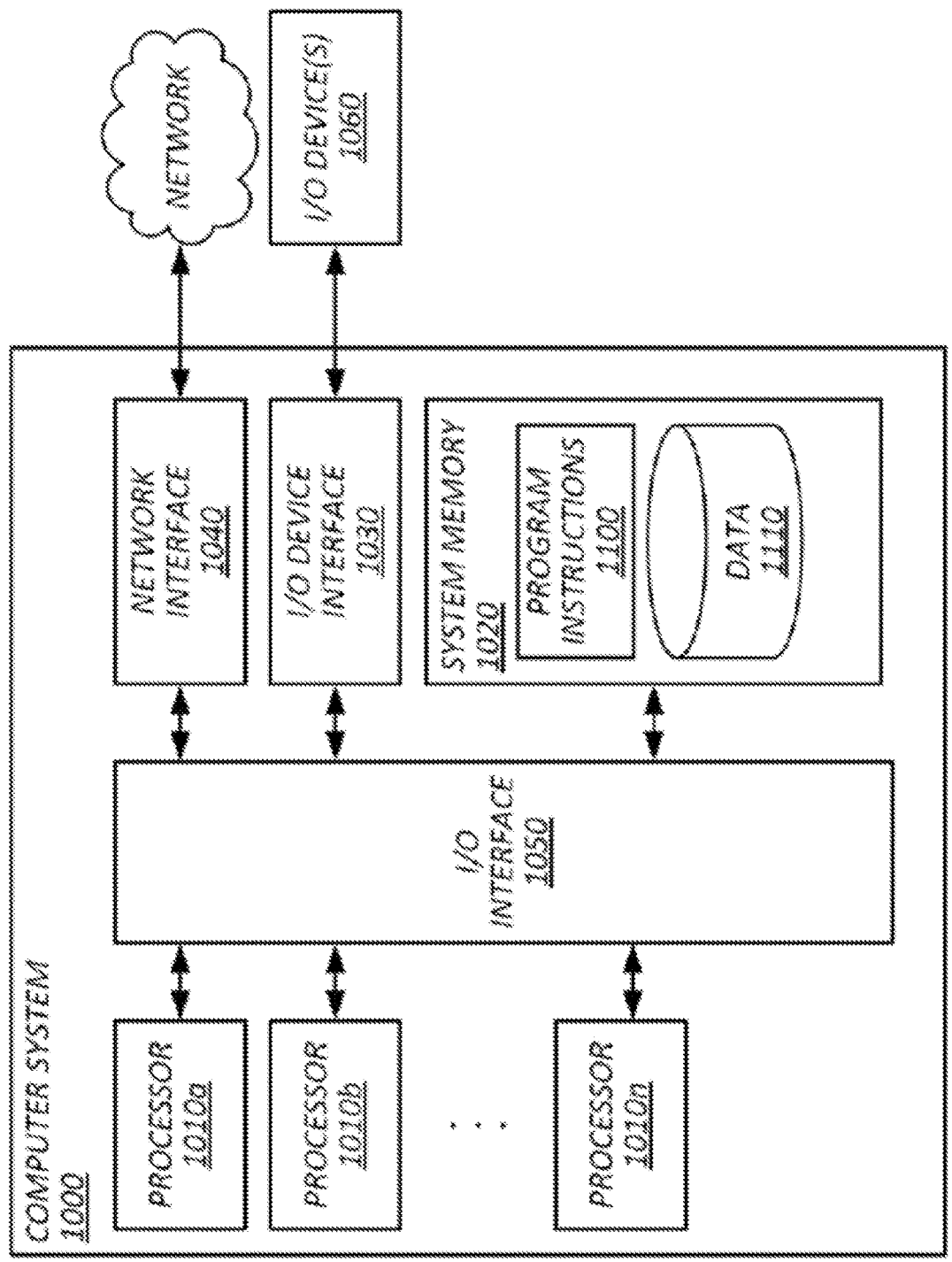
FIG. 8 is a diagram that illustrates an example computing system in accordance with embodiments of the present techniques.

FIG. 8 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Inventions sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be used independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A tangible, non-transitory, machine-readable medium storing instructions that when executed by one or more processors effectuate operations comprising:
    obtaining, with a computer system, a first graph having:
        nodes corresponding to records, the records being associated in memory with different record providers among a plurality of record providers, the associations in memory indicating which records were made available by which record providers,
        edges indicative of transitions between the records by computing devices of users granted access to the records;
    obtaining, with the computer system, first scores indicative of user interactions with the records based on the transitions between the records or indicative of an absence of user interactions with the records;
    determining, with the computer system, for each of the nodes, second scores based on both a measure of network centrality of the node and at least some of the first scores indicative of user interactions with the records or indicative of an absence of user interactions with the records;
    determining, with the computer system, for each of at least some of the record providers, third scores, the third score of a given record provider being based on second scores of nodes corresponding to records the given record provider made available;
    designating, with the computer system, based on the first graph, at least one user as exhibiting inauthentic behavior based on the transitions of the at least one user to or from records made available by the given record provider or designating the given record provider as exhibiting inauthentic behavior based on the transitions of the at least one user to or from records made available by the given record provider;
    determining, with the computer system, for the given record provider, an adjusted third score responsive to the designation of the at least one user as exhibiting inauthentic behavior or the designation of the given record provider as exhibiting inauthentic behavior; and
    causing, after determining the adjusted third score, for the given record provider among the plurality of different record providers, an entry to be appended to a second graph, the second graph being a tamper-evident, acyclic, directed graph of cryptographic hash pointers, the entry rendering tamper-evident, the appended entry indicating that an amount of cryptographic tokens based on the adjusted third score of the given record provider are, or are to be, allocated to the given record provider.

2. The medium of claim 1, wherein:
    the records are content items on a content distribution platform;
    the users are content consumers on the content distribution platform and the at least one user is at least one content consumer;
    the record providers are content contributors on the content distribution platform and the given record provider is a given content contributor;
    the third scores are aggregate network effect scores;
    the nodes corresponding to records are content item nodes;
    at least some nodes of the first graph are event nodes that correspond to events by which content consumers are granted access to the content items;
    designating at least one user as exhibiting inauthentic behavior comprises classifying at least one content consumer for dampening; and
    the computer system is a distributed computer system.

3. The medium of claim 2, wherein classifying at least one content consumer for dampening comprises:
    determining, with the computer system, an adjustment amount to an aggregate network effect score of a content contributor associated with the at least one content consumer based on first scores indicative of interactions of the at least one content consumer with content items provided to the content distribution platform by the content contributor.

4. The medium of claim 2, wherein obtaining the first graph comprises:
    obtaining a report for the content distribution platform, the report being based on utilization data corresponding to the one or more computing devices of content consumers accessing content items available on the content distribution platform.

5. The medium of claim 4, wherein:
    utilization data for a computing device of a content consumer indicates subscription events or login events of the content consumer by which access to content items is granted and which ones of the content items are accessed in a given session.

6. The medium of claim 5, the operations further comprising:
    determining a first frequency with which a given content item or given set of content items associated with a content contributor is accessed after an event node by a content consumer and a second frequency with which content item nodes associated with other content-contributors are accessed; and determining to dampen the content-consumer based on the first frequency and the second frequency.

7. The medium of claim 2, wherein classifying at least one content consumer for dampening comprises:
determining a first occurrence rate of a given content item node or given set of content item nodes associated with a content contributor in transitions from an event node by a content consumer,
determining a second occurrence rate of other content item nodes associated with other content contributors in other transitions by the content consumer, and
determining to dampen the content consumer based on a ratio of the occurrence rates exceeding a threshold.

8. The medium of claim 2, wherein classifying at least one content consumer for dampening comprises:
determining a first occurrence rate of a given content item node or given set of content item nodes associated with a content contributor in transitions from an event node among a subset of content-consumers,
determining a second occurrence rate of the given content item node or the given set of content item nodes associated with the content contributor in transitions from an event node by other content consumer, and
determining to dampen at least some of the content consumers in the subset of content consumers based on a ratio of the occurrence rates exceeding a threshold.

9. The medium of claim 8, the operations further comprising:
determining not to dampen at least some other ones of the content consumers in the subset of content consumers based on a third occurrence rate.

10. The medium of claim 8, the operations further comprising:
determining, for each of the content consumers in the subset of content consumers, a third occurrence rate indicative of occurrences of other content item nodes associated with other content contributors in other transitions by the content consumer.

11. The medium of claim 2, wherein classifying at least one content consumer for dampening comprises:
identifying, for the at least one content consumer, one or more transitions associated with a session including a node corresponding to a subscription event; and
determining to dampen the at least one content consumer based on a fourth score associated with the one or more transitions of the session.

12. The medium of claim 11, the operations further comprising:
determining the at least one content consumer targeted content items of the given content contributor based on the score associated with the one or more transitions of the session indicating below a threshold amount of interaction with the content items of the given content contributor.

13. The medium of claim 11, the operations further comprising:
determining the at least one content consumer targeted content items of the given content contributor based on the fourth score associated with the one or more transitions of the session indicating below a threshold amount of interaction with the content items of the given content contributor and below a threshold amount of interaction with other content items of other content contributors.

14. The medium of claim 11, the operations further comprising:
determining the at least one content consumer targeted content items of the given content contributor based on the fourth score associated with the one or more transitions of the session indicating one or more dwell times below a threshold amount of time before accessing the content items of the given content contributor.

15. The medium of claim 11, the operations further comprising:
determining the at least one content consumer targeted content items of the given content contributor based on the fourth score associated with the one or more transitions of the session indicating one or more dwell times below a threshold amount of time before accessing the content items of the given content contributor and below a threshold amount of interaction with other content items of other content contributors.

16. The medium of claim 11, the operations further comprising:
determining the at least one content consumer targeted content items of the given content contributor based on the fourth score associated with the one or more transitions of the session indicating access of one or more of the content items of the given content contributor by associated resource locators.

17. The medium of claim 11, the operations further comprising:
determining the at least one content consumer targeted content items of the given content contributor based on the score associated with the one or more transitions of the session indicating access of one or more of the content items of the given content contributor by associated resource locators and interactions indicative of failing to play-though the one or more of the content items.

18. The medium of claim 2, wherein classifying at least one content consumer for dampening comprises:
identifying, for the at least one content consumer, below a threshold number of transitions in one or more sessions after a subscription event; and
determining to dampen the at least one content consumer based on a fourth score associated with the one or more transitions of the session.

19. The medium of claim 18, wherein:
the subscription event is a subscription renewal event, and
below a threshold number of transitions in one or more sessions is identified between the subscription renewal event and a prior subscription event or between the subscription renewal event and an initial subscription event.

20. The medium of claim 2, wherein classifying at least one content-consumer for dampening comprises:
identifying, for the at least one content consumer, one or more transitions associated with a session including a node corresponding to an access event; and
determining to dampen the at least one content consumer based on a score associated with the one or more transitions of the session.

21. The medium of claim 20, the operations further comprising:
determining the at least one content consumer targeted content items of the given content contributor based on a fifth score associated with the one or more transitions of the session indicating below a threshold amount of interaction with the content items of the given content contributor and below a threshold amount of interaction with other content items of other content contributors.

22. The medium of claim 20, the operations further comprising:
  determining the at least one content consumer targeted content items of the given content contributor based on the fifth score associated with the one or more transitions of the session indicating one or more dwell times below a threshold amount of time before accessing the content items of the given content contributor and below a threshold amount of interaction with other content items of other content contributors in the session or other sessions.

23. The medium of claim 20, the operations further comprising:
  determining the at least one content consumer targeted content items of the given content contributor based on the fifth score associated with the one or more transitions of the session indicating access of one or more of the content items of the given content contributor by associated resource locators without accessing other content items associated with other content contributors in the session or other sessions.

24. The medium of claim 20, the operations further comprising:
  determining the at least one content consumer targeted content items of the given content contributor based on the fifth score associated with the one or more transitions of the session indicating access of one or more of the content items of the given contributor by associated resource locators and interactions indicative of failing to play-though the one or more of the content items in the session or other sessions and below a threshold amount of interaction with other content items of other contributors in the session or other sessions.

25. The medium of claim 1, the operations comprising:
  steps for dampening scores based on inauthentic behavior.

26. The medium of claim 1, the operations comprising:
  steps for detecting inauthentic behavior of users.

27. The medium of claim 1, the operations comprising:
  determining to prohibit the given record provider from providing records based on the second scores; or
  determining to permit the given record provider to provide records based on the second scores.

28. A method, comprising:
  obtaining, with a computer system, a first graph having:
    nodes corresponding to records, the records being associated in memory with different record providers among a plurality of record providers, the associations in memory indicating which records were made available by which record providers,
    edges indicative of transitions between the records by computing devices of users granted access to the records;
  obtaining, with the computer system, first scores indicative of user interactions with the records based on the transitions between the records or indicative of an absence of user interactions with the records;
  determining, with the computer system, for each of the nodes, second scores based on both a measure of network centrality of the node and at least some of the first scores indicative of user interactions with the records or indicative of an absence of user interactions with the records;
  determining, with the computer system, for each of at least some of the record providers, third scores, the third score of a given record provider being based on second scores of nodes corresponding to records the given record provider made available;
  designating, with the computer system, based on the first graph, at least one user as exhibiting inauthentic behavior based on the transitions of the at least one user to or from records made available by the given record provider or designating the given record provider as exhibiting inauthentic behavior based on the transitions of the at least one user to or from records made available by the given record provider;
  determining, with the computer system, for the given record provider, an adjusted third score responsive to the designation of the at least one user as exhibiting inauthentic behavior or the designation of the given record provider as exhibiting inauthentic behavior; and
  causing, after determining the adjusted third score, for the given record provider among the plurality of different record providers, an entry to be appended to a second graph, the second graph being a tamper-evident, acyclic, directed graph of cryptographic hash pointers, the entry rendering tamper-evident, the appended entry indicating that an amount of cryptographic tokens based on the adjusted third score of the given record provider are, or are to be, allocated to the given record provider.

* * * * *